(12) United States Patent
Dames et al.

(10) Patent No.: US 10,072,596 B2
(45) Date of Patent: Sep. 11, 2018

(54) CONTROL UNIT FOR A FUEL INJECTOR

(71) Applicant: SENTEC LTD, Cambridge, Cambridgeshire (GB)

(72) Inventors: Andrew Dames, Cambridge (GB); Hilary Meanwell, Saffron Walden (GB); Jerome Dilley, Cambridge (GB); James Evett, Winslow (GB); Christian Wehrenfennig, Cambridge (GB); Alice Burrell, Cambridge (GB)

(73) Assignee: SENTEC LTD, Cambridge, Cambridgeshire (GB)

( * ) Notice: Subject to any disclaimer, the term of this patent is extended or adjusted under 35 U.S.C. 154(b) by 20 days.

(21) Appl. No.: 15/036,631

(22) PCT Filed: Nov. 17, 2014

(86) PCT No.: PCT/GB2014/053388
§ 371 (c)(1),
(2) Date: May 13, 2016

(87) PCT Pub. No.: WO2015/071686
PCT Pub. Date: May 21, 2015

(65) Prior Publication Data
US 2016/0281624 A1    Sep. 29, 2016

(30) Foreign Application Priority Data

Nov. 15, 2013 (GB) .................................. 1320184.3
Nov. 15, 2013 (GB) .................................. 1320206.4
(Continued)

(51) Int. Cl.
*F02D 41/20* (2006.01)
*F02D 41/40* (2006.01)
*F02M 51/06* (2006.01)

(52) U.S. Cl.
CPC ............ *F02D 41/20* (2013.01); *F02D 41/40* (2013.01); *F02M 51/061* (2013.01);
(Continued)

(58) Field of Classification Search
CPC ..... F02D 2041/2003; F02D 2041/2006; F02D 2041/201; F02D 2041/2037; F02D 2041/2044; F02D 2041/2051
(Continued)

(56) References Cited

U.S. PATENT DOCUMENTS

| 3,000,368 A | 9/1961 | Knapp et al. |
| 5,161,083 A | 11/1992 | Mohler et al. |

(Continued)

FOREIGN PATENT DOCUMENTS

| DE | 2306007 A1 | 9/1973 |
| EP | 0570986 A2 | 11/1993 |

(Continued)

OTHER PUBLICATIONS

English Language Abstract of GB1427995A.

*Primary Examiner* — Erick Solis
(74) *Attorney, Agent, or Firm* — Ware, Fressola, Maguire & Barber LLP

(57) ABSTRACT

A control unit (2) for a fuel injector (3) comprising a solenoid actuator (31) having an armature (33), the control unit configured to drive a current through an electromagnet coil (34) of the solenoid actuator in a voltage mode during at least a portion of an injection cycle.

25 Claims, 40 Drawing Sheets

(30) Foreign Application Priority Data

| Date | Country | Number |
|---|---|---|
| Nov. 18, 2013 | (GB) | 1320301.3 |
| Dec. 9, 2013 | (GB) | 1321713.8 |
| Feb. 5, 2014 | (GB) | 1401972.3 |
| Apr. 11, 2014 | (GB) | 1406566.8 |
| Apr. 11, 2014 | (GB) | 1406587.4 |
| Apr. 16, 2014 | (GB) | 1406844.9 |
| Apr. 25, 2014 | (GB) | 1407320.9 |
| Jul. 2, 2014 | (GB) | 1411791.5 |
| Jul. 15, 2014 | (GB) | 1412521.5 |
| Aug. 8, 2014 | (GB) | 1414084.2 |
| Aug. 19, 2014 | (GB) | 1414677.3 |

(52) U.S. Cl.
CPC ........ *F02D 2041/2003* (2013.01); *F02D 2041/2027* (2013.01); *F02D 2041/2037* (2013.01); *F02D 2041/2044* (2013.01); *F02D 2041/2051* (2013.01); *F02D 2041/2055* (2013.01); *F02D 2041/2058* (2013.01); *F02M 2200/50* (2013.01); *Y02T 10/44* (2013.01)

(58) Field of Classification Search
USPC .............. 123/472, 490; 361/149, 153, 154
See application file for complete search history.

(56) References Cited

U.S. PATENT DOCUMENTS

| | | | |
|---|---|---|---|
| 5,363,270 A * | 11/1994 | Wahba | H01F 7/1607 335/177 |
| 5,655,501 A | 8/1997 | Hafner | |
| 7,628,141 B2 * | 12/2009 | Elie | F02D 41/042 123/490 |
| 7,726,276 B2 | 6/2010 | Aliakbarzadeh et al. | |
| 7,984,706 B2 | 7/2011 | Stewart, Jr. et al. | |
| 8,096,485 B2 | 1/2012 | Hlousek et al. | |
| 8,166,953 B2 | 5/2012 | Caley | |
| 8,681,468 B2 | 3/2014 | Jacob et al. | |
| 2003/0106511 A1 | 6/2003 | Haskara | |
| 2009/0126692 A1 * | 5/2009 | Bolz | F02D 41/20 123/490 |
| 2014/0069389 A1 * | 3/2014 | Nishimura | F02D 41/20 123/478 |
| 2014/0069390 A1 * | 3/2014 | Nishimura | F02D 41/20 123/478 |
| 2014/0069391 A1 * | 3/2014 | Nishimura | F02D 41/20 123/478 |

FOREIGN PATENT DOCUMENTS

| | | |
|---|---|---|
| EP | 1369571 B1 | 11/2005 |
| EP | 1701026 A1 | 9/2006 |
| EP | 1571679 B1 | 12/2012 |
| EP | 2587034 A1 | 5/2013 |
| WO | 01/29400 A2 | 4/2001 |
| WO | 2011/058344 A1 | 5/2011 |
| WO | 2012/172351 A2 | 12/2012 |
| WO | 2012172351 A2 | 12/2012 |

* cited by examiner

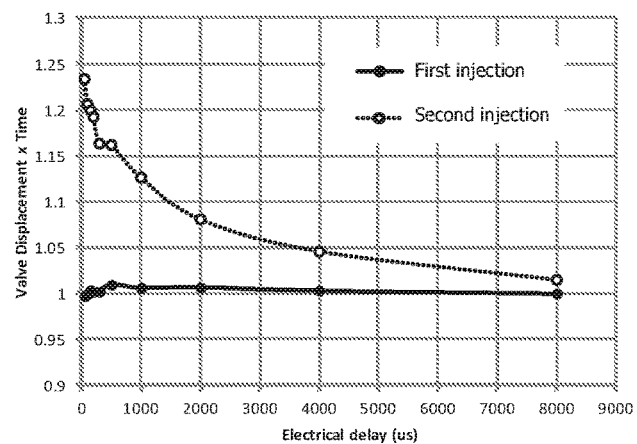
Fig. 16
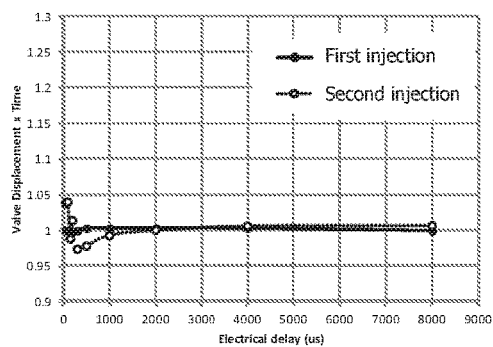 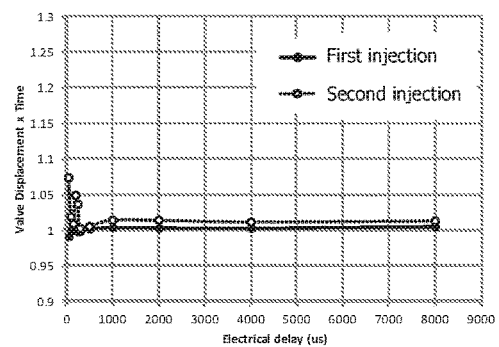
Fig. 17a                    Fig. 17b

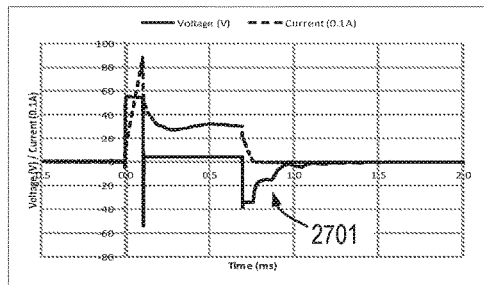 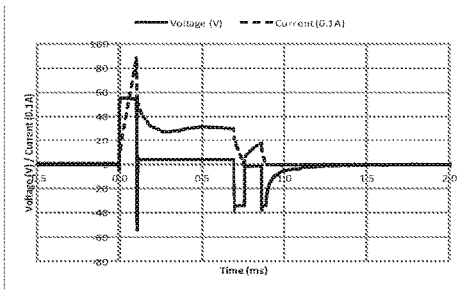
Fig. 27a    Fig. 27b
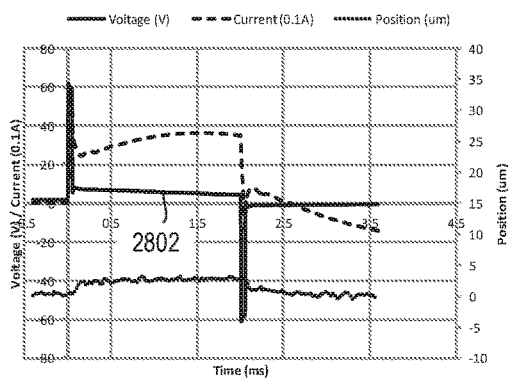
Fig. 28

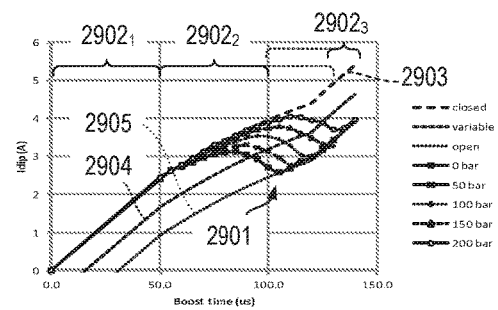 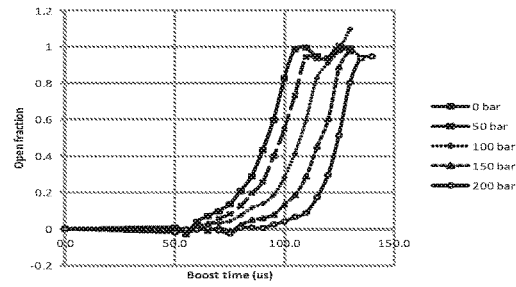
Fig. 29a  Fig. 29b
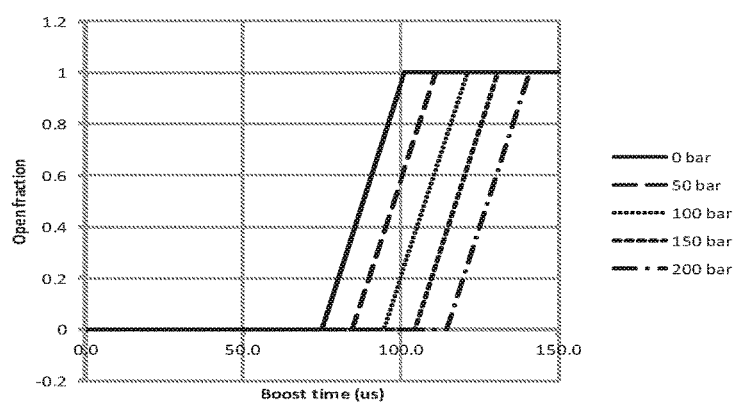
Fig. 30

CONTROL UNIT FOR A FUEL INJECTOR

FIELD OF THE INVENTION

The present invention relates to a control unit for a fuel injector comprising a solenoid actuator, a fuel injection system which includes the control unit and the fuel injector and to a method of operating a fuel injector comprising a solenoid actuator.

BACKGROUND

Conventional solenoid fuel injectors struggle to inject small volumes with good shot-to-shot repeatability.

For small injections, conventional peak and hold current-driven implementations provide short current pulses to move an armature, which lifts a valve from a valve seat with minimal or no dwell time at the largest lift. In this approach (often referred to as the "ballistic" regime), shot-to-shot repeatability of small injection volumes is poor. This is due to the build variation between injectors and the inability to control the partial valve lifts achieved and the opening and closing flight times, thus, variations in fuelling. Furthermore, the fuel valve will hit the open stop as the pulse width applied to the injector is increase. Normally injector operate in this linear region where the fuel valve position is fully opened to an open stop which enable linear injection fuel quantities with respect to pulse width applied to be delivered. If the open stop is hit, then this causes a rebound which will reduce the fuelling. Therefore, at pulse widths just above the minimal pulse width at which the open stop is first hit solenoid injectors often exhibit reduced injection quantities as the actuation pulse width is increased. These fuelling problems can result in the optimal air/fuel mix not always being delivered which in turn can cause less efficient combustion and, thus, increase emissions. In addition smooth running of the engine at low loads is impaired.

Non-linearity in fuel volume as a function of pulse width can make closed-loop control difficult. In addition, impact of parts of the armature or pintle with an open stop can result in noise which can have a detrimental impact on driving experience. Furthermore, drift in injection volumes can be caused by wear at the open stop.

Some injectors use a piezoelectric actuator. Such injectors are often referred to as "piezo injectors".

A piezo injector can provide predictable partial lift of the valve and may not use an open stop. The piezo partial lift enables repeatable small fuel deliveries to be achieved with good shot-to-shot repeatability. However, piezo-electric actuated injectors are expensive due to the cost of the actuators and the cost of associated components such as thermal compensators and/or systems to magnify the stroke of the piezo actuator. Therefore, attention is being directed to solenoid injectors to which provide similar performance to piezo injectors, but at lower cost.

EP 2 499 646 A1 describes a short-travel solenoid actuator which comprises at least one pole piece, an armature, an electromagnet coil arranged, in response to energisation, to actuate the armature between first and second positions. A permanent magnet is positioned and orientated so as to latch the armature in the first and second positions when the armature is in the first and second positions respectively. A spring is arranged to bias the armature.

EP 2 721 333 discloses a solenoid actuator which comprises an armature, pole piece(s) and electromagnet coil(s) arranged, in response to energisation, to cause travel of the armature between first and second positions along a direction of travel. The solenoid actuator includes permanent magnet(s) positioned and orientated for latching the armature in at least the first position when the armature is in the first position and spring(s) arranged to bias the armature. The solenoid actuator can be operated to provide partial lift U.S. Pat. No. 8,166,953 B2 describes a solenoid valve used as part of a fuel injector and controlled to provide partial lift of the armature.

EP 1 571 679 B1 describes a voltage-driven solenoid valve in which a drive waveform is adaptively obtained from data from the coil current feedback and is continually adjusted during use to compensate for changing drive conditions.

U.S. Pat. No. 8,681,468 B2 describes a solenoid valve in current and voltage are monitored and are used to adaptively define the drive waveform in order to keep drive levels and times to a minimum and reduce wasted energy in the system.

U.S. Pat. No. 5,161,083 A describes rotary and linear proportional solenoid actuators capable of partial lift in which feedback from a position sensor is used as part of closed-loop control of the drive current to maintain the lift position of the actuator.

U.S. Pat. No. 7,984,706 B2 describes a fuel injector with a two-coil solenoid actuator which uses current driven through each coil independently in order to decelerate the armature and negative current used to latch the armature to each pole thereby reducing bounce.

U.S. Pat. No. 7,726,276 B2 describes closed-loop control of direct injection systems using a cylinder-selective lambda sensor to control injection quantities.

EP 2 587 034 A1 describes a fuel injector with a solenoid actuator. The voltage (or current) through the coil is monitored, at least in the closing phase of the actuator, and used to determine the fuel pressure delivered by the high-pressure fuel pump. This enables the fuel pump to be supervised and removes the need for a separate pressure sensor.

EP 1 369 571 B1 describes a method of controlling a solenoid fuel injector to provide an increased dynamic range (i.e. the range over which injector delivers a quantity of fuel that varies linearly with open time to within a predetermined margin).

SUMMARY

The present invention seeks to provide a control unit for a fuel injector which can provide improved partial lift in the fuel injector.

According to a first aspect of the present invention there is provided a control unit for a fuel injector comprising a solenoid actuator having an armature. The control unit is configured to drive a current through an electromagnet coil of the solenoid actuator in a voltage mode during at least portion of an injection cycle. The at least portion of an injection cycle comprises a hold portion.

Thus, partial lift stability can be enhanced by using voltage mode control (as opposed to current mode control).

The control unit may be configured to drive the current through the electromagnetic coil in current mode at an injection frequency below a threshold frequency and to drive the electromagnetic coil in voltage mode at an injection frequency above the threshold frequency. The threshold frequency may be depend on resistance R and the inductance L of the electromagnetic coil. The (angular) threshold frequency may be equal to R/L.

The control unit may be configured to drive the current through an electromagnet coil of the solenoid actuator in a voltage mode during turn on and hold portions of the injection cycle.

The control unit can take the form of an engine control unit (ECU) or powertrain control module (PCM).

The control unit may comprise a drive circuit and a controller for controlling operation of the drive circuit.

The armature may be movable between a first position corresponding to the fuel injector being in a closed state and a second position corresponding to the fuel injector being a fully-open state.

The control unit may be configured to apply a drive waveform to the electromagnet coil comprising a turn-on portion having a start and an end and having a profile such that, at the end of the turn-on portion, the armature is at rest at a predetermined position between the first and second positions or at the second position, and current through the electromagnetic coil equals a hold current and a hold portion following the turn-on portion having a profile such that the armature is held, at rest, at the predetermined position in the voltage mode.

The turn-on portion may also be referred to as the "valve opening portion" or simply "opening portion". The turn-on portion may also be referred to as the "valve lifting portion" or simply "lifting portion".

The drive waveform may further comprise a turn-off portion following the hold portion, the close portion having a start and an end and having a profile such that, at the end of the turn-off portion, the armature is at the first position. The control unit may be configured, during some or all of the turn-off portion, to apply no bias. During the turn-off portion, a negative voltage may appear across the coil due to a back emf.

The turn-off portion may also be referred to as the "valve closing portion" or simply "closing portion". The turn-on portion may also be referred to as the "valve lowering portion" or simply "lowering portion" in an outward opening injector.

The turn-on portion may comprise one or more portions of a first bias polarity. The turn-off portion may comprise one or more portions of second, opposite bias polarity.

The control unit includes a catching diode configured such that, in a turn-off portion, the control unit disconnects the drive transistor and the current in the coil pass through the catching diode.

The turn-off portion may include at least one pulse for decelerating the armature during travel to the first position.

The turn-off portion may have a profile which comprises the profile of the turn-on portion inverted in time and/or voltage. The turn-on portion may include first and second pulses and first and second post-pulse sections, the first post-pulse section separating the first and second pulses, the first and second pulses having a greater magnitude than the magnitudes of first and second post-pulse sections. Thus, the first and second pulses provide boost pulses for initiating stable partial lift.

A second boost pulse may be arranged so as to leave the armature in a force balanced state, that is, not accelerating. Preferably, the second boost pulse is timed to occur when the armature is at rest so that the armature is left in a static lift state. The timing of the second boost pulse may be determined by the middle of the pulse.

Start and duration of the second pulse may depend on the predetermined position and is selected so as to discourage or prevent oscillation of the armature at the predetermined position.

The control unit may be configured to drive a negative current through the electromagnet coil for encouraging faster closing of the fuel injector.

The control unit may be configured to drive a negative current through the electromagnet coil for at least contributing to keeping the fuel injector closed.

The control unit may be configured, after driving current in a first direction, to drive current in a second, reverse direction through the electromagnet coil.

The control unit may be configured to adapt drive impedance so as to match the electromagnet coil for reducing bounce when the armature stops travelling.

The control unit may be configured to maintain an average drive voltage using a pulse-width modulation voltage source based on switching between first and second voltage levels, optionally wherein the second voltage level is ground. The first voltage level may be a battery level. The battery level may vary, for example, when a starter motor is engaged. Thus, even if battery voltage varies rapidly, the control unit can properly set the average drive voltage.

The control unit may be configured to generate a voltage in dependence upon a fixed mark space ratio produced by the controller.

The control unit may be configured, in response to feedback from at least one sensor during driving of the solenoid actuator, to adapt driving of the solenoid actuator. Thus, signals from one or more sensors can used to operate the actuator in a closed-loop manner.

The control unit may be configured to generate a drive waveform for a first cycle and to measure one or more actuator-related parameters during the first cycle, and to generate a drive waveform for a second, later cycle based on measured parameters.

The control unit may be configured to control a position of the armature in dependence upon the feedback.

The least one sensor may include a high-speed lambda sensor positioned in an exhaust, at least one sensor measuring torque on the drive shaft, at least one engine-knock sensor, at least one engine vibration sensor, at least one in-cylinder ionisation sensor; and/or at least one cylinder pressure sensor.

The cylinder pressure sensor(s) may be disposed internally or externally to an engine cylinder.

The at least one sensor may include the electromagnetic coil in the solenoid actuator. Thus, in voltage-drive mode, performance of actuator can be gauged by using the current in the coil.

The control unit may be configured to control a voltage applied to the electromagnetic coil in dependence upon a measured current.

The control unit may be configured to determine position of the armature in dependence upon a measured current. The control unit may be configured to determine a sealing force acting on the armature in dependence upon a measured current, optionally at a current minimum following a positive pulse. The control unit may be configured to determine a fuel rail pressure acting on the armature in dependence upon a measured current, optionally at a current minimum following a positive pulse. The control unit may be configured to determine a cylinder pressure acting on the armature in dependence upon a measured current, optionally at a current minimum following a positive pulse. Thus, additional sensors for measuring pressure can be omitted.

The control unit may be configured to analyse a measured current through the coil.

The control unit may be configured to identify timing of a local minimum current in the electromagnetic coil after applying a high-voltage pulse for opening the injector and to adapt driving of the solenoid actuator independence upon the timing and/or value of the local minimum current.

The control unit may be configured to identify a measured value of current in the electromagnetic coil a predetermined time after an end of a high-voltage pulse for opening the injector and to adapt driving of the solenoid actuator independence upon the measured value of current.

The control unit may be configured to identify a measured value of current in the electromagnetic coil a predetermined time after a start of applying a waveform and to adapt driving of the solenoid actuator independence upon the measured value of current.

The control unit may be configured to determine fuel and cylinder pressures acting on the armature and to store the pressures in a database.

The control unit may be configured, in dependence upon timing, measured current and/or determined pressures to set a voltage for holding the armature in a predetermined position and/or to set a duration and/or magnitude of the high-voltage pulse and/or an additional high boost pulse, for a following injection cycle.

The control unit may be configured, after applying a drive waveform, to leave the electromagnetic coil in an open-circuit state and to monitor voltage across the coil in the open-circuit state.

The control unit may be configured, during closed-loop control, to adapt driving of the solenoid actuator in dependence upon the voltage. This can be used to help reduce bounce when closing the valve (fuel injector) closure.

The control unit may be configured, in dependence upon timing, measured current and/or determined pressures, to adapt driving of the solenoid actuator during the injection cycle.

The control unit may be configured to apply a measurement drive waveform such that the armature does not move from a first position corresponding to the fuel injector being in a closed state, to obtain a first measurement of current in the electromagnetic coil and to determine resistance of the electromagnetic coil in dependence upon the first measurement.

The control unit may be configured to apply a measurement drive waveform such that the armature does not move from a first position corresponding to the fuel injector being in a closed state, to obtain the measurement which occurs first in time holds most information about inductance, the second measurement on the flatter part of the curve holds most information about resistance. The two measurements are interdependent. Thus, once the resistance has been estimated, a better estimation of inductance L can be estimated.

The control unit may be configured to obtain a second measurement of current and to determine inductance of electromagnetic coil in dependence upon the first and second measurements. The first measurement may be carried out after the second measurement. The first measurement may be carried out at a time about equal to L/R or in a range 1 to 2 ms after the start of an injection cycle, where L is the inductance and R is the resistance of the coil. The second measurement is carried out at about 100 μs after the start of an injection cycle.

The control unit may be configured to drive a current through another electromagnetic coil of the solenoid actuator.

The control unit may be configured to apply a drive waveform comprising at least one pulse pair having a start and an end, each pulse pair comprising a positive pulse and a negative pulse configured such that the pulse pair result in substantially zero net magnetic flux in the actuator at the end of the pulse pair. Thus, a pulse train can be used in which interaction between pulses of the same polarity is reduced.

The control unit may comprise a waveform source having an output, an adder having first and second inputs and an output, wherein the output of the waveform source is coupled to the first input of the adder, a drive amplifier having an input and a rectified output, wherein the output of the adder is coupled to the input of the drive amplifier, an error amplifier having first and second inputs and an output, wherein the output of the waveform source is coupled to the first input of the error amplifier and the rectified output of the drive amplifier is coupled to the second input of the error amplifier via a pre-scaler, a filter having an input and an output, wherein the output of the error amplifier is coupled to the input of the filter and the output of the filter is coupled to the second input of the adder, wherein the rectified output of the drive amplifier is coupled to an output terminal for coupling to the electromagnetic coil of the solenoid actuator.

The control unit may comprise a switching driver wherein the error signal used to shorten the boost pulse by delaying its start.

According to a second aspect of the present invention there is provided a fuel injection system comprising a fuel injector comprising a solenoid actuator which comprises at least one pole piece, an armature at least one electromagnet coil arranged, in response to energisation, to cause travel of the armature between first and second positions and at least one spring arranged to bias the armature and a control unit according to the first aspect coupled to the solenoid actuator.

According to a third aspect of the present invention there is provided a fuel injector comprising a solenoid actuator for use with the control unit according to the first aspect.

The solenoid actuator may further comprise at least one permanent magnet positioned and orientated so as to latch the armature in the first and second positions when the armature is in the first and second positions respectively. The solenoid actuator may not comprise any permanent magnet or may comprise at least one permanent magnet, which do not latch the armature in the first and second positions when the armature is in the first and second positions respectively.

Net force of the at least one spring may vary by a factor of at least 2 to 1 over a stroke.

The armature may be moveable between a first position corresponding to the fuel injector being in a closed state and a second position corresponding to the fuel injector being a fully-open state and wherein the at least one spring includes at least one mechanical spring having a stiffness or an effective stiffness such that the armature is stably positionable at a position between the first and second positions or at the second position.

The at least one mechanical spring may include a hydraulic spring. A majority of or substantially all stiffness may be achieved by the hydraulic spring. This can allow freedom in the type and characteristics of spring used to set the preload. In addition, a lower holding current can be used.

The fuel injector may comprise an outward-opening valve. Thus, the mechanical spring stiffness can be reduced since due to the hydraulic force gradient with lift being positive, and, therefore behaves as if it a mechanical spring.

The fuel injector may comprise an inward-opening valve and the control unit may be configured to determine the position in dependence upon fuel pressure. The control unit may be configured to determine the position according to a predetermined figure of merit for spray pattern or to achieve a minimum pressure under the sealing element (i.e. the pressure applied to the orifices in the nozzle) which is known to achieve an acceptable spray.

The solenoid actuator may have a nozzle having a nozzle configuration which is adapted to provide a hydraulic force profile.

Nozzle configuration may include angle of a valve seat, valve seat diameter, valve ball diameter, ball clearance, ball flat arrangement and/or size and shape of internal fuel passage above the seat line.

A valve lift position may be used such that the hydraulic force profile with respect to valve lift gradient is positive. A valve lift position may be used such that the hydraulic force profile with respect to valve lift gradient is flat.

The at least one spring may have variable mechanical spring rate/rates. Thus, mechanical stiffness can be varied during lifting which can help to provide stable lift positions at desired values.

The at least one spring comprises at least two springs and wherein the at least one spring is re-engageably disengageable or re-disengageably engageable as the actuator is moved. Thus, mechanical stiffness can be varied during lifting which can help to provide stable lift positions at desired values.

The at least one spring may have a spring rate arranged to increase electrical feedback levels.

The at least one spring may comprise at least one disc spring.

The, or each disc spring, may have inner and outer perimeters. The outer perimeter of the, or each disc spring, may be fixed to an inner surface of a body portion of the fuel injector body and/or the inner perimeter of the, or each disc spring, may be fixed to a needle of the fuel injector.

The fuel injector may comprise a dowel configured to align the at least one spring and components.

The fuel injector may have a central axis and the at least one spring may comprise an elongate axial wire.

The fuel injector may comprise an axial tube. The axial tube may comprise a tube which feeds fuel from an inlet to a pintle tip. The axial tube may comprise a primary return spring.

The solenoid actuator may be a dry solenoid actuator.

The fuel injector may comprise an axial inlet.

The fuel injector may further comprise a bellows or flexure element arranged to discourage or prevent fuel from reaching the solenoid actuator.

The fuel injector may comprise an axial hole in a pintle and a chamber. The fuel enters through the axial hole and exits into the chamber.

The flexure element may comprise a toroidal disc.

The fuel injector may comprise an inwardly-opening valve. The fuel injector may comprise an outwardly-opening valve.

The fuel injector may be a gasoline direct injection (GDI) fuel injector. The fuel injector may be a natural gas direct injector. The fuel injector may be a diesel injector.

The fuel injector may be configured to provide variable injector flow rate by controlling a sealing element lift and energisation pulse width.

The armature in the solenoid actuator may be wet or dry.

The second position may be defined by a physical open stop. The second position may not be defined by a physical open stop.

According to a fourth aspect of the present invention there is provided a motor vehicle comprising a control unit according to the first aspect or a fuel injection system according to the second aspect.

The motor vehicle may be a motorcycle, an automobile (sometimes referred to as a "car"), a minibus, a bus, a truck or lorry. The motor vehicle may be powered by an internal combustion engine and, optionally, one or more electric motors.

According to a fifth aspect of the present invention there is provided a method of driving a current through an electromagnet coil of a solenoid actuator in a voltage mode during at least portion of an injection cycle.

According to a sixth aspect of the present invention there is provided a computer program which, when executed by a control unit, causes the control unit to perform the method according to fifth aspect.

According to a seventh aspect of the present invention there is provided a computer readable medium, which may be non-transitory, which stores or carries the computer program according to the sixth aspect.

BRIEF DESCRIPTION OF THE DRAWINGS

Certain embodiments of the present invention will now be described, by way of example, with reference to the accompanying drawings, in which:

FIG. 16 illustrates dual-pulse behaviour for a flux-switched solenoid actuator with 60% partial lift;

FIG. 17a illustrates dual-pulse behaviour for a flux-switched solenoid actuator with 60% partial lift using waveform trimming using a 78 volt off voltage;

FIG. 17b illustrates dual-pulse behaviour for a flux-switched solenoid actuator with 60% partial lift using waveform trimming using an 80 volt off voltage;

FIG. 27a shows experimental data for a flux-switched solenoid actuator showing, in a measured voltage plot, bounce on valve seat after valve closure;

FIG. 27b shows experimental data for a flux-switched solenoid actuator showing no clear bounce;

FIG. 28 shows experimental data for a flux-switched solenoid actuator which is driven with a voltage drive profile such that the solenoid actuator does not open or opens by a negligible amount;

FIG. 29a shows variation of minimum current after boost ($I_{dip}$) with boost time and injector load for a flux-switched solenoid actuator;

FIG. 29b shows a map between boost time and open fraction for different injector loads;

FIG. 30 is an approximation of the open fraction map shown in FIG. 29b;

DETAILED DESCRIPTION OF CERTAIN EMBODIMENTS

Fuel Injection System 1

Figure 1:
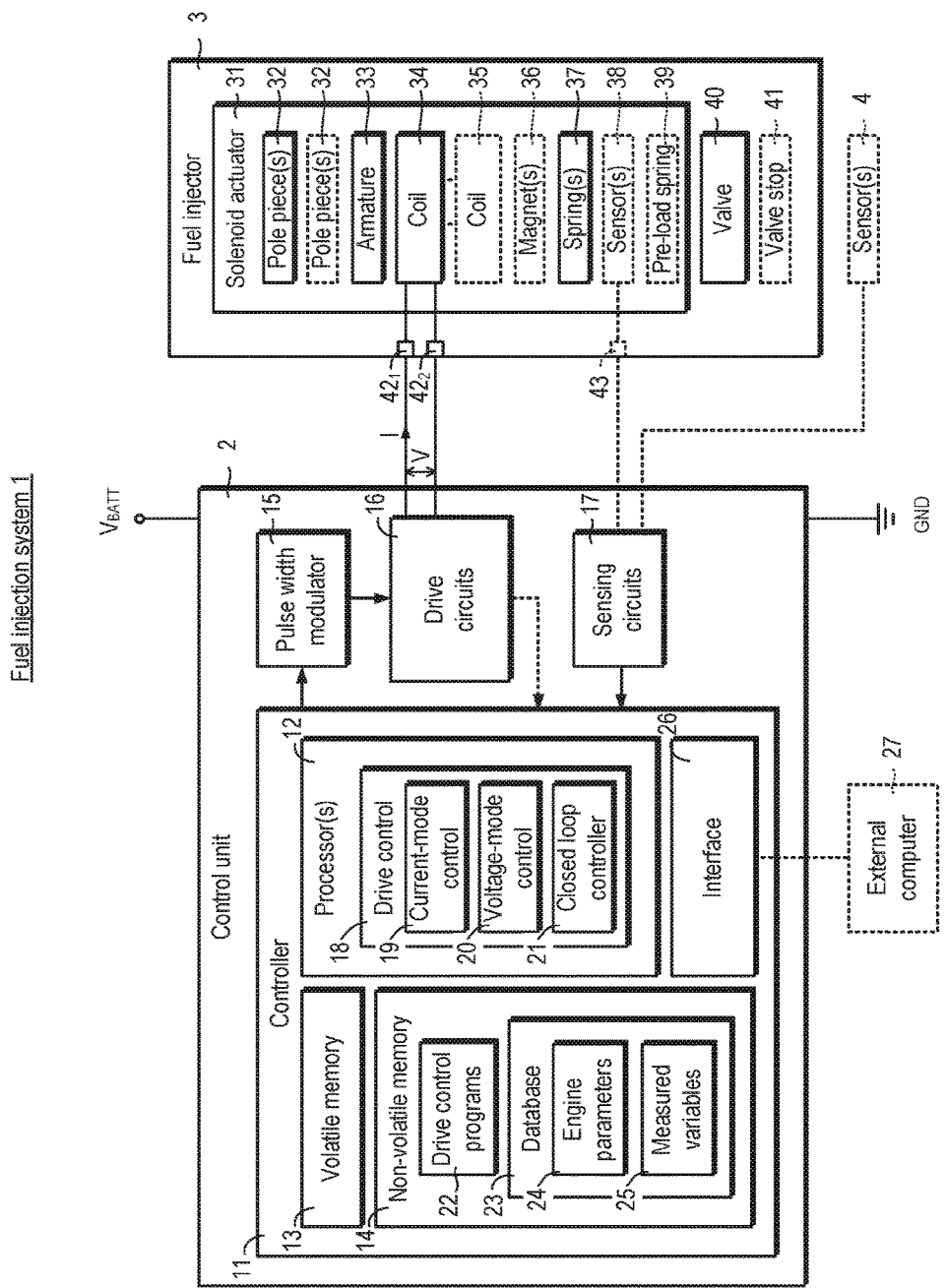
FIG. 1 is a schematic block diagram of a fuel injection system which includes a control unit and a fuel injector which comprises a solenoid actuator.

Referring to FIG. 1, a fuel injection system 1 is shown.

The fuel injection system 1 includes a control unit 2, for example in the form of a powertrain control module (PCM), and a set of one or more fuel injectors 3. For clarity, only one fuel injector 3 is shown. Operation of the one or more fuel injectors 3 may be monitored and controlled using a set of external sensors 4, such as vibration or pressure sensors.

The control unit 2 includes a controller 11 comprising one or more processors 12, volatile memory 13 and non-volatile memory 14, a pulse width modulator 15, drive circuits 16 comprising switching transistors (not shown) and sensing circuits 17 for pre-processing (for example, amplifying) signals from sensors 4.

The processor(s) 12 executes drive control 18 which includes a current-mode control 19, a voltage-mode control 20 and, optionally, closed-loop feedback control 21. As will be explained in more detail later, the fuel injector 3 can be selectively driven in current- or voltage-mode.

The non-volatile memory 14 stores a drive control program 22 which, when executed by the processor(s) 12 causes the processor(s) 12 to perform drive control 18. The non-volatile memory 14 also stored a database 23 which holds engine parameters 24 and parameter values 25, such as pressure and timings.

The controller 11 can be programmed via an interface 26 by an external computer 27 which may be removably connected to the control unit 2.

The controller 11 includes a bus system (not shown) and other functional blocks (not shown), such as timers, watchdog, I/O modules and interrupt control.

The controller 11 need not be microcontroller, but can be, for example, field programmable gate array or computer system.

Referring to FIG. 1, the fuel injector 3 includes a solenoid actuator 31 which consists of at least one pole piece 32, an armature 33, a (first) electromagnetic coil 34 (which is also herein referred to as a "drive coil" or simply "coil"), an optional (second) electromagnetic coil 35, one or more optional permanent magnets 36, at least one spring 37, in-built sensors 38 and an optional pre-load spring 39.

The fuel injector 3 also includes a valve 40 (which may be inward- or outward-opening) and an optional open valve stop 41.

The fuel injector 3 has a first pair of terminals $42_1$, $42_2$ connected to the (first) electromagnetic coil 34 for operatively connecting the control unit 2, via a wiring loom (not shown), to the electromagnetic coil(s) 34, 35. If the optional (second) electromagnetic coil 35 is used, then this may be attached in series or parallel with the first) electromagnetic coil 34. Alternatively, it may be controlled separately. The fuel injector 3 may include additional terminals 43 for operatively connecting the control unit 2 to the optional in-built sensors.

The spring(s) 37 are arranged to exert a force on the armature 33 having a stiffness $k_{mech}$. As will be explained in more detail hereinafter, the magnitude of mechanical spring stiffness can vary with armature position. Furthermore, fuel in the injector 3 can also exert a changing force on the armature 33 as the valve 40 changes position and so contribute to stiffness $k_{hydr}$.

The permanent magnet(s) 36 can act to exert a force on the armature 33. This can be considered to be a magnetic spring a stiffness $k_{mag}$. As will be explained in more detail hereinafter, the magnitude of magnetic spring stiffness can vary with armature position.

The solenoid actuator 31 has spring(s) 37 having a value of combined spring stiffness $k_{mech}+k_{hydr}$ which generally greatly exceeds the magnetic spring stiffness $k_{mag}$.

The solenoid actuator 31 may be of a first type (herein referred to as a "simple solenoid actuator") which is not configured (for example, by virtue of not having permanent magnets) for flux-switched operation. Alternatively, the solenoid actuator 31 may be of a second type (herein referred to as a "flux-switched solenoid actuator"). Examples of simple and flux-switched solenoid actuators are described in WO 2011/058344 A1 and WO 2012/172351 A2 which are incorporated herein by reference.

As will be explained in more detail hereinafter, the control unit 2 can be used to operate the solenoid actuator 31 in partial lift mode.

Partial Lift

Figure 2:
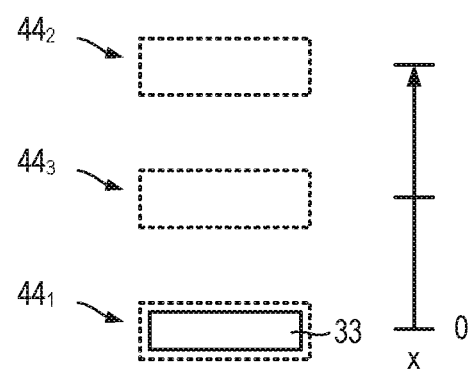
FIG. 2 illustrates partial lift.

Referring also to FIG. 2, the armature 33 can travel between first and second positions $44_1$, $44_2$ corresponding to the valve 40 being closed and being fully open respectively. The second position $44_2$ may be defined by virtue of the maximum force that the coil(s) 34, 35 can exert or, optionally, by virtue of a physical stop 41. As will be explained in more detail later, the armature 33 can be controllably positioned and held at a third position $44_3$ which may be between the first and second positions $44_1$, $44_2$ (herein referred to as "partial valve lift" or simply "partial lift").

Figure 3:
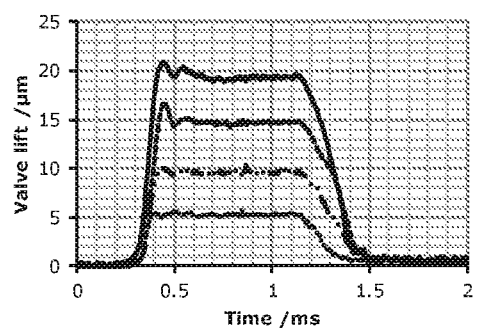
FIG. 3 shows experimentally-recorded lift profiles for a flux-switched solenoid actuator operating in partial lift mode.

Referring to FIG. 3, four plots of measured valve lift against time are shown for a first prototype flux-switched solenoid actuator (not shown). Each plot corresponds to a different drive profile. The first prototype flux-switched injector (herein labelled as "INJ4") is arranged to be an opening outward fuel valve with a dry armature having a solenoid actuator which has the same geometry as the actuator shown in FIG. 6, but with only one coil (near to the valve). The actuator has 40 turns. The actuator uses permanent magnets (not shown) formed from N48, poles pieces and armatures having 12 slots. The actuator has a working gap (not shown) of 60 μm and includes a shim (not shown) of 10 μm on open position. The mechanical spring constant is about 5 MNm$^{-1}$ and the magnetic stiffness is about 3.5 MNm$^{-1}$. The pole outer diameter (not shown) is 20 mm. The coil outer diameter (not shown) is 16 mm and the coil inner diameter (not shown) is 12.8 mm. The stroke (not shown) is 40 μm. A fuel valve (not shown) taken from a BMW GDI piezo injector is used.

Figure 4:
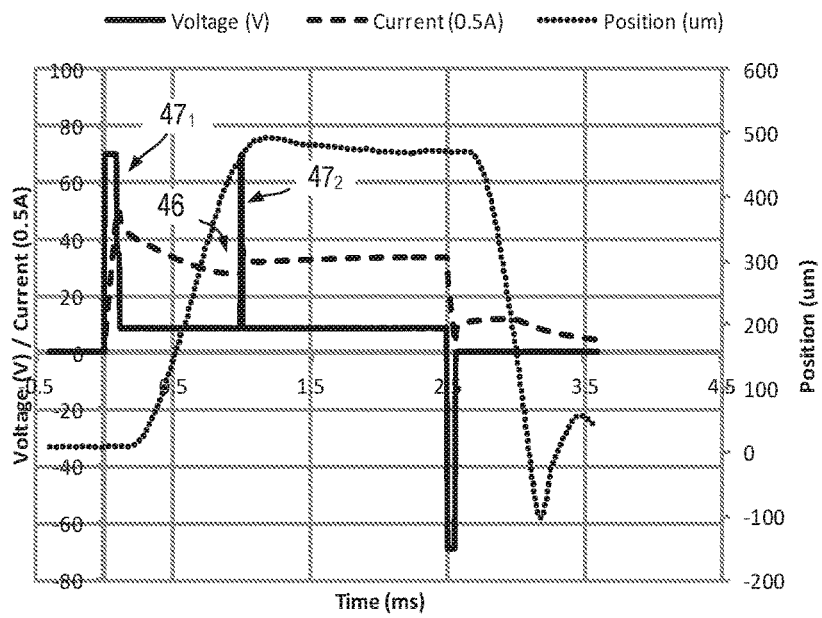
FIG. 4 shows an experimentally-recorded lift profile for a non-flux-switched solenoid actuator.

Referring to FIG. 4, a plot of measured valve lift against time is shown for a first non-flux switched solenoid actuator (not shown). The first prototype non-switched solenoid actuator (which may also be referred to by short label "SOL1") has a similar geometry to the solenoid actuator shown in FIG. 43. The first non-switched solenoid actuator has a gap (not shown) of 500 μm, a spring stiffness=75 kN/m, a stator outer diameter (not shown) of 25 mm, a pressure tube outer diameter (not shown) of 16 mm and an armature diameter (not shown) of 15 mm. The electromagnetic coil (not shown) has 40 turns. FIG. 4 also includes plots of applied voltage and measured current.

Figure 5:
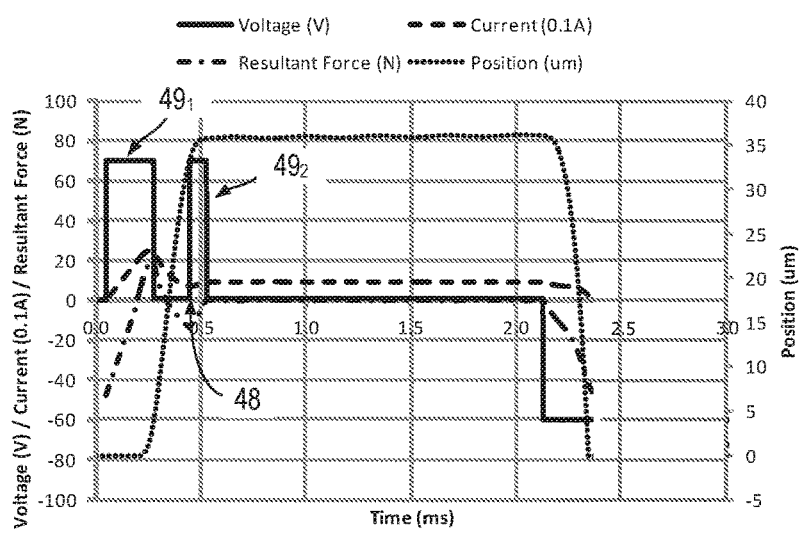
FIG. 5 shows a simulated lift profile for a non-flux-switched solenoid actuator.

Referring to FIG. 5, a plot of a simulated valve lift against time is shown for a first modelled non-flux switched solenoid actuator (not shown). The first modelled non-switched solenoid actuator (which may also be referred to by short label "SOLSIM") FIG. 5 also includes plots of simulated applied voltage, current and resultant force. The first modelled non-switched solenoid actuator has a spring stiffness of 50 kNm$^{-1}$, a stator outer diameter (not shown) of 22 mm. Poles pieces (not shown) and armature (not shown) are formed from 9CR chrome. The stator (not shown) is formed from Somaloy® 700 3P. A pressure tube outer diameter (not shown) is 12.7 mm.

Stable partial lift can be encouraged using one or more techniques.

Voltage Driven Operation

Effect of Voltage Mode on Partial Lift Performance

Referring again to FIGS. 1 and 2, low-impedance voltage drive can help to control operation if a solenoid actuator 31 in partial lift mode since it can make the solenoid actuator 31 stiffer. This is because low driver output impedance can constrain the position of the armature 33 when subjected to external perturbations. This can be especially beneficial for highly-coupled actuators, such as the flux-switched solenoid actuators described in WO 2011/058344 A1 and WO 2012/172351 A2. However, it can also be beneficial for simple solenoid actuators, i.e. non-flux-switched solenoid actuators.

Figure 6:
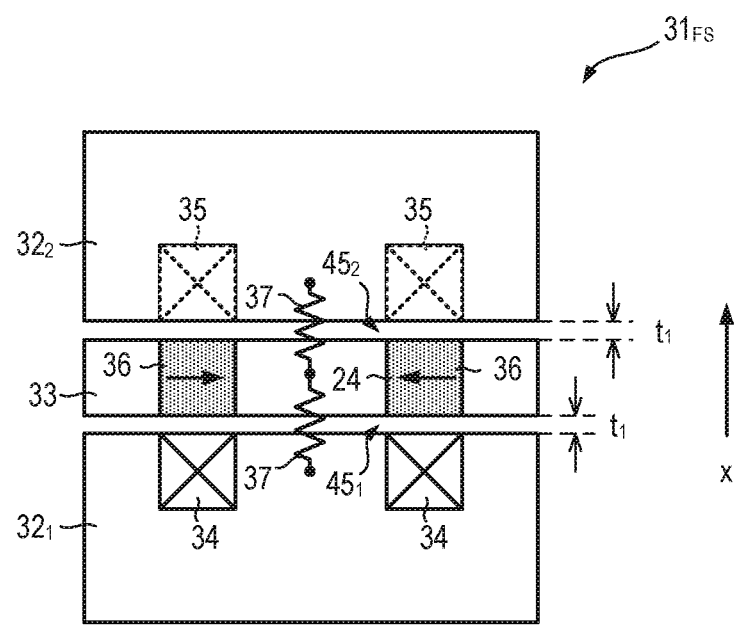
FIG. 6 illustrates a flux-switched solenoid actuator.

Referring to FIG. 6, the effect of low-impedance voltage drive can be understood by considering the effect of shorting a coil(s) 34, 34 in an idealised form of a flux-switched solenoid actuator $31_{FS}$ where the armature 33 lies between lower and upper pole pieces $32_1$, $32_2$ and lower and upper gaps $45_1$, $45_2$ are formed.

Assuming no winding resistance, flux is maintained in the two gaps $45_1$, $45_2$. If any perturbation attempts to move the armature 33, then the low-impedance drive mode allows current to flow, cancelling the flux changes. Thus, magnetic force on the armature 33 does not depend on position. Therefore, total spring stiffness depends on mechanical spring components and, if present, hydraulic spring components. There is effectively no magnetic spring and no increase in flux due to the solenoid actuator 31 closing.

A stiffer mechanical spring 37 can be used compensate for magnetic stiffness. However, once the actuator 31 is driven in voltage mode (and the coil(s) 34, 35 is/are effectively shorted), then, under this dynamic condition, the magnetic spring effectively no longer exists. The remaining contribution from the mechanical spring 37 makes the actuator stiffer.

Figure 7:
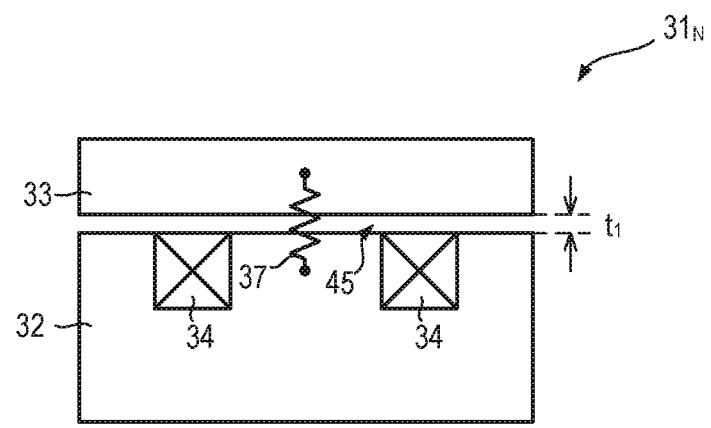
FIG. 7 illustrates non-flux-switched solenoid actuator.

Referring to FIG. 7, this effect also occurs in a simple (i.e. non-flux-switched) solenoid actuator $31_N$. Assuming a small gap 45 and that the time periods are sufficiently short that the coil 34 behaves as if it is superconducting, the flux does not change for small armature movements when the coil 34 is/are shorted.

Therefore, using voltage mode turns the non-linear magnetic force, which would ordinarily try to latch the armature 33 to a pole piece $32_1$, $32_2$, into a constant force.

In comparison, stable partial lift operation is harder to achieve for both types of solenoid actuator $31_{FS}$, $31_N$ using a high-impedance current drive since flux in the magnetic circuit is not fixed and so the armature 33 can be attracted to a pole.

Single Peak-and-Hold Drive Waveform (No Closed Loop Control)

Figure 8:
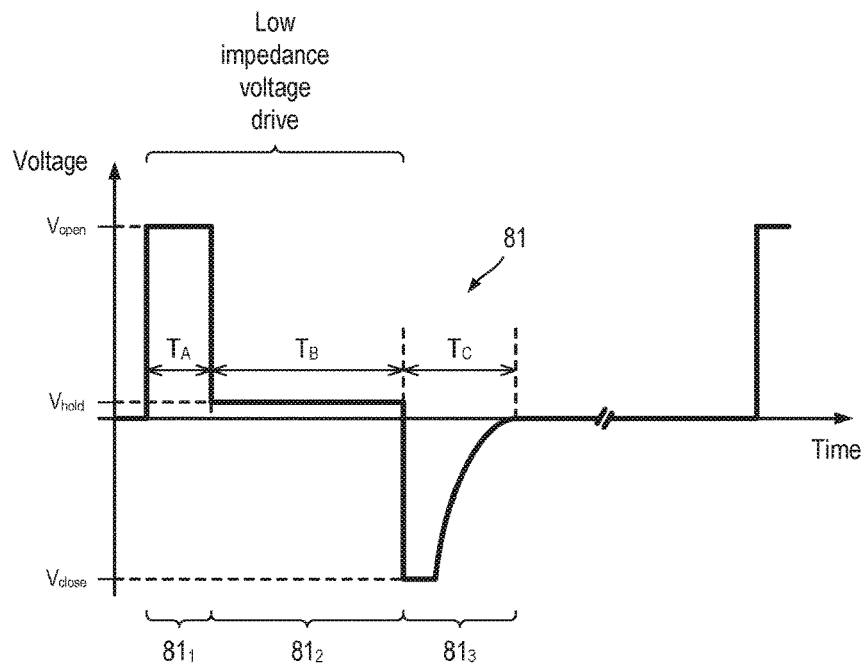
FIG. 8 illustrates a drive waveform which includes turn-on, hold and turn-off portions.

Referring to FIG. 8, a drive waveform 81 is shown which includes portions $81_1$, $81_2$ having a "peak-and-hold" profile.

Referring also to FIGS. 1 and 2, the waveform 81 includes a first waveform portion $81_1$ ("turn-on portion") during which a high, positive voltage, $V_{max}$, is applied for a period $T_A$. This "peak" or "boost pulse" serves to increase the current in the coil 34 rapidly, providing the magnetic force to begin to accelerate the armature 33 away from its closed position $44_1$. The duration of first waveform portion $81_1$ (herein referred to as a "boost time") controls the velocity of the armature 33 and, hence, the target lift, i.e. hold position $44_2$, $44_3$.

After the first waveform portion $81_1$, the waveform 81 includes a second waveform portion $81_2$ ("hold portion") during which a lower, positive voltage, $V_{hold}$, is applied for a period $T_B$. This causes the current in the coil 34 to drop, with further contributions from eddy currents (not shown) and back emfs (not shown) generated as the armature 33 moves. During this period, the inductance of the circuit is constantly changing. The hold voltage, $V_{hold}$, maintains a hold current, $I_{hold}$, necessary to provide enough magnetic force to act against forces (e.g. mechanical spring(s) or hydraulic effects) urging the actuator into a closed position. To avoid a slow reduction in the armature position over time during injection, the voltage can be held at a value that compensates for the resistive drop across the coil 34 and wiring due to the approximate hold current desired. The duration $T_B$ of the hold portion $81_2$ sets the duration of injection.

During the hold phase $81_2$, the control unit 2 drives voltage the solenoid actuator 31 in a low-impedance, voltage mode, as opposed to a high-impedance, current mode.

After the second waveform portion $81_2$, the waveform 81 includes a third waveform portion $81_3$ ("turn-off portion"). No voltage need be applied during the turn-off portion. However, due to a back emf a negative voltage can appear. In some cases, a negative voltage waveform can be applied. During the turn-off portion $81_3$, the armature 33 is urged by the spring(s) 37 back to the closed position $44_1$ or to drive the armature 33 back to the closed position $44_1$.

Further Drive Waveforms

—Double Boost Pulse—

Figure 9:
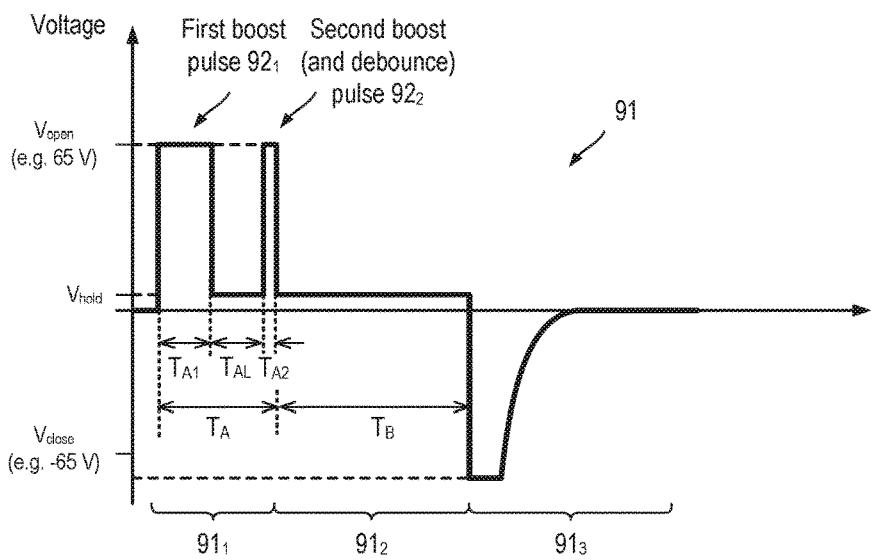
FIG. 9 illustrates a drive waveform which includes turn-on, hold and turn-off portions and which includes a double boost pulses in the turn-on portion.

Referring to FIG. 9, a drive waveform 91 is shown which includes a "double boost" profile.

The drive waveform 91 is similar to the drive waveform 81 shown in FIG. 8 in that it comprises turn-on, hold and turn off portions $9_1$, $91_2$, $91_3$.

In the turn-on portion $91_1$, the voltage drive waveform 91 includes first and second boost pulses $92_1$, $92_2$. In this example, the boost voltage, $V_{max}$, is 65 volts, although other values are possible.

This turn-on profile $91_1$ can be particularly useful when used for partial lift. It can also be useful when used for full lift since it can reduce acoustic noise by helping to reduce contact velocity with an open stop on opening. By the end of the turn-on portion $91_1$, the armature 33 (FIG. 1) is in the correct hold position and at rest, and the current in the coil 34 (FIG. 1) equals hold current.

The first boost pulse $92_1$ can serve to rapidly increase the current in the coil 34 (FIG. 1), providing the magnetic force to begin to accelerate the armature 33 away from its closed position $44_1$ (FIG. 2). The length of this portion controls velocity of the armature and, thus, the target lift (or hold position). Different partial lift positions can be selected by varying the duration of this pulse, $T_{A1}$.

After the first boost pulse $92_1$, the voltage can be lowered to exploit back-emf voltage braking. Currents flow from the back-emf which slows down the armature 33.

After a short period, $T_{AL}$, a second boost pulse $92_2$ (also referred to as a "de-bounce pulse") of high voltage is applied to increase the opening force/current up to the level needed to hold the armature at the peak of its travel. This pulse acts to remove the oscillations of the armature as it reaches its target position.

The constant voltage hold mode can then be entered for the remainder of the injection duration, for example, by using an average voltage effected using pulse width modulation between battery voltage, $V_{BATT}$, and ground.

The de-bounce pulse width, $T_{A2}$, and the delay, $T_{AL}$, from the initial boost pulse $92_1$ to the de-bounce pulse $92_2$ are set to match the phase and amplitude of the armature oscillation. A fixed value of de-bounce pulse duration for a given injector can give good results for a variety of boost times. Thus, it may not be necessary to adjust this when changing the drive waveform to select a different valve lift.

Figure 10:
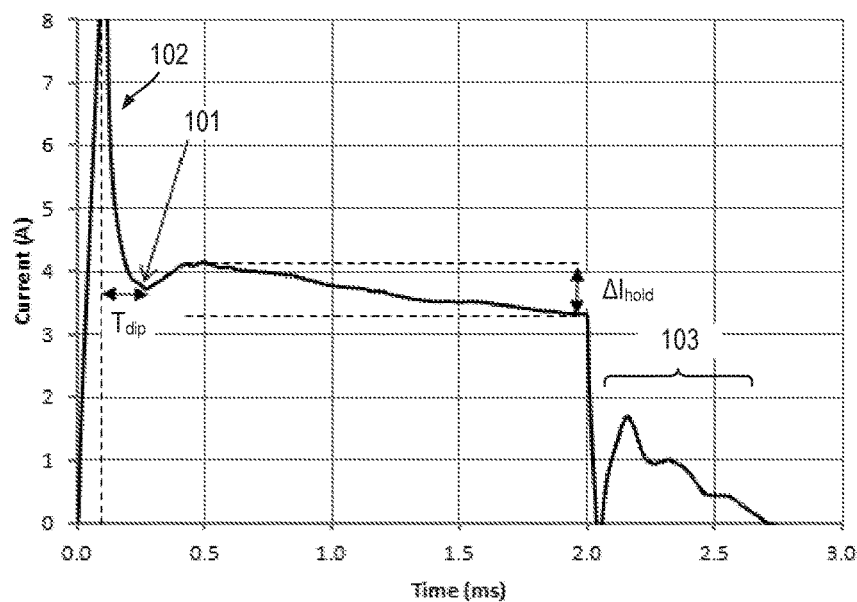
FIG. 10 is a plot of measured current against time and shows a current dip after a boost pulse and drop in hold current over injection duration.

Referring to FIG. 10, a plot of experimentally-measured current is shown when driving the first prototype flux-switched actuator injector INJ4 (not shown) using a single boost-and-hold voltage drive.

A current minimum (or "dip") 101 is present after a first boost pulse 102. Herein, a current minimum is also referred to as "$I_{dip}$". Setting the start of the de-bounce pulse (not shown) to coincide with the current dip 101 gives good results, as shown in FIG. 3. Reasonable results can be obtained by selecting a fixed delay between the boost and de-bounce pulses such that only the duration of the first boost pulse need be varied to obtain different partial lift positions.

Referring again to FIG. 4, a plot of experimentally-measured current is shown when driving a non-flux switched solenoid actuator 31 with a dual boost pulse.

A current dip 46 is seen following a first boost pulse viand a second boost pulse $47_2$ is applied coincident with the current dip 46.

FIG. 5 shows a similar drive arrangement being simulated for the first simulated non-flux switched solenoid actuator SOLSIM (not shown). There is a current dip 48 following a first boost pulse $49_1$ and a second boost pulse $49_2$ is applied coincident with the current dip 48.

—Negative Current and Soft Closing—

A drive profile can be adapted to allow faster closure speeds and/or to cause a softer landing with reduced bounce as the valve 40 (FIG. 1) impacts a closing stop 41 (FIG. 1).

Referring again to FIG. 8, the drive waveform 81 includes a turn-off portion $81_3$ comprising a single, negative voltage pulse having a duration $T_C$. The singe pulse can have the same length as the first boost pulse $81_1$, i.e. $T_C=T_A$, and can have the same magnitude the first boost pulse $81_1$ but of opposite polarity, i.e. $V_{close}=-V_{open}$. The negative pulse allows current to be quickly driven back to zero, allowing the force of a mechanical spring to urge the armature 33 (FIG. 1) back to the closed position. For some solenoid actuators, a negative current can provide extra force in the closing direction which can help to seat the valve 40 (FIG. 1) faster and even hold it closed against forces attempting to open it, such as those from combustion on an inward-opening injector.

A double negative pulses can be used.

Figure 11:
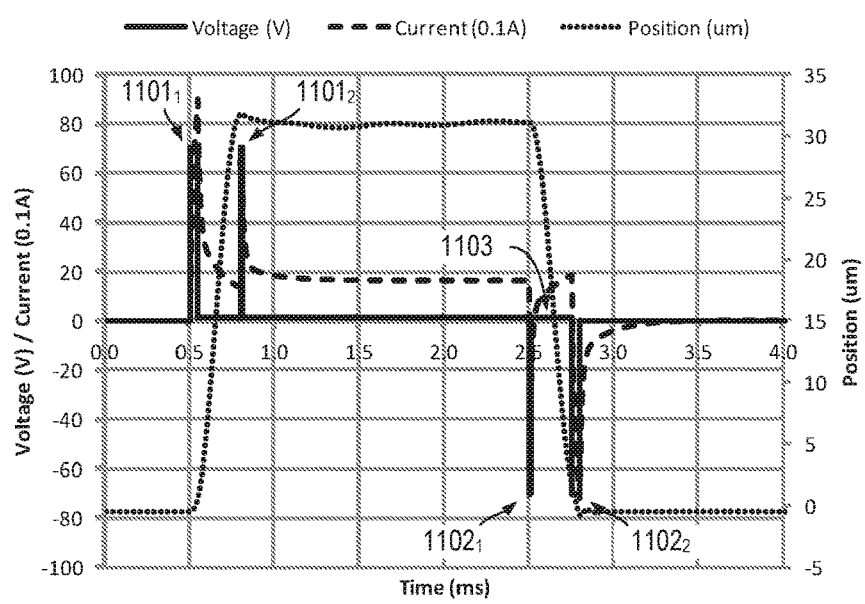
FIG. 11 shows a simulated example of voltage drive with opening and closing waveforms for a flux-switched solenoid actuator.
Figure 12:
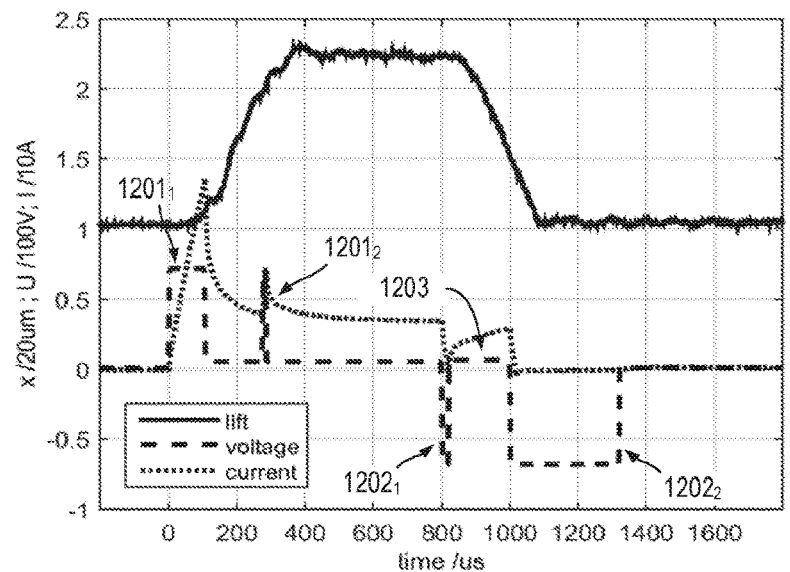
FIG. 12 shows experimentally-recorded lift, voltage and current waveforms with opening and closing debounce pulses for a flux-switched solenoid actuator.

FIGS. 11 and 12 illustrate first and second double-pulse closing waveforms. The simulated flux-switched actuator FSAT SIM (not shown) takes the form of flux-switched actuator with a similar configuration to that shown in FIG. 42. The actuator has a stroke (not shown) of 40 μm and there are 40 turns. The actuator has slotted poles and armature (not shown). The armature outer diameter (not shown) is 13 mm and runs inside a steel pressure tube having an outer diameter (not shown) of 14 mm. The overall mechanical spring stiffness is 1.5 $MNm^{-1}$ and the magnetic stiffness is 1.2 $MNm^{-1}$. The stator outer diameter (approximately the outer diameter of the injector body) is 21 mm.

Referring to FIG. 11, a voltage drive waveform includes first and second boost pulses $1101_1$, $1101_2$ and first and second closing pulses $1102_1$, $1102_2$. The first and second closing pulses $1102_1$, $1102_2$ are separated by a period 1103 at a low, positive hold voltage.

Referring to FIG. 12, a voltage drive waveform includes first and second boost pulses $1201_1$, $1201_2$ and first and second closing pulses $1202_1$, $1202_2$. The first and second closing pulses $1202_1$, $1202_2$ are separated by a period 1203 at a low, positive hold voltage. The voltage drive waveform is obtained from a second prototype injector INJ 1 (not shown). The second prototype injector INJ 1 is arranged to be an opening outward fuel valve with a dry armature having the same geometry as the actuator shown in FIG. 6, but with only one coil (near to the valve). The actuator has 40 turns. The actuator uses N48 magnets, six slots in the poles and armature (not shown). The actuator (not shown) has a working gap of 40 μm. The mechanical spring constant is about 7.5 $MNm^{-1}$ (plus about 0.5 $MNm^{-1}$ when in the valve) and the magnetic stiffness is about 5 $MNm^{-1}$. The pole outer diameter (not shown) is 20 mm. The coil outer diameter (not shown) is 16 mm and the coil inner diameter (not shown) is 12.8 mm. A fuel valve taken from a BMW GDI piezo injector is used.

Referring to FIGS. 1, 2, 11 and 12, the first negative pulse $1102_1$, $1202_1$ is used to drive current toward zero and begin accelerating the armature 33 back towards the closed position $44_1$. A period of hold voltage 1103, 1203 is then applied during the closing movement to discourage acceleration of the armature 33 before hitting the close stop. This sets the closing time of the valve 40. This works by the initial negative voltage pulse $1102_1$, $1202_1$ changing the pole gap fields to move the equilibrium position of the armature 33 half way toward the closed position $44_1$. The armature 33 accelerates down, overshooting the midpoint, and coming to rest at the closed position $44_1$. A second negative pulse $1102_2$, $1202_2$ is applied to remove remaining current and hold the valve 40 in the closed position without bounce.

The turn-off waveform portion can be simply an inverted version of the turn-on waveform portion. Thus, no additional feedback information is required to determine the turn-off waveform.

In the examples shown in FIGS. 11 and 12, the first negative pulse $1102_1$, $1202_1$ has the opposite polarity and the same length as the de-bounce pulse $1101_2$, $1201_2$. The second off-pulse $1102_2$, $1202_2$ has the opposite polarity and can have the same length as the first boost pulse $1101_1$, $1201_1$.

—Pulse Width Modulation (PWM)—

During turn-on, it may be desirable to apply the maximum voltage available. In these circumstances, the effective opening voltage can be adjusted by varying the duration of the maximum voltage phase. Lower voltage sections, such as the hold portion, can be implemented by pulse width modulation) between 0 volts and the battery voltage, $V_{BATT}$. The PWM ratio is preferably corrected for variations in $V_{BATT}$.

Figure 13:
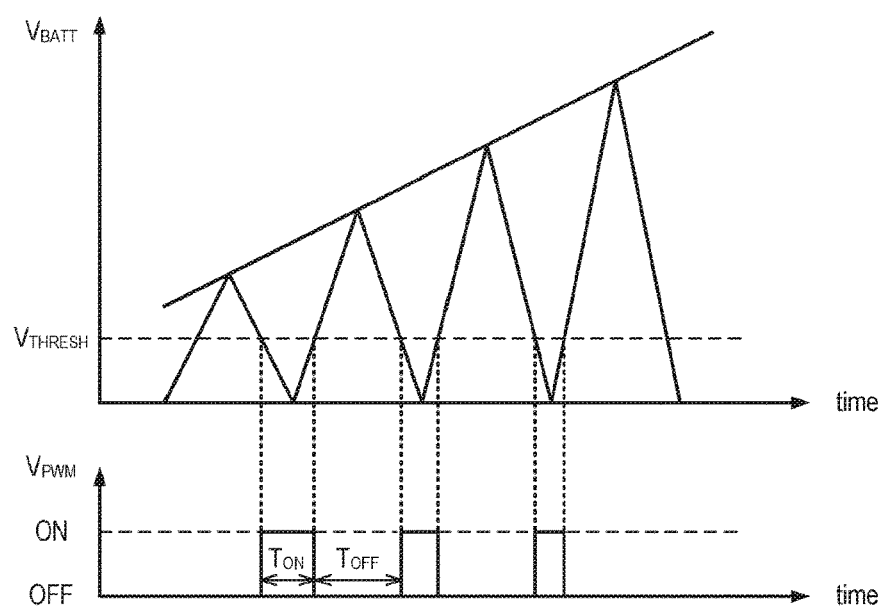
FIG. 13 illustrates how pulse-width modulation can be adapted to adjust for variations in battery voltage.

FIG. 13 shows a simple time-varying profile of battery voltage $V_{BATT}$. The battery voltage, $V_{BATT}$, can decrease and can vary rapidly, for example, when starting a motor vehicle. As shown in FIG. 13, the control unit 2 (FIG. 1) can generate a triangle wave of fixed frequency which oscillates between ground and battery voltage $V_{BATT}$ and can set a trigger threshold for the pulse-width modulator 15 (FIG. 1).

As shown in FIG. 13, the on period $T_{ON}$ decreases as battery voltage $V_{BATT}$ increases. Thus, the same average PWM voltage can be output even if battery voltage $V_{BATT}$ varies.

—Easing Accuracy Requirements—

Longer and lower voltage pulses can be easier to control as time resolution requirements are reduced. The voltage driver 20 (FIG. 1) and the number of turns on the drive coil 34 can be adjusted to effect this.

Calculating Voltage Drive Parameters

—Two-Pulse Opening/Closing Sequence—

Figure 14:
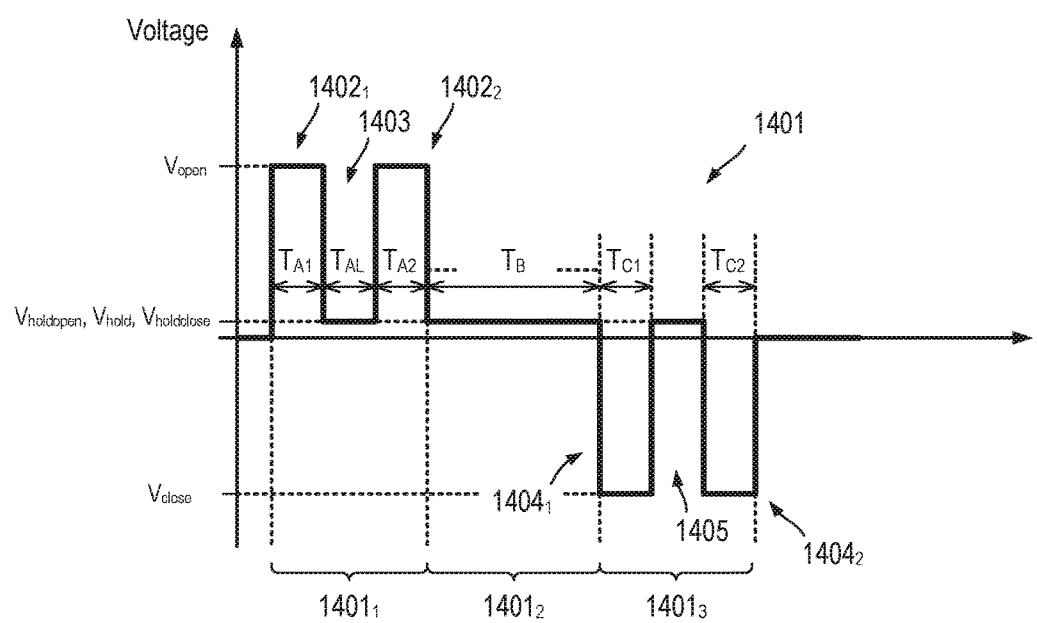
FIG. 14 illustrates a drive waveform which includes turn-on, hold and turn-off portions and which includes a double boost pulses in the turn-on portion and double negative pulses in the turn-off portion.

Referring to FIG. 14, a drive waveform 1401 for effecting two-pulse opening and two-pulse closing for a flux-switched solenoid actuator 31 is shown. The drive waveform 1401 includes a turn-on portion $1401_1$, a hold portion $1401_2$ and a turn-off portion $1401_3$.

The turn-on portion $1401_1$ includes first and second positive voltage pulses $1402_1$, $1402_2$ separated by a low voltage region 1403. The turn-on portion $1401_1$ causes the armature 33 (FIG. 2) to reach a partial lift position $44_3$ (FIG. 2). The first and second positive high voltage pulses $1402_1$, $1402_2$ have an open (or "boost") voltage, $V_{open}$.

The hold portion $1401_2$ maintains the partial lift position $44_3$ (FIG. 2) at a hold voltage $V_{hold}$. The low voltage region 1403 in the turn-on portion also has a voltage equal to the hold voltage $V_{hold}$.

The turn-off portion $1401_3$ includes first and second negative pulses $1404_1$, $1404_2$ separated by a low, positive voltage region 1405. The turn-off portion $1401_3$ returns the armature 33 to the closed position $44_1$ (FIG. 2).

The duration, $T_{A1}$, of the first positive voltage pulse $1402_1$ depends on the desired lift, x, and static force, F, acting on the armature 33. Part of the force, F, may be transmitted via the pintle due to fuel pressure and other effects.

In the following calculation, eddy currents, coercivity, hydraulic and mechanical damping are ignored and it is assumed that coil resistance R has little effect on durations $T_{A1}$ and $T_{A2}$, i.e. $(L/R) \gg T_{A1}, T_{A2}$.

The duration, $T_{A1}$, can be calculated using equation 2 below, namely:

$$V_{S1} = (L/M) \cdot (F_{seat} + k \cdot (x/2)) \tag{1}$$

where L is the inductance of the coil, M is the motor constant, $F_{seat}$ is the sealing force, k is the combined spring constant, $k = k_s + k_m$, where $k_s$ is the mechanical spring constant and k is the hydraulic spring constant and x is the lift.

$$T_{A1} = (1/V_B) \cdot (L/M) \cdot (F_{seat} + k \cdot (x/2)) = T_{C2} \tag{2}$$

where $V_B$ is the boost voltage (i.e. of a first boost pulse $1402_1$).

Likewise duration, $T_{A2}$, can be calculated using equation 4 below, namely:

$$V_{S2} = (L/M) \cdot (k \cdot (x/2)) \tag{3}$$

where L is the inductance of the coil, M is the motor constant, $F_{seat}$ is the sealing form, k is the combined spring constant, $k = k_s + k_m$ where $k_s$ is the mechanical spring constant and k is the hydraulic spring constant and x is the lift.

$$T_{A2} = (1/V_B) \cdot (L/M) \cdot (k \cdot (x/2)) = T_{C1} \tag{4}$$

The hold voltage $V_{hold}$ can be calculated using:

$$V_{hold} = (R/M) \cdot (F_{seat} + (k + k_m) \cdot x) \tag{5}$$

where R is coil resistance.

The response of the solenoid actuator to the initial boost pulse $1402_1$ is at first independent of the targeted lift, x. Subsequently the armature 33 slows down just shortly before the desired lift is reached and the second "de-bounce" pulse $1402_2$ is applied. Since the slope of the opening edge of the lift trace is roughly constant over a sufficiently large interval, the delay to the second (de-bounce) pulse may be approximated linearly from the targeted lift:

$$T_{AL} = \pi (m/k)^{0.5} - T_{A2} \tag{6}$$

where m is the effective mass of the armature and pintle.

To effect soft closure of the valve 40 at the end of the injection cycle 1401, a closing back-boost $1404_1$ of suitable fixed-length $T_{C1}$ is applied which is independent of lift and static force and is used to partly remove the hold current from the coil. This pulse $1404_1$ quasi-instantaneously causes the armature 33 (FIG. 2) to move towards the closed position $44_1$ (FIG. 2).

On a flux-switched solenoid actuator, the motor constant M is a relatively well-defined number as long as the actuator remains unsaturated. There is some fall off with frequency due to eddy effects depending on the design. To first order, for high permeability poles:

$$M = n \cdot 2 \cdot B_{centre}/t \cdot A \tag{7}$$

where M is the motor constant, A is the active pole area (in $m^2$), t is the total air gap (in m) around the coil magnetic circuit which includes top and bottom working gaps and a contribution from the reluctance of the pole pieces, $B_{centre}$ is the magnet bias field (in T) in the pole gaps with the armature centred, n is the number of coil turns.

For example for a 1 $cm^2$ pole area, 100 μm total gap, 0.5 T bias with the armature centred and 40 turns, then the motor constant is $40 \times 2 \times 0.5/10^{-4} \times 10^{-4} = 40$ $NA^{-1}$ or 40 $V(m/s)^{-1}$.

For a solenoid without permanent magnets, a temporary value of M is given by:

$$M = n \cdot B_{gap}/t \cdot A \tag{8}$$

The gap t equal the actual working gap plus an effective contribution getting the flux into the armature from the outer pole plus an amount due to the finite permeability of the poles. As both gap and $B_{gap}$ vary with position and current of the solenoid, the value of M varies, making it less helpful as a tool, than in the flux-switched solenoid actuator case.

Operation of a solenoid without permanent magnets can be considered in terms of flux linked with the coil being equal to the volt·second integral of the drive waveform (ignoring or correcting for resistance). Thus, the magnetic force $F_{mag}$ is given by:

$$F_{mag} = (\text{Volt} \cdot \text{seconds})^2/(2 \cdot n \cdot \text{area} \cdot U_0) \tag{9}$$

assuming no flux leakage, i.e. all the flux through the coil passes through the working gap. Under voltage drive, the force is independent of the instantaneous gap or armature position of the solenoid. The armature position is given by the ratio of current to flux, i.e. current/(volt·seconds), with a polarity that drops as the valve opens. In this way, an $I_{dip}$ measurement within a boost hold waveform gives a measure of valve lift in the same way as with a flux-switched solenoid actuator injector. The $I_{dip}$ reading is divided by the boost time, as this will be varied by the control loop maintaining independence of performance versus injector load. If the control loop trimming is driven by setting a base current, the flux set by this is given by the air gap when the valve is seated and so represents a fixed addition to the volt seconds from the boost pulse. The base current can be positive or negative and the force offset depends linearly on the base current as it is varied through zero, in spite of the actuator having no permanent magnet bias or polarity dependence.

Note on Injector Drive

The correct amplifier transfer characteristics and output impedance for properly converting a rectangular lift request waveform into injector drive can be difficult. This is because injector behaviour can be non-linear as the injector starts with the valve sitting on the valve seat, then being free to move, then possibly hitting an endstop.

To handle the free portion, it is preferred to strip out energy at the mechanical resonance frequency of the spring mass system formed by the armature and the spring. This will turn a rectangular waveform into the type of force profiles shown herein.

—Accounting for Hydraulic Effects on De-Bounce Delay—

In simple cases, the de-bounce delay time, $T_{AL}$, can be fixed for all boost times, $T_{A1}$, with reasonable results. However, if the hydraulic stiffness of the system changes with valve lift, the optimal de-bounce delay time $T_{AL}$ will change with boost time.

Control Unit Implementation

—Low Impedance Voltage Drive Using Control Unit 2—

Referring again to FIG. 1, the control unit 2 is arranged to operate in a low-impedance voltage drive mode during the hold phase by varying the mark space ratio between the voltage source, in this case $V_{BATT}$, and ground GND to give the desired average voltage, rather than switching between them to maintain a preset current.

Current can then be controlled on a slower loop, typically by adjusting the voltage profile (i.e. the switching mark space periods) of the following pulses to get the desired current waveform. This last loop permits operation over the wide range of coil resistance with temperature.

—Double Boost Using Control Unit 2—

Referring to FIGS. 1 and 14, an initial boost pulse $1402_1$ at, for example 65 volts, for a fixed time or limited to a peak current is applied, followed by a set time at zero or close to zero volts, for example $V_{BATT}$, and then a short second boost pulse $1402_2$ to prevent the armature falling back. These timings can either be preset, tripped by reaching maximum current limits, or preset times adjusted by maximum/minimum currents attained on previous pulses, i.e. use feed forward to the next pulse to adjust voltage set points to keep $I_{hold}$ (average) to the desired value.

To fix timings or to allow timings to depend on settings derived from measurements on previous pulse(s), it may be necessary to set the current targets to levels that are not reached before the end of the drive phase timeout.

A control unit 2 can be programmed to implement boost and de-bounce pulses $1402_1$, $1402_2$ via interface 26.

As hereinbefore described, improved dynamic performance can be achieved by using voltage mode control during hold phase. This can be achieved by setting the PWM waveform to the desired voltage, corrected for instantaneous battery voltage (as shown in FIG. 13). This change does not affect the power stage 16 of the driver.

—Soft Closing Using Control Unit 2—

Figure 15:
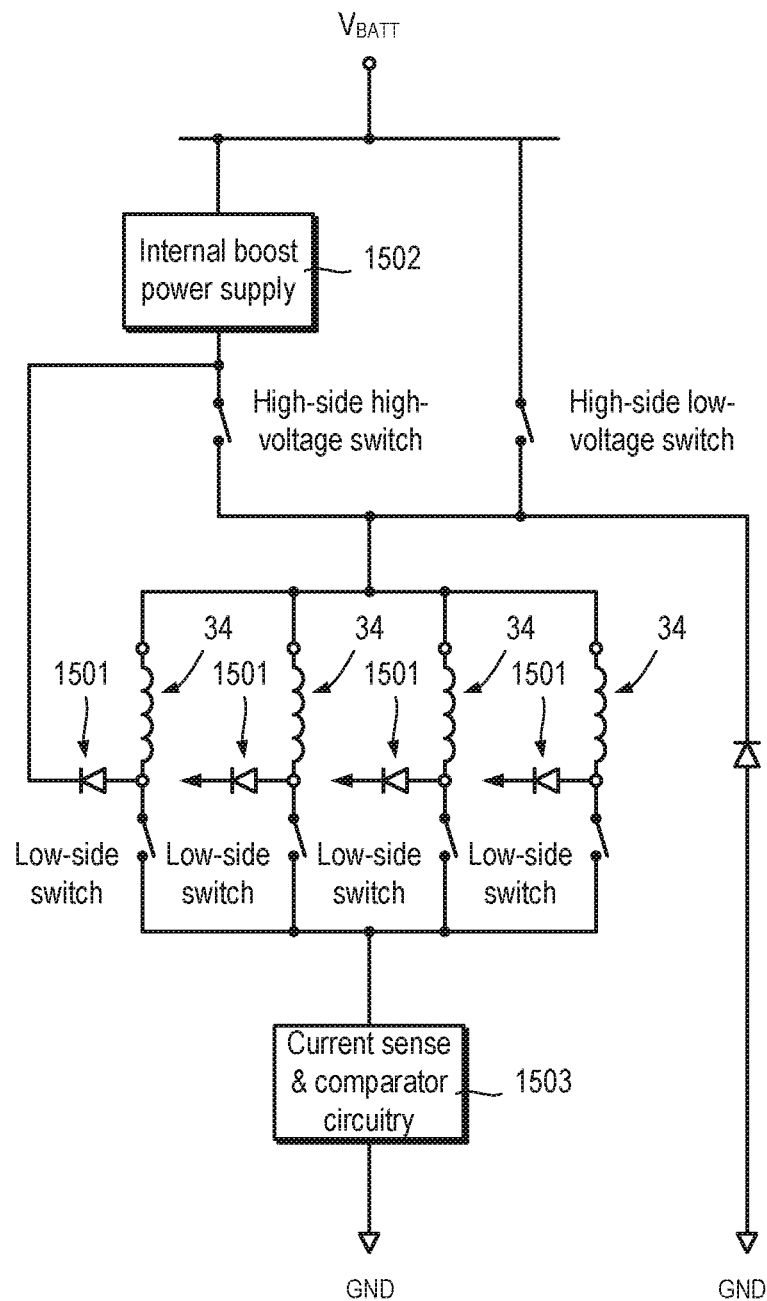
FIG. 15 schematically illustrates a simple driver circuit.

Referring to FIG. 15, the negative voltage portions may be implemented by a fast close method, open circuiting the coil 34 with a diode clamp 1501 on the back emf to the boost voltage supply 1502. The low positive hold voltage between the two negative voltage portions can be replaced by zero volts if desired with little effect on performance.

Multi Pulse Drive Correction

Referring again to FIGS. 1, 2 and 6, when injection cycles are closely spaced, residual flux may remain in the solenoid actuator 31 resulting in the armature 33 lifting more than expected. The control unit 2 can be programmed to produce drive waveforms which leave net zero balance of flux in the magnetic circuit of the solenoid actuator 31, such that any residual fields decay quickly.

A negative voltage can be applied to the solenoid actuator 31. This can result from a back emf from the coil 34 when the current is turned off. The negative voltage is applied longer than the back emf would last, resulting in negative current flow.

For short pulses, the integrated voltage applied across the coil 34 is close to zero, especially when coil resistance losses are accounted for. This results, at the end of the waveform, in flux going through the solenoid actuator 31 in the opposite direction to when it is (normally) driven. After the end of the pulse, this flux rapidly cancels itself out with the residual flux in the normal operating direction deeper in the soft material, thus returning the solenoid to a neutral state faster than with a normal waveform which just clamps the current to zero. This reduces the effect on subsequent pulses in a multi pulse burst which otherwise tends to lead to more fuel than expected on subsequent pulses rising as the gap between them reduces.

Referring to FIG. 16, plots of measured valve integral of displacement against time for a first injection and for a second injection which follows the first injection after a time delay are shown for a prototype flux-switched actuator INJ 1 (not shown) with 60% partial lift and without any correction. The voltage drive waveform is obtained from the prototype injector INJ 1 hereinbefore described.

As shown in FIG. 16, as the injections become more closely spaced, the second injection waveform result in a greater valve displacement.

This behaviour can be ameliorated by trimming a drive waveform, i.e. delaying a subsequent boost pulse to compensate for the lack of negative current at the end of the previous drive waveform, to minimise interaction between the injections.

FIGS. 17a and 17b show the result of trimming the drive waveforms to minimise interaction between the pulses using 78 volts and 80 volts respectively. The voltage drive waveform is obtained from the prototype injector INJ 1 hereinbefore described.

Figure 18:
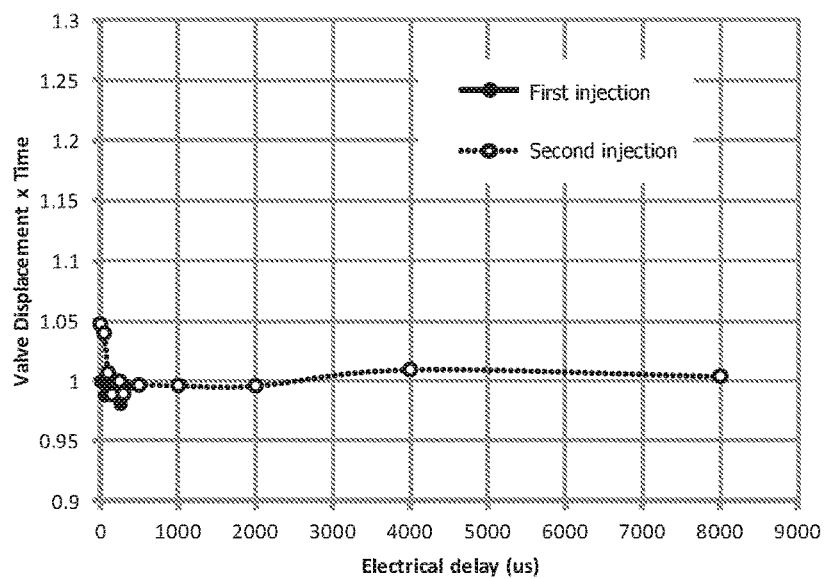
FIG. 18 illustrates dual-pulse behaviour for a flux-switched solenoid actuator with 60% partial lift with drive waveform timing and dual closing pulses in which 0 µs electrical delay corresponds to 70 µs hydraulic delay.
Figure 19:
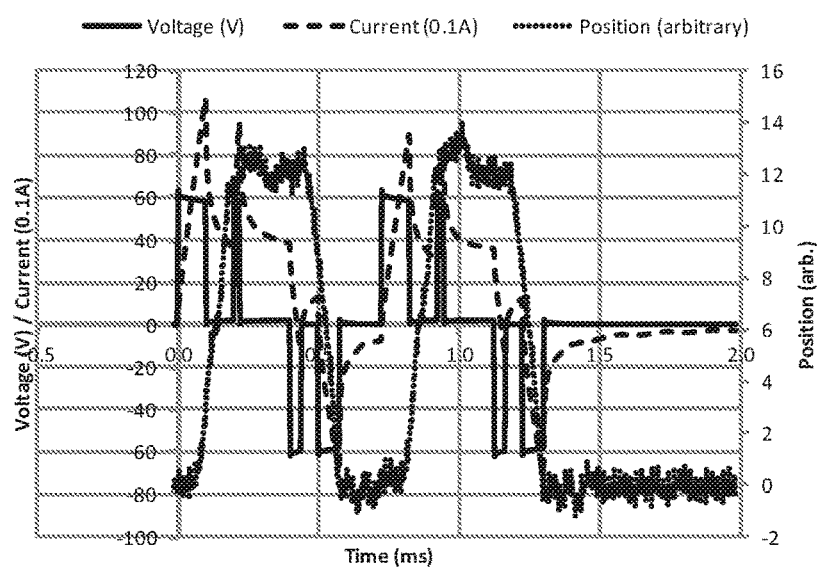
FIG. 19 illustrates dual-pulse waveforms for a flux-switched solenoid actuator using identical drive waveforms for first and second pulses and both using double closing waveform.

FIG. 18 shows similar results using a trimmed drive waveform which additionally includes a double closing pulse. FIG. 19 shows the waveform of the drive waveform. The voltage drive waveform is obtained from the prototype injector INJ 1 hereinbefore described.

Figure 20:
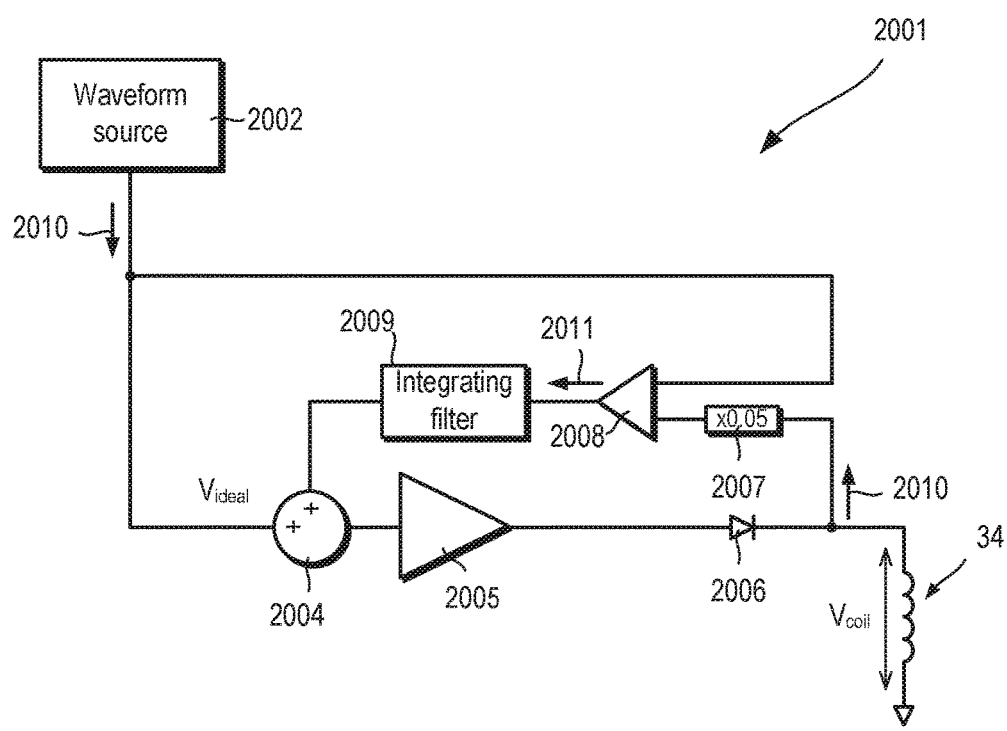
FIG. 20 is a schematic block diagram of a drive error filter circuit for trimming voltage waveform.

FIG. 20 illustrates a circuit 2001 which can be used to implement trimming without the use of negative currents. The circuit 2001 can be implemented digitally using the control unit 2.

A waveform source 2002 generates an ideal (i.e. an uncorrected) voltage waveform 2003. The waveform source 2002 can be limited to provide only single polarity (i.e. positive) current.

The circuit 2002 includes an adder 2004, a drive amplifier 2005, a diode 2006, an error amplifier 2007, a pre-scaler 2007, an error amplifier 2008 and an integrating filter 2009.

The error amplifier 2008 effectively compares the difference between the ideal voltage and the voltage across the injector coil 34.

The voltage waveform 2003 is fed into to first input of the adder 2004. The output of the adder 2004 is fed into the drive amplifier 2005 having a gain, a, and the output is fed, via the rectifying diode 2006 to the coil 34.

The rectified output 2010 is fed, via the pre-scaler 2007 which amplifies the signal by a factor, $1/\alpha$, to the error amplifier 2008. The voltage waveform 2003 is also fed into the error amplifier 2008. The output 2011, which is a voltage error, is filtered by integrating filter 2009 and the output of the filter 2009 is fed into the adder 2004.

The driver amplifier can have a gain of about 20 (i.e. $\alpha=20$) and the integrating filter 1908 has a decay time $\tau_{filter}$ about the same as the field decay time $\tau_{coil}$ of the coil 34 of about 1 to 2 ms.

Thus, the circuit 2001 can be used to reduce the amplitude of boost pulses of subsequent injection cycles, especially at the start.

As a further step, the error amplifier output can be used to hold the drive state at zero until the error has reduced, thereby delaying the start of next boost pulse and providing the modified timing for a set of boost/hold switches (not shown).

Figure 21:
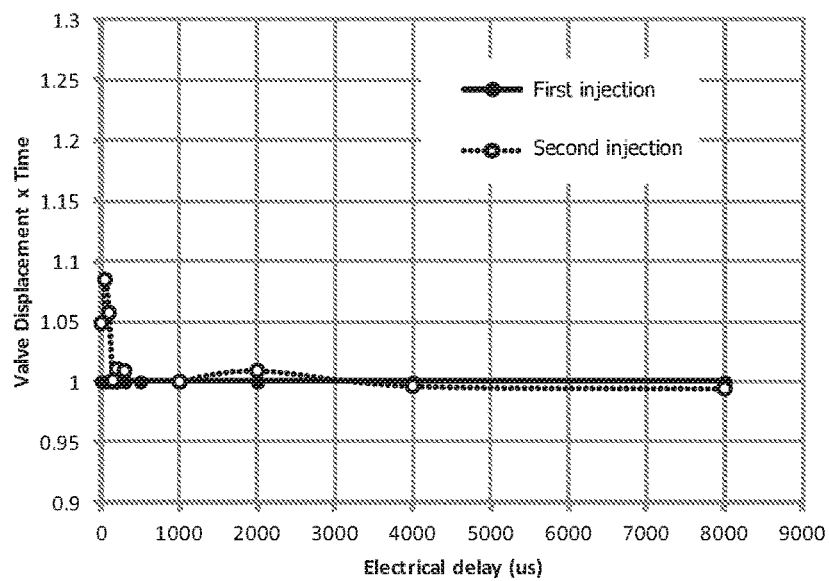
FIG. 21 illustrates dual-pulse behaviour for a flux-switched solenoid actuator using a drive error filter.

FIG. 21 shows reduced interactions between first and second pulses of a dual pulse injection (i.e. two injections) when using such a filter in a flux-switch solenoid actuator 31. The voltage drive waveform is obtained from the prototype injector INJ 1 hereinbefore described.

Figure 22:
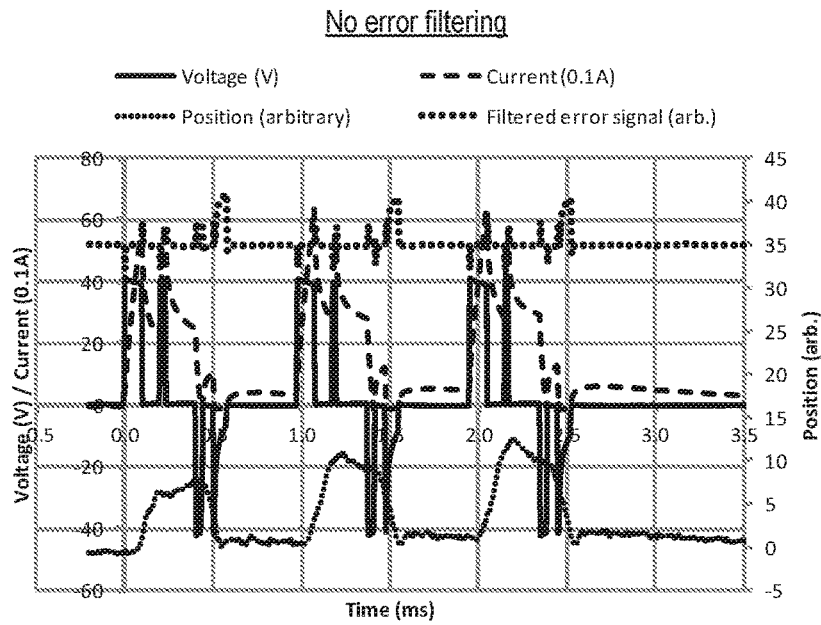
FIG. 22 shows drive waveforms for a flux-switched solenoid for GDI for three injection cycles without using a drive error filter.
Figure 23:
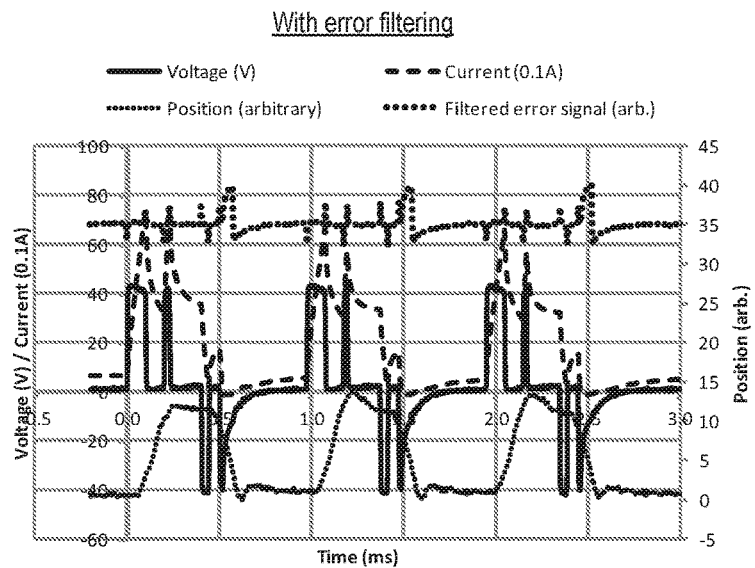
FIG. 23 shows drive waveforms for a flux-switched solenoid for GDI for three injection cycles using a drive error filter.

FIG. 22 and FIG. 23 show waveforms with dual closing pulses with and without the filter applied for a triple injection in a flux-switch solenoid actuator 31. The voltage drive waveform is obtained from the prototype injector INJ 1 hereinbefore described.

The effect of the residual field can be seen in the valve displacement (i.e. increasing valve displacement with each injection) for the case when there is no error filtering shown in FIG. 21. As shown in FIG. 22, this is corrected in FIG. 22 with the filter applied.

Figure 24:
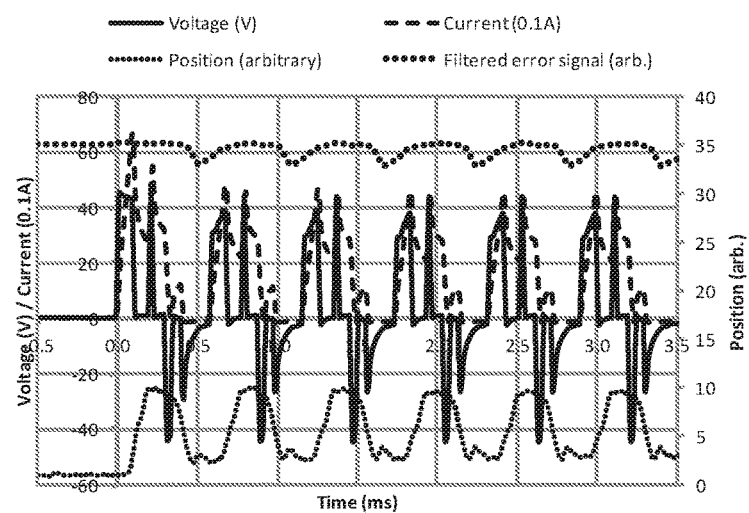
FIG. 24 shows drive waveforms for a flux-switched solenoid actuator for GDI for six injection cycles using a drive error filter.

FIG. 24 shows a six-pulse injection (i.e. six injections) using GDI drive with the filter applied. The voltage drive waveform is obtained from the prototype injector INJ 1 hereinbefore described.

Closed Loop Operation
Use of Closed Loop Control

For stable partial lift, the forces on the armature must balance at a given lift point. In addition, forces acting on the armature will change the velocity produced by an initial high-voltage boost pulse and, thus, alter the lift point reached. These forces may come from, for example, changing the load on the injector (changes in fuel pressure) or from lifetime wear of injector parts. For example, variations in manufacturing may also change the force on an armature 33 from one injector to another. Furthermore, changes over the lifetime of the part and changes in temperature will change the resistance of the coil drive circuit and, therefore, alter the current produced for a given voltage. Since the current effectively sets the lift of the armature (and, thus, the valve), closed-loop control can be used to correct the voltage profile to produce repeatable lift positions.

Closed Loop Control—Introduction

Referring to FIG. 1, the control unit 2 is used to actuate the fuel valve 40 which controls the position of a sealing element and, thus, the flow rate of fuel through the valve 40. The control unit 2 may include a feedback controller 21. Feedback from each injection cycle can be used to modify the drive for a subsequent injection cycle. Thus, the solenoid actuator 31 can be driven in a closed loop fashion, using feedback from the solenoid actuator 31 or other sensors 4, 37 in the solenoid actuator 31 or around the engine (not shown). Feedback can be used to correct the lift for changes caused by fuel line pressure, cylinder pressure and injector performance. This might be used to tune the air/fuel ratio in the cylinders by adjusting the amount of fuel injected by the injectors by altering the partial lift point. Indeed, closed loop control can be used to derive voltage drive parameters which can be used to adjust boost pulse length and, optionally, other features of the drive profile, using the measured information.

Variables 25 can be stored in the control unit 2 which can be used to update future injection behaviour or spot slow drifts in performance.

Range of Sensors Used

As will be explained in more detail hereinafter, feedback on injector performance can be obtained from measurements of the electrical feedback from the solenoid actuator (herein referred to as "sensor-less operation").

Additionally or alternately, feedback on the injector performance can be obtained from one or more sensors or one or more various types including drive-shaft torque sensors, engine vibration or knock sensors, in-cylinder sensors measuring combustion parameters or pressure, or high-speed lambda sensors positioned in the exhaust. High-speed lambda sensors allow an assessment of combustion parameters for individual cylinders (not shown) from the exhaust gas. Those cylinders with non-optimal combustion can have their voltage drive profiles modified to alter the lift of the actuator, enabling each injector to be driven individually to optimise the combustion in each cylinder.

Any sensor which allows a figure of merit for combustion to be derived and which can be used to adjust the lift point of the valve can be used as an input to the closed-loop system.

Electrical Feedback from Solenoid Actuator

As hereinbefore described, the control unit 2 employs constant voltage drive during at least a portion of an injection cycle and so information for closed loop control may be obtained from measurements of the current.

The current driven in the coil(s) 34, 35 may be monitored. The back-emf generated by movement of the armature drives currents and, thus, gives information on the position and velocity of the armature within the measured current.

Figure 25:
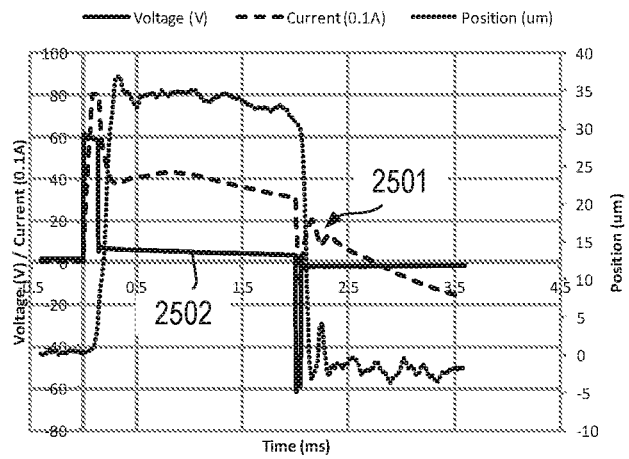
FIG. 25 shows experimental drive data for a flux-switched solenoid actuator which is driven with a voltage drive profile such that the injector opens.
Figure 26:
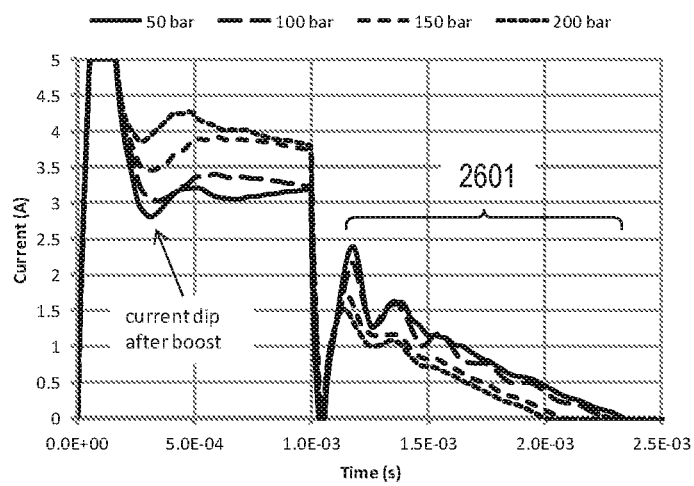
FIG. 26 shows experimental current data for a flux-switched solenoid actuator driven with a simple voltage-drive boost and hold profile and which shows how actuator current profile changes as a function of fuel pressure for the same applied waveform.

Referring to FIGS. 10, 25 and 26, plots of measured current against time show oscillations 103, 2501, 2601 in the current after the valve has closed. The frequency of the oscillations corresponds to the bounce frequency of the valve on the closed stop. Measurements of current at certain instances can be used to identify changes in, for example, load on the injector or the coil temperature. These measurements, together with information about the supplied voltage profile, can be used to modify the voltage drive to compensate for these changes. For FIGS. 25 and 26, the voltage drive waveform is obtained from the prototype injector INJ 4 hereinbefore described.

In addition to monitored current, the voltage can also be monitored after the drive waveform has ended and the injector is left in open circuit.

Referring again to FIG. 27a, a plot of voltage against time show oscillations 2701 resulting from induced emfs from armature movement and which correspond to bounce of the valve on the seat as it is closed. The voltage drive waveform is obtained from the prototype injector INJ 1 hereinbefore described.

Current monitoring can be used on both non-flux-switched solenoid actuators and flux-switched solenoid actuators. However, flux-switched solenoid actuators are generally more responsive to adaptive driving than non-flux-switched solenoid actuators. Flux-switched solenoids typically have a high electromagnetic coupling which is relatively linear over armature travel and drive current range. The drive reluctance seen by the control unit is also independent of the armature position and flux-switched solenoid actuators are less prone to residual pole magnetisation.

Identifying Minimum Current ($I_{dip}$)

As hereinbefore described, the current through the coil can exhibit a minimum value $I_{dip}$ in a period immediately following a boost pulse. The value of the current minimum depends on back-emf caused by changing flux in the magnetic circuit and, thus, gives information about the speed and position of the armature. The minimum current value is then used to correct the lift achieved by the solenoid injector for changes caused by fuel line pressure, cylinder pressure and injector performance. This aggregate effect of these factors can be reflected in a single representative pressure value. A feedback process may include measuring the minimum current and adjusting the voltage drive to obtain consistency in fuel quantity and timing across individual cylinders and variations in fuel line and cylinder pressure.

Referring again to FIG. 8, an experimentally-measured current when driving a flux-switched solenoid actuator 31 (FIG. 1) is shown. The drive waveform comprises a single boost-and-hold voltage drive. A current minimum 101 is visible after the first boost pulse 102. FIGS. 24 and 25 each show a similar dip in current.

FIG. 25 shows a drive profile 2502 which causes the valve to open.

FIG. 28 shows a corresponding drive profile 2802 which causes the valve to open by only about 2 μm. The voltage drive waveform is obtained from the prototype injector INJ 4 hereinbefore described.

FIG. 4 shows experimental data showing a non-flux switch solenoid actuator being operated in partial lift mode with a dual boost pulse. A dip 46 in current is visible coincident with when the de-bounce pulse 47$_2$ is applied.

Identifying Current ($I_{fix}$) at a Fixed Relative Time

Instead of using a current minimum ($I_{dip}$), it is possible to measure a current ($I_{fix}$) measured a fixed time after the first boost pulse has ended or a fixed time after the start of the drive waveform. This can help to avoid overlap of the de-bounce pulse with the minimum current.

FIG. 29a shows how a current profile for a flux-switched solenoid actuator changes as a function of fuel pressure for the same applied drive waveform. FIG. 29b shows how valve opening fraction changes as a function of fuel pressure. The profiles shown in FIGS. 29a and 29b are obtained from the prototype injector INJ 4 hereinbefore described. FIG. 30 is a simplified version of FIG. 28b.

As shown in FIG. 29a, the timing 2901 of a minimum value of the current minimum $I_{dip}$ increases with increasing load on the injector. In this example, the timing 2901 increases from about 105 μs, when there is no applied pressure, to about 135 μs, when the applied pressure is 200 bar (20 MPa). Therefore, the current minimum can provide information on the injector load.

FIG. 29a shows the set of minimum currents obtained after boost against boost period for a variety of levels of injector fuel line pressure.

Each plot can be divided into first, second and third sections 2902$_1$, 2902$_2$, 2902$_3$.

In the first section 2902$_1$, at low boost times, the actuator remains closed and the value of current minimum $I_{dip}$ increases as boost time increases up to a point where the injector starts to open, which in this case is at about 50 μs.

In the second section 2902$_2$, for intermediate boost times, the actuator begins to open and the back emf causes the value of current minimum $I_{dip}$ to fall as boost time is increased further.

In the third section 2902$_3$, at the highest boost times, the actuator is fully open and the value of current minimum $I_{dip}$ once again increases with increasing boost time.

Thus, increasing fuel line pressure requires longer boost periods to cause the injector to open.

FIG. 29a shows plots 2903, 2904, 2905 of current needed to keep the injector closed, half open and fully open respectively.

The delay to the dip current from the end of the boost period also provides information about when the injector is fully open.

Figure 31:
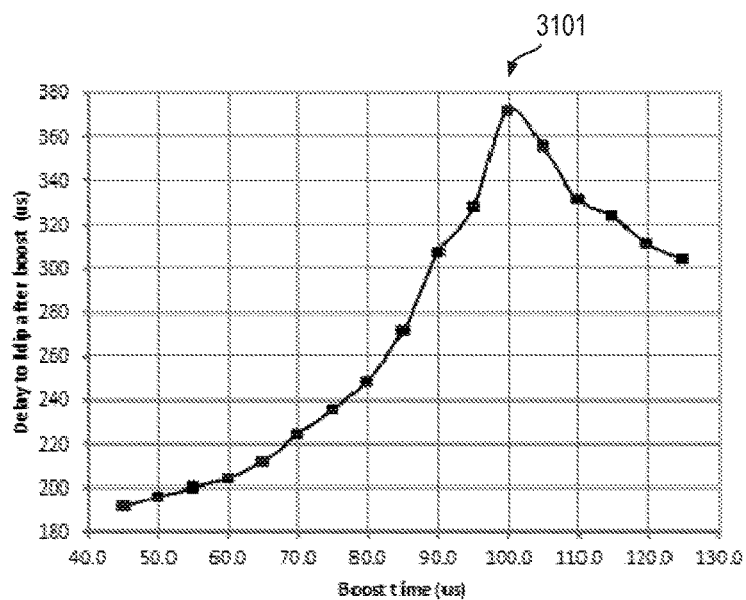
FIG. 31 is a plot of time to reach minimum current after boost ($I_{dip}$) after a first boost pulse ends for a single value of injector load for a flux-switched solenoid actuator.

FIG. 31 shows a plot of the time delay after the end of the boost pulse until the current minimum. The plot shows a maximum 3101 corresponding to valve being fully open. The characteristic varies from injector to injector.

For a given fuel pressure (injector load), the boost time maps approximately linearly to open fraction between the boost time where the injector starts to open and the boost time where the injector is fully open. This is shown in schematically in FIG. 30.

FIG. 30 can be used to run a closed loop process to obtain a specified partial lift point (or "opening fraction").

The control unit 2 maintains a variable P which reflects the current pressure acting on the injector. Using relationship shown in FIG. 29b, the pressure variable P is used in conjunction with the demanded injector opening amount to select the suitable boost time. If the desired opening is not achieved, as measured by the dip current which can be determined by inspection of these variables in FIG. 29a, the pressure variable can adjusted to improve the response for a subsequent pulse.

For example, if 50% opening is required and the pressure variable is 50 bar (5 MPa), then the control unit 2 provides a pulse having a duration of 95 μs. If the pressure variable P is correct, the dip current will be 3.15 amps. If, however, the load on the injector is higher than this, then the injector will open less, giving a higher dip current. If the load on the injector is lower, then the injector will move more, giving a lower dip current. Thus, if a higher dip current is obtained, then the pressure variable P is increased. Conversely, if a lower dip current is obtained, then it is decreased. The amount of this increase or decrease is made sufficiently small to help ensure stability of the feedback loop, but is sufficiently large to ensure fast response to changes in fuel line and cylinder pressure. Separate pressure variables can be maintained for the injectors in the vehicle.

Figure 32:
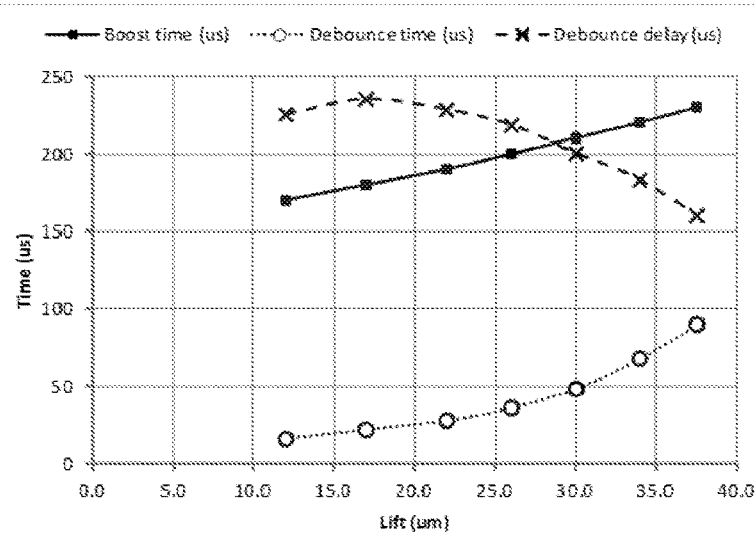
FIG. 32 shows plots of simulated boost time, simulated debounce time and simulated debounce delay for a non-flux-switched solenoid actuator operating with partial lift.
Figure 33:
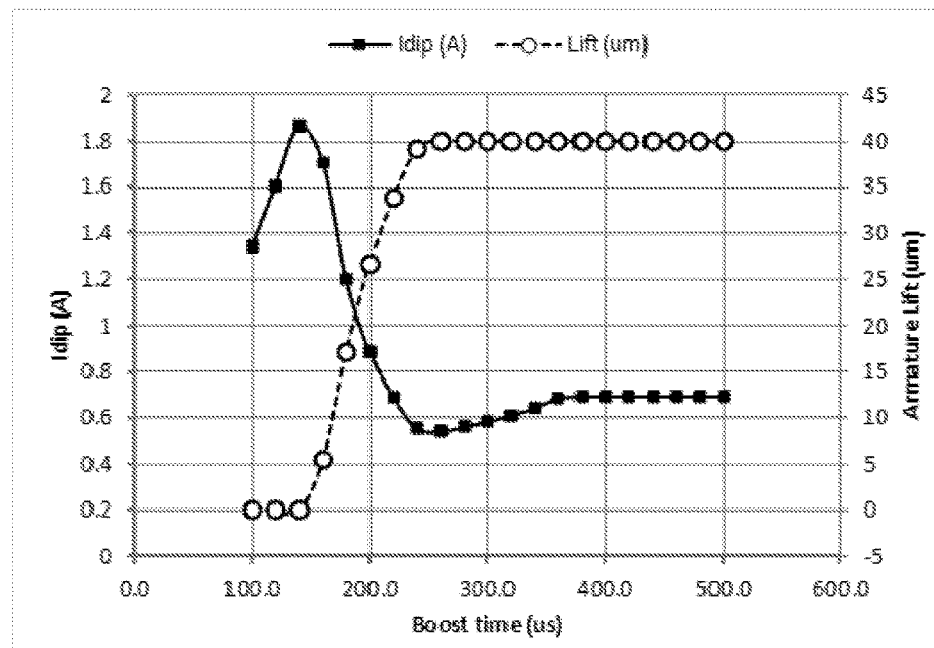
FIG. 33 shows plots of simulated variation of minimum current after boost pulse and simulated variation of stationary stable lift position with duration of boost pulse for a non-flux-switched solenoid actuator.

FIGS. 32 and 33 show simulated behaviour of a non-flux-switched solenoid actuator with partial lift. The simulated behaviour is obtained based on the simulation SOL SIM hereinbefore described.

Referring to FIG. 33, plots of simulated minimum current $I_{dip}$ and valve lift against boost time (i.e. duration after the end of the boost pulse) are shown for a given load. It will be appreciated that there is a set of curves for different pressures.

Scaling of the pressure parameter P may be calibrated to approximate to line pressure and used as either a primary or fallback measurement for the control unit 2. It can be averaged across the injectors on the vehicle. If one injector deviates too much from the average or from the measured rail pressure, then this can be used to indicate a faulty injector.

Adjustments can be made taking into account a double-boost pulse.

FIG. 33 shows how a voltage profile used to produce partial lift may be modified to produce different partial lifts/hold positions. The degree of lift is mainly determined by the boost time, which is the duration of a first high-voltage pulse in the turn on phase of the injection cycle. In this example, boost times from 170 μs to 230 μs are used.

A non-flux-switched solenoid actuator is modelled with 50 kN/m spring rate, 210 N preload and 150 bar (15 MPa) gas pressure. The de-bounce time, which is the duration of the second high-voltage pulse in the turn-on phase, influences the degree of lift, as does the delay to this second pulse.

Reasonable results may be obtained by varying only the duration of the first boost pulse to obtain different partial lift positions, whilst keeping the duration and delay of the second high voltage pulse fixed, at chosen values.

In general, closed loop control can be used to derive full voltage drive parameters including boost time, hold voltage and de-bounce pulse delay. The same information can subsequently be used to produce an appropriate soft-closing pulse.

The current feedback method described above relates to the use of the minimum current after the boost pulse in an algorithm to operate the injector under closed loop control. Other features of the measured current may alternately or additionally be used.

A further example of feedback is the correction of the hold voltage. Changes in, for example, temperature can change the resistance of the coil(s), necessitating a different voltage to maintain the same hold current and, thus, give the same lift. Measurements of the hold current can be compared to target values and be used to tune the hold voltage for subsequent actuation events, thus achieving longer term current stability.

Referring again to FIG. 10, an experimentally-measured current is shown when driving flux-switched solenoid actuator with a single boost-and-hold voltage drive. As can be seen in FIG. 10, a drop in current $\Delta I_{hold}$ is visible during the hold phase due to incorrect setting of the hold voltage The current drop can be corrected as will now be described in more detail.

The hold voltage for a given lift will also vary as a function of pressure (i.e. sum of all forces acting on the pintle). $\Delta I_{hold}$ is measured from the maximum and minimum of the first oscillation in the current after $I_{dip}$. This is multiplied by a gain which linearly depends on pressure and subtracted from $V_{hold}$ to give the new hold voltage.

Step 1. Assume initial value of pressure (analogous to total injector load)
Step 2. Take input requested open fraction
Step 3. Choose boost time from linear map function of open fraction and pressure
Step 4. Apply boost and hold voltage pulse
Step 5. Record $I_{dip}$ (current value and delay)
Step 6. Set debounce delay=$I_{dip}$ delay
Step 7. Calculate new value of pressure P from $I_{dip}$ Amps
Step 8. Choose new boost time
Step 9. Record $\Delta I_{hold}$
Step 10. Calculate new hold voltage from (hold voltage−gain(P)×$\Delta I_{hold}$)
Step 11. Apply new drive pulse (boost, debounce and hold)
Step 12. Return to step 3, assuming new pressure value
In-Pulse Control Information on opening achieved is obtained from $I_{dip}$ approximately 150 µs after the boost time ends. At this point, fuel delivery can be corrected from the pulse in progress by varying one or more of the subsequent drive parameters, such as the de-bounce pulse, hold voltage or overall pulse length. Therefore, $I_{dip}$ feedback can be used to provide in-pulse control.

As implementing in-pulse correction or control can lead vary lift (hence, flow rate) with time, the accuracy of the corrected fuel delivery (i.e. milligrams of fuel per pulse) can be improved by determining the desired fuel delivery for that pulse before the end of the pulse.

The flow rate of the injector may be varied within one injection by adjusting the pintle position within the stroke. Using appropriate modifications of the drive-waveform, various partial lift shapes can be realized, such as step- and ramp-features. Intentional rate shaping may have advantages to combustion and can be used in diesel injection, as well as in other fuel applications, such as GDI and natural gas (NG).

Figure 34:
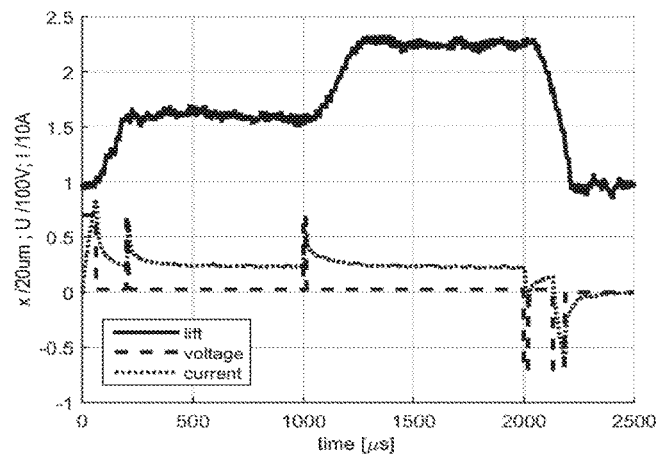
FIG. 34 shows experimental data showing an injection cycle employing rate shaping for a flux-switched solenoid actuator.

FIG. 34 illustrates an example of rate shaping in a flux-switched solenoid actuator. The voltage drive waveform is obtained from the prototype injector INJ 1 hereinbefore described.

Resistance (R) and Impedance (L) Measurements

In current-driven mode, the force developed by an injector is directly related to the control variable, namely the current driven. However, this is not the case in voltage-driven mode. Because the resistance of the drive coil(s) varies with temperature (sometimes by up to a factor of 2), it can help to be able to determine the coil resistance to track the temperature and, thus, the hold current. This enables the drive targets to be adjusted on a slower control loop (outside the main closed-loop voltage control), to make sure the current required is met for the present temperature. In addition, the current produced for a given voltage drive varies with the inductance, which is affected by the pole gap (in flux-switched solenoid actuators) or pole-armature distance (in non-flux-switched solenoid actuators). This parameter is set at the actuator build time and can be subsequently determined, as herein described. The inductance need only be measured at build time and, if it is measured later, infrequently. The resistance, however, needs to be tracked more frequently. In effect, the feedback map for the injector is modified to reflect any change in resistance or inductance. This is then used to compensate the injector performance and reduce the sensitivity of the injector substantially.

The resistance and inductance of the magnetic circuit can also be monitored using electrical feedback. This can be achieved by applying a short boost pulse, for example a 70 V pulse lasting 20 µs, and monitoring the current decay. The boost time is preferably chosen such that the injector does not open.

Figure 35:
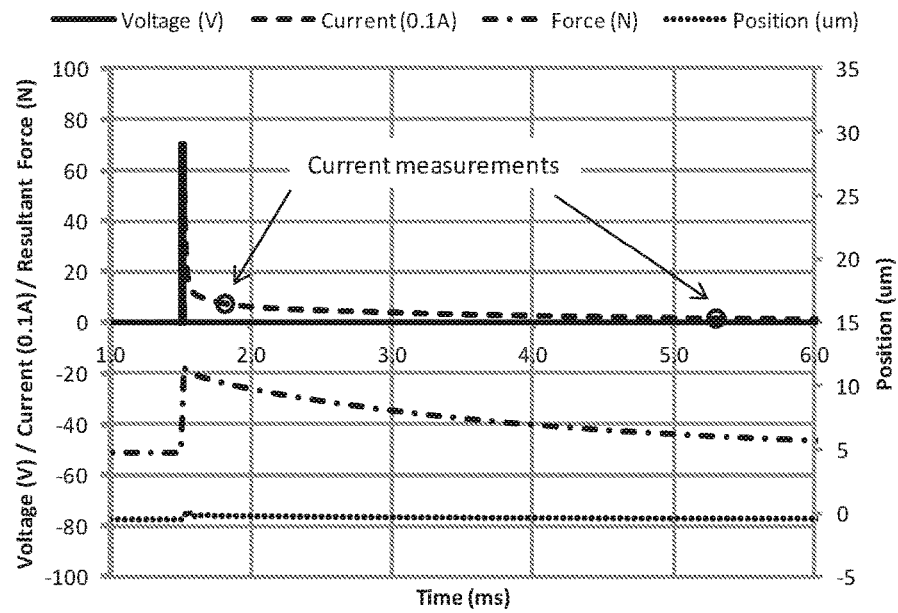
FIG. 35 shows a simulated voltage drive waveform which does not cause the injector to open and the corresponding measured current which can be used to measure resistance and inductance.

Referring to FIG. 35, simulated waveforms for a flux-switched solenoid actuator are shown. The voltage waveform does not result in valve opening. The waveforms are obtained for a model SOL SIM hereinbefore described. As shown in FIG. 35, current can measured at two different times after the end of the boost pulse, for example 230 µs and 3,800 µs after the end of the boost pulse.

Figures 36A, 36B:
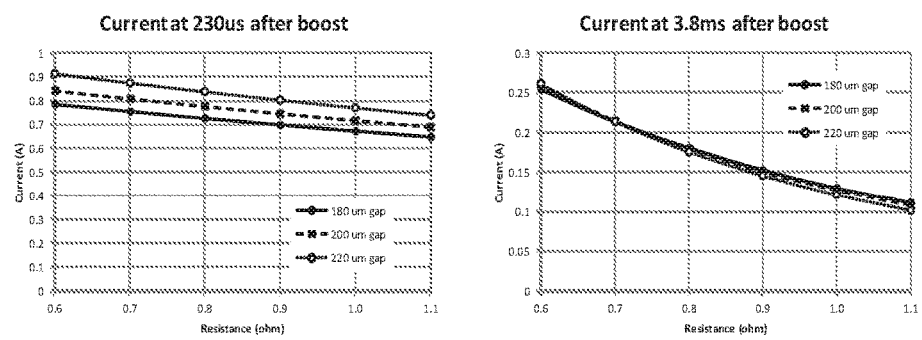
FIGS. 36a and 36b show how current varies with resistance and working gap at first and second respective measurement times for a flux-switched solenoid actuator.

FIGS. 36a and 36b show how current varies with resistance and working gap at two different measurement times for a simulation of a flux-switched solenoid actuator. The waveforms are obtained for a model SOL SIM hereinbefore described. The working gap varies the reluctance of the magnetic circuit and, thus, the inductance of the actuator. The information from the two measurement points can be combined to determine resistance and inductance.

A similar process can be used to determine resistance and inductance for a non-flux-switched solenoid. In this case, inductance depends on the distance between the armature and upper pole. However, the relationship is not linear.

Cross-Over Amplifier

As an alternative approach to measuring and compensating for coil resistance with non-opening pulses hereinbefore described, it is possible to compare the expected and achieved current waveforms. The control unit 2 can compare achieved and expected current waveforms and trim the voltage waveform to match the expected current waveform on successive pulses. Additionally, the control unit 2 can look to adjust the voltage during an injection cycle to try to achieve the excepted current drive. This process can help to provide stiffer injector response from voltage drive, together with temperature compensation and unit-to-unit variation correction achieved by current drive.

The control unit 2 (FIG. 1) can implement injector sealing force compensation, particularly suited to a flux-switched solenoid actuator, with a linear force vs current characteristic, by setting a constant bias current to trim out the injector pre-load. The adjustment range of this current may be positive, negative or bipolar and can be applied continuously to keep the injector at nominal preload or periodically as a pre-charge before and during the injection portion of the cycle. The pressure measurement features are then driven from the value of this current. If a unipolar range of pre-load trim current is used, this provides an alternate way of monitoring coil resistance, by looking at the current just before the next injection cycle, typically 15 ms after the last injection, even at 6000 rpm. Bipolar ranges may have difficulties as it may be at or near zero amps, unless a disallowed band around zero is used within which trim of boost pulse width can be done as herein described, if needed.

With a voltage drive system, a small constant voltage offset can be applied to achieve sealing force compensation, whilst keeping track of resistance to ensure that the desired current offset is maintained. One option is to ignore varying resistance for the purposes of trimming of the sealing force to a given value and just trim the offset voltage to give the desired response. A disadvantage of this approach is that bias current offset needing to be taken off the $I_{dip}$ reading is uncertain.

Coil resistance information can then be used to add a voltage drive term equal to $R_{measured}$ multiplied by the measured current. On a switched drive system, this translates into adding time to the boost or $V_{BATT}$ pulses depending on the integrated current since the last boost or $V_{BATT}$ pulse. It also allows an offset voltage equal to the desired offset current multiplied by the measured resistance to be added, and an $I_{dip}$ value net of bias current to be measured.

The above approach is well-suited to a combined voltage drive with expected current system since the two primary variables of injector sealing load and coil resistance are compensated for thereby giving a remaining primary variable of desired lift. This is needed as the system is non-linear due to the actuator sitting on the valve seat (and possibly on the endstop, if used) for some portions of the drive cycle. A dimensionless way of presenting this is as the static lift force over the nominal (controlled) sealing force and the static force to meet the open stop over the nominal (controlled) sealing force.

Figure 37:
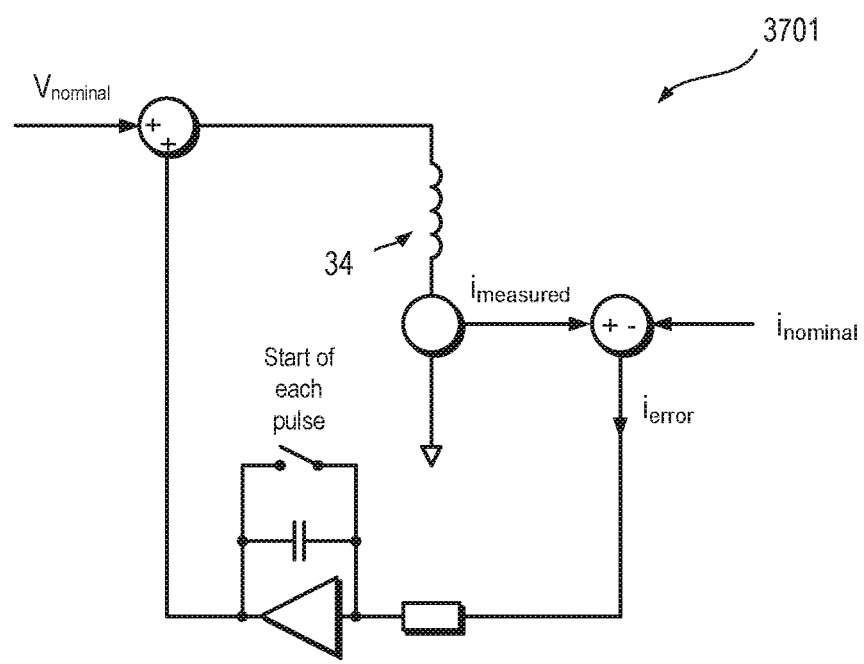
FIG. 37 illustrates a circuit for controlling fuel injections.

A suitable circuit 3701 is shown in FIG. 37.

Closing Bounce Monitoring

At the end of an injection pulse, it is often easier to leave the injector open circuit. Initially, this will typically have the coil voltage limited by the catch diode 1501 (see FIG. 15) onto the boost power supply 1502 (FIG. 15), putting the injector in a constant negative boost voltage state, where current can be monitored, using a circuit 1503 to give an indication of injector behaviour, as hereinbefore described. After a while, the injector current will drop to zero and the reverse emf across the coil 34 will start falling. The injector is now in constant current mode, albeit with I=0, and information about the movement of the armature is contained in the back emf across the coil.

As shown in FIG. 27a, bouncing can be seen. The amplitude of bounce is given by the motor constant M of the injector (in NA$^{-1}$ or V(m/s)$^{-1}$. Thus, the velocity $v_{p-p}$ of the armature is given by:

$$v_{peak-to-peak} = V_{ripple,\,peak-to-peak}/M \qquad (10)$$

Displacement can be derived by integrating the velocity. Thus, bounce displacement$_{peak-to-peak}$ is given by:

$$d_{peak-to-peak} = \int V_{ripple,\,peak-to-peak}/M\,dt \qquad (11)$$

The control unit 2 can adjust, on a dual pulse closing waveform, the width of the initial closing pulse (i.e. the first open circuit portion). This affects how fast or whether the armature lands. This can be monitored for by the current in the short circuit portion between the open circuit portions and bouncing can be spotted in the voltage ripple after the voltage comes off the catch diode in the second open circuit portion. The information can be used to trim the width of the first open circuit pulse and it can also be used to indicate droop or upward drift in partial lift in longer period injections (or droop away from the open stop), and used to correct hold voltage.

Stiff Spring

Spring Contributions

The mechanical spring(s) can be adapted to improve the partial lift performance of both kinds of solenoid actuator. A number of different forces act on the armature in a solenoid actuator when used in a fuel injector.

—Mechanical Spring—

Mechanical spring(s) is/are used to load the armature and ensure the valve is driven closed when the magnetic forces are varied, for example, removed or reversed to allow the valve to shut. In the case of a flux-switched solenoid actuator, the mechanical spring is used to load the armature such that it closes with zero power. A spring is generally used to help ensure a non-flux-switch actuator closes in a reasonable time and forms a seal at the seat. A mechanical spring enables higher opening and closing forces to be realised.

Figure 38:
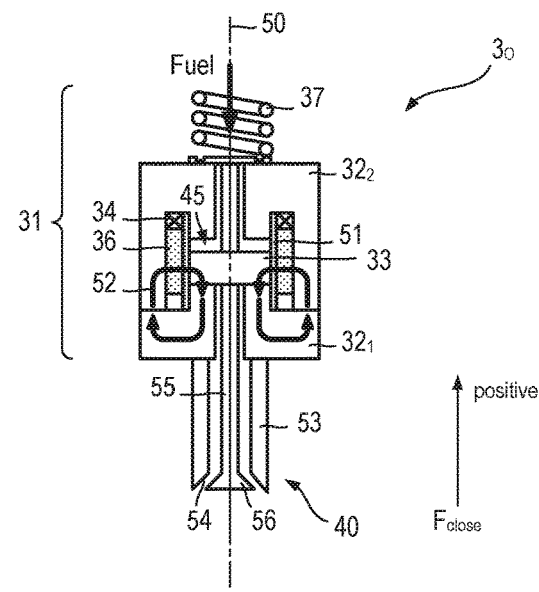
FIG. 38 illustrates forces exerted on an armature of a flux-switched solenoid actuator in an outward opening injector.
Figure 39:
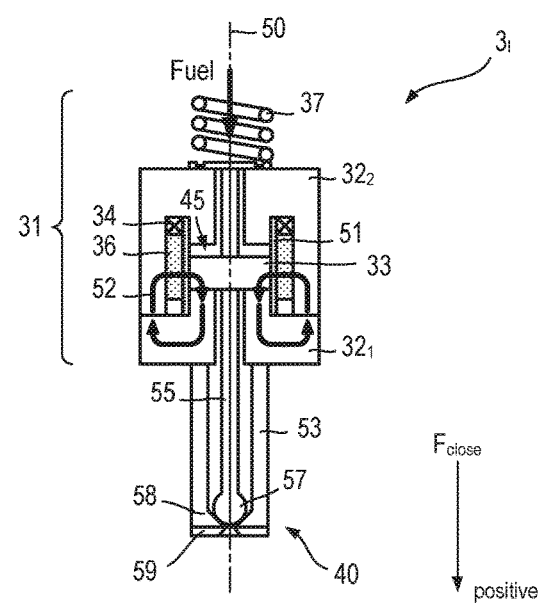
FIG. 39 illustrates forces exerted on an armature of a flux-switched solenoid actuator in an inward opening injector.

FIGS. 38 and 39 schematically show outward and inward opening injectors 3$_O$, 3$_I$ respectively.

Referring to FIG. 38, the outward opening fuel injector 30 comprises a flux-switched solenoid actuator 31 having a central axis 50. The solenoid actuator 31 comprises lower and upper pole pieces 32$_1$, 32$_2$ and an armature 33 interposed between the pole pieces 32$_1$, 32$_2$ and forming a working gap 45 (which is shown greatly exaggerated). The solenoid actuator 31 comprises an electromagnetic coil 34 wound around the axis 50 disposed supported by the lower pole piece 32$_1$. In response to energisation, the electromagnetic coil 34 can cause the armature 33 to move between first and second positions 44$_1$, 44$_2$ (FIG. 2). The solenoid actuator 31 comprises arc permanent magnets 36 diametrically magnetised separated from the armature 33 by a sleeve-like pressure tube 51. As shown in FIG. 38, a loop 52 of magnetic flux is formed through pole pieces 32$_1$, 32$_2$, armature 33, magnet 36 and pressure tube 51.

The fuel injector 30 comprises nozzle section 53 extending away from the lower pole piece 32$_1$ along the central axis 50. The nozzle section 53 has a seat 54 at its distal end. A needle 55 (or "pintle") runs through the nozzle section 53 and is attached to the armature 33. The needle 55 has a valve head 56 at one end which is engageable with the seat 54. The other end of the needle 55 is biased by spring 37 to pull the head 56 against the seat 54. The spring need not be helical. The spring may be in tension. The fuel inlet port connection is not shown.

Referring to FIG. 39, the inward opening fuel injector $3_I$ is similar to the outward opening fuel injector shown in FIG. 38 except that the needle 55 has a ball-shaped head 57 and valve seat 58 and that the needle 55 is biased by spring 37 to push the valve head 57 into the seat 58. The injector 3 includes an orifice plate 59 below the valve seat 58.

Figure 40:
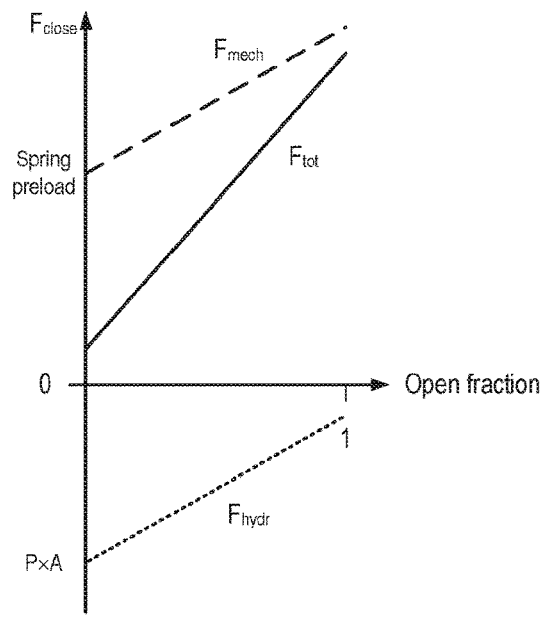
FIG. 40 is a schematic view of an outward opening injector.

FIG. 40 shows the closing forces on the armature 33 as the injector nozzle is opened for an outward opening injector $3_O$ (FIG. 38). The forces include a mechanical force $F_{mech}$ and a hydraulic force $F_{hydr}$. The slope of a line gives the mechanical stiffness. The mechanical stiffness is primarily set by the choice of biasing spring, which acts to exert an increasing force on the armature 33 as the injector is opened 3. As shown in FIG. 40, when the injector is fully closed, the mechanical spring applied preload force.

Figure 41:
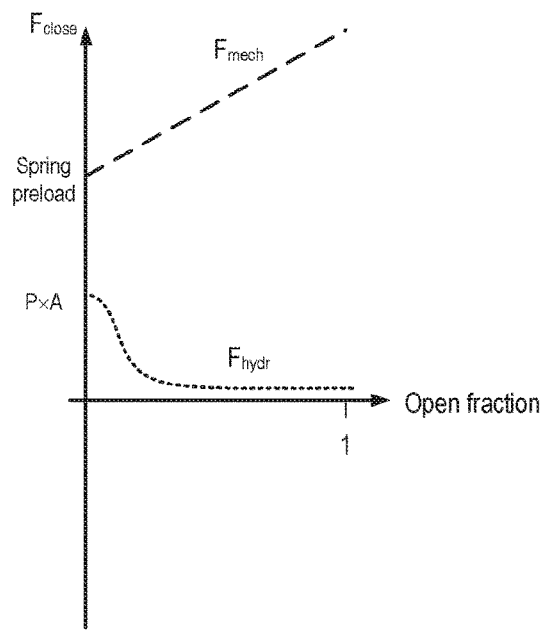
FIG. 41 is a schematic view of an inward opening injector.

FIG. 41 shows a similar plot for an inward opening injector $3_I$ (FIG. 39).

The permanent magnet 36 and a pole piece 32 can be omitted to provide a non-flux-switched solenoid actuator.

The choice of mechanical spring constant and type of mechanical spring depends on other contributions to spring stiffness in the system, such as the magnetic spring and hydraulic spring.

—Magnetic Spring—

Referring to FIGS. 38 and 39, in the case of flux-switched solenoid actuators, the pole piece(s) $32_1$, $32_2$ and permanent magnet(s) 36 can produce a stiff, negative linear spring with an unstable equilibrium in the central position, as described in more detail in WO 2011/058344 A1 and WO 2012/172351 A2 which are incorporated herein by reference.

The magnetic fields produced by the pole piece(s) $32_1$, $32_2$ and drive coil(s) 34, 35 (FIG. 1) can also act to exert a force on the armature 33 in non-flux-switched solenoid actuators $31_N$ (FIG. 7). This can also be considered as a magnetic spring, although it is a magnetic spring with a non-linear relationship between force and displacement, i.e. a spring in which spring stiffness changes. A pressure tube separating a pole piece and armature from the external parts such as coil and outer pole piece may also form part of the magnetic circuit.

—Hydraulic Spring—

The changing hydraulic forces with changing lift acting on a valve head 59 (and armature 33) also result in a contribution to the spring stiffness in both non-flux-switched solenoid actuators and flux-switched solenoid actuators.

FIG. 40 shows the non-magnetic closing forces on the moving mass, e.g. valve head 59 (FIG. 38), armature 33 (FIG. 38), needle 55 (FIG. 38) and effective mass of the spring 37 (FIG. 38), as the valve 40 (FIG. 38) is opened for an outward opening injector $3_O$ (FIG. 38). The hydraulic force $F_{hydr}$ arises from pressurised fuel acting to push the injector open. When the injector is fully closed, the hydraulic force $F_{hydr}$ has value P×A, where P is the fuel line pressure, for example 100 bar (10 MPa), and A is the total valve seat area on which the pressure acts, for example, a seat area of diameter 4.5 mm. As the injector is opened, pressure drops across the opening area and the hydraulic force on the needle 58 is reduced. Therefore, the hydraulic pressure contribution acts like a spring with a stiffness given by the slope of the line. The stiffness of the hydraulic spring can be in the region of 1.5 $Nm^{-1}$.

FIG. 41 shows the closing forces on the armature 33 (FIG. 39) as the valve 40 (FIG. 39) is opened for an inward opening injector $3_O$ (FIG. 39). In this case, the fuel may be liquid, such as gasoline, or a gas. The hydraulic force $F_{hydr}$ from the pressurised fuel is acting in the same direction as the mechanical spring, i.e. to push the injector closed. When the injector is fully closed this has value P×A, where P is the fuel line pressure, for example 150 bar 15 MPa, and A is the total valve seat area on which the pressure is acting, for example, a seat of diameter 1.7 mm. The seat area for an inward opening injector $3_I$ (FIG. 39) may be smaller than an outward opening injector $3_O$ (FIG. 39) and so the hydraulic force $F_{hydr}$ may be lower for a given pressure. As the needle 55 (FIG. 39) is raised, the hydraulic force $F_{hydr}$ drops. For liquid fuels, most of the force reduction can be expected to occur over a much smaller proportion of the valve lift. The hydraulic stiffness is again given by the slope of the line, but the slope is in the opposite direction to the mechanical spring contribution.

Inward opening injectors tend to have a perforated, plate-like arrangement 59 (FIG. 39) in the nozzle outlet using an arrangement of holes to create a suitable aerosol. Alternatively, inward opening injectors may have a circular turned and ground component with holes machined into it which may be angled to obtain the spray direction required. This component may also provide the seat for the ball to seal against. These may be part of the nozzle or a part welded to it. As the needle 55 (FIG. 39) is raised, some pressure is dropped between the ball 57 and valve seat 58. This is not considered to be useful pressure drop. Preferably, most of the pressure drop should occur across the holes (not shown) in the plate which create the aerosol. This tends not to be the case when the needle 55 (FIG. 39) is held at small lifts. Therefore, outward-opening type fuel injectors may be better suited to fuel dosing using partial-lift, since the fuel pressure tends to drop across the valve opening where the aerosol (not shown) is produced. For inward opening injection, higher supply fuel pressures may be used to help ensure an acceptable aerosol is produced at partial lifts.

The control unit 2 may be used to monitor sealing force and pressure. Thus, it can determine a valve sealing force dependant on a measured current and determine cylinder or rail pressure dependant on a measured current.

As hereinbefore described, $i_{dip}$ gives a measure of armature displacement. The primary parameter that will vary the displacement on a given injector for a given volt·second boost product (V·s) is the sealing force. Hence, the boost width and voltage, together with $i_{dip}$ gives a value for the sealing force. The sealing force in turn is defined by the internal springs and magnets (if any) in the injector, together with the hydraulic force from the fuel acting on the valve sealing area, and the cylinder pressure acting in the opposing direction. The weighting and direction of these forces from the pressures depend on the valve sealing area, the direction of valve opening (inward or outward) and any pressure balancing mechanisms than may be applied to the valve. In addition, once the valve starts to open, the effective areas may change, again depending on the valve type.

Thus, for any given valve, to a good approximation, the sealing force $F_{seal}$ is given by:

$$F_{seal} = f \cdot P_{rail} - g \cdot P_{cylinder} + h \quad (11)$$

where f and g are constants set by the valve design, both approximately equal to the valve seal area on a non-pressure balanced valve, and are negative for an outward opening valve, f being many times smaller (and possibly polarity reversed) for a pressure balanced design. h is the nominal sealing pre load from the springs and magnets (if any). Thus, if, for instance, rail pressure is known, cylinder pressure may be inferred from $I_{dip}$, accuracy being improved if the control unit 2 can zero the reading if the cylinder pressure is known at any point. This is particularly appropriate for a pressure balanced outward opening injector, where the influence of rail pressure is much reduced, and there is typically a large valve seal area, around 4 to 10 mm² depending on the device. Alternatively, the cylinder pressure may be estimated and a value for rail pressure generated.

Configuring Spring Contributions

—Spring Rates for Partial Lift—

Referring again to FIG. 2, for an armature 33 to be held stably and stationary at a partial lift point $44_3$, i.e. between the closed and fully open positions $44_1$, $44_2$, the ratio of magnetic spring stiffness to mechanical spring stiffness has a given value or falls within a given range of values. Hereinafter, the mechanical spring stiffness may include a contribution from the hydraulic stiffness of the system.

A stiff mechanical spring provides stable partial lift capability.

For a flux-switched solenoid actuator where the magnetic spring stiffness is linear, this can be achieved by having a mechanical stiffness which is greater than the magnetic stiffness. It can be arranged that the mechanical stiffness is higher only over a chosen range lift of interest for partial lift control.

For a non-flux-switched solenoid actuator, however, magnetic spring stiffness is less easily defined due to its highly non-linear relationship with lift. In this case, a stiff spring can be considered as being one where force varies appreciably, for example by a factor of two or more, over the length of travel.

A stiff mechanical spring makes partial lift more stable for both kinds of solenoid actuator in both voltage and current drive modes. The greater the inequality between magnetic stiffness and mechanical stiffness, the more stable lift will be. However, a stiffer mechanical spring requires a larger hold current to keep the actuator open and, therefore, requires more energy to operate the valve. The correct preload should also be chosen to keep the valve shut when in the closed position, particularly against any back-pressure during combustion and, in an outward opening injector, fuel supply pressure.

In the case of a weak spring, i.e. when mechanical stiffness is much less than magnetic stiffness for a flux-switched solenoid actuator or when there is little change in force with distance for a non-flux-switched solenoid actuator), a high spring preload provides high closing/sealing forces. A flux-switched solenoid actuator with a weak spring, in a static state, tends to have a large negative spring coefficient from the magnetic spring. Nevertheless, it is possible to achieve short-duration about 0.3 to 0.7 times the L/R time constant (which is typically about 1 ms can be up to 2 or 3 ms or more) partial lift. A non-flux-switched solenoid actuator with a weak spring can also achieve short-term partial lift. In both cases, extra stability can be provided by the voltage drive. However, a weaker spring means that the actuators are more sensitive to changes in drive conditions, build variations or applied pressures.

Faster movements of the armature give larger changes in flux and, thus, larger induced currents and better electrical feedback to exploit in closed-loop control. A mechanical spring can be chosen to increase armature speed. Also, a lighter armature can also be used to increase actuator speed and, thus, improve the feedback levels. Stiffer springs make the actuator more stable at the partial lift point and make it less sensitive to variations in build or changes to drive conditions.

—Choosing the Mechanical Spring—

There are two contributions to the mechanical stiffness of the system which should be considered when configuring the injector. The first is the stiffness of the mechanical spring used to bias the armature and the second is the hydraulic stiffness. Therefore, the total stiffness of the actuator is configured by choosing a suitable spring and adapting the nozzle to take account of the hydraulic contribution to system stiffness.

For an outward opening fuel injector, the hydraulic and mechanical spring stiffnesses are additive. Therefore, to achieve a given total system stiffness, the hydraulic stiffness can be increased by adapting the injector nozzle. This allows a less stiff mechanical spring to be used and so allow easier preload setting during injector assembly due to the increased positional tolerance on the end of the spring. It might be possible to arrange for almost all the stiffness to be achieved by the hydraulic component and so allow considerable freedom in the type and characteristics of spring used to set the preload. In addition, a lower holding current can be used.

Referring to FIG. 40, when considering the total, non-magnetic force on the armature, the slopes of the $F_{mech}$ and $F_{hydr}$ can be added to give the total mechanical system stiffness, excluding the magnetic stiffness. For example, if a total system stiffness of 3 MNm$^{-1}$ excluding magnetic stiffness is required, then a mechanical spring of 1.5 MN m$^{-1}$ is sufficient as the rest of the system stiffness is provided by the hydraulic contribution.

For an inward opening fuel injector, the hydraulic stiffness subtracts from the mechanical spring stiffness. Furthermore, much of the fuel pressure may be lost between the seat and the valve head (when the valve is not fully open) rather than across the orifice holes in the nozzle. However, a partial lift position may be chosen with a known hydraulic stiffness which, when combined with the spring stiffness, provides stable partial lift and an acceptable spray from the injector.

Referring to FIG. 41, the hydraulic stiffness is given by the slope of the $F_{hydr}$, but this time the slope is in the opposite direction to the mechanical spring contribution. Therefore, for an inward opening injector, a mechanical spring is chosen to compensate for this hydraulic reduction in spring stiffness, at least over the initial portion of low-lift where most of the force drop occurs. If partial lift is to be useful to deliver reduced fuel volumes, it needs to be used in this low-lift region otherwise there will likely be little difference in the fuel flow between different lift positions.

Types of Spring

The combination of high fuel pressure (requiring actuation forces) and short stroke length can require high-spring rates using compact springs. These spring rates may not be unachievable using helical springs of sizes which can fit, for example, within the diameter of the injector body or pressure tube. High preloads may also be necessary, particularly for outward opening injector designs which must be held closed against the fuel pressure.

The spring(s) preferably fit within the diameter of the injector body or pressure tube. The magnitudes of the spring rates may lie in a range of 0.5 MNm$^{-1}$ to 5 MNm$^{-1}$ or 0.5 MNm$^{-1}$ to 5 MNm$^{-1}$. The springs preferably comprise heat-treated, high-strength steels, such as Armco 17-4 PH or 17-7. The spring(s) are preferably light compared to the moving mass as their effective mass is part of the moving mass.

Springs which allow for very stiff mechanical spring rates will now be described in more detail.

—Disc Spring—

Figure 42:
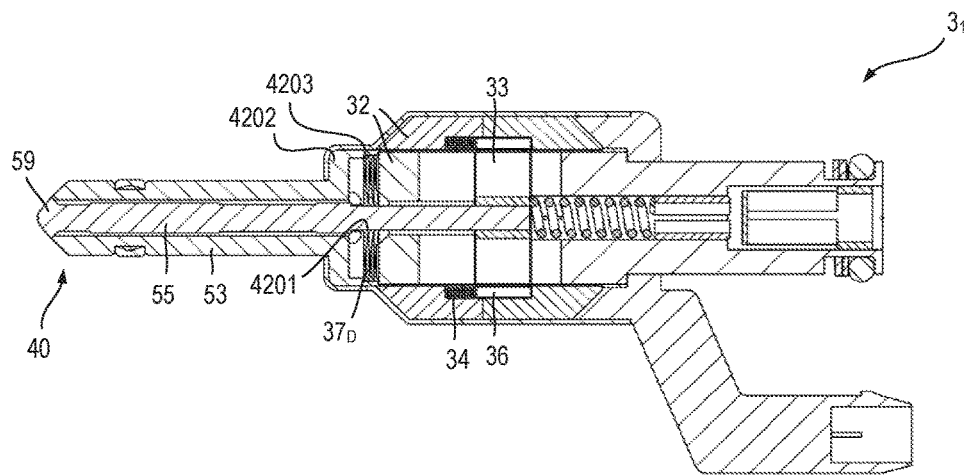
FIG. 42 is a cross-sectional view of a flux-switched solenoid injector design which includes disc spring.

Referring to FIG. 42, a first, outward opening injector $3_1$ is shown.

The injector $3_1$ includes one or more disc springs $37_D$ to provide a mechanical spring and a large preload force on the pintle seat (seal injector tip) 60. If more than one disc spring 37$_D$ is used, they can be arranged in a stack, as shown in FIG. 42.

Each spring 37$_D$ is formed from a diaphragm disc flexure and may be welded to the pintle/needle 55 on the inner diameter 4201 and to the static injector body 4202 around the outer diameter 4203. A welded construction discourages or prevents rotation of the disc(s) 37$_D$, thereby helping to reduce or avoid friction arising from disc movement. Any bending happens in the metal diaphragm. The armature can also be discouraged or prevented from rotating relative to the pole pieces 32. The armature-pole alignment maintains a consistent magnetic force and is particularly helpful if the pole pieces 32 and the armature 33 have radial slots (not shown) which can help to reduce eddy currents and to allow fuel flow.

A dowel or other mechanical feature may be used to align components if placed in a non-flexing location.

Disc spring(s) 37$_D$ can be used in inward and outward opening injectors.

—Machined Helical Spring—

Figure 43:
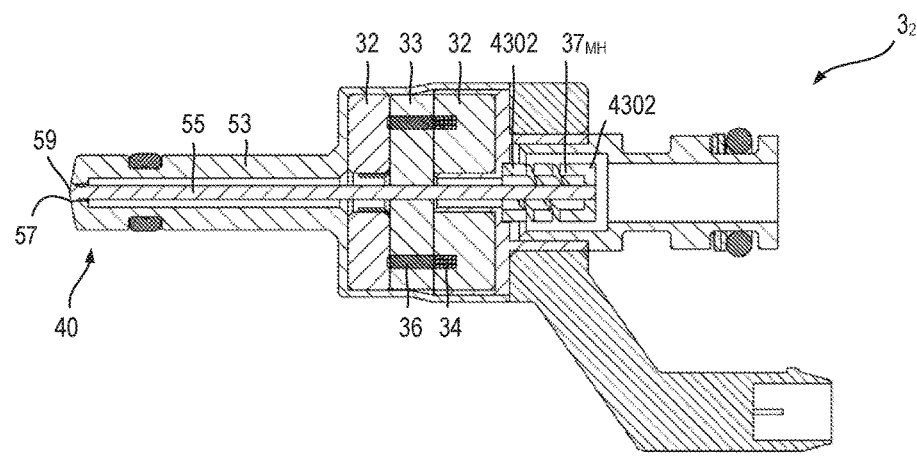
FIG. 43 is a cross-sectional view of an outward opening fuel injector which includes a flux-switched solenoid actuator which includes a machined spring retained at both ends.

Referring to FIG. 43, a second, outward opening injector 32 is shown.

The injector 32 includes a spring 37$_{MH}$ in the form of a machined helical spring.

The spring 37$_{MH}$ may have non-axial features, for example in the form of a radial slot, but can still be attached at both ends, providing the possibilities of supplying force in both extension and compression and helping to discourage or prevent rotation The spring 37$_{MH}$ may be manufactured from solid material. It may have solid closed tube at both ends. The end 4401 of the spring 37$_{MH}$ nearest to the armature 33 may be pressed and/or welded into the static actuator body. An axial slot (not shown) may be added so it acts as a roll-in bottom. The top 4302 of spring may be provided with flow paths so that the inner diameter of the top is welded to the needle in the correct position and applying the correct force to the needle.

This arrangement allows for a single spring element to be used which may apply forces in both closing and opening directions. Machining allows a precise stiffness to be achieved.

—Spring Wire—

A straight spring wire can be used for an outward opening injector, employing tension in the wire when the valve is opened. The wire may be manufactured to have a larger diameter at the fixing point so that the local reduction in strength at the end points due to welding does not compromise the smaller section of wire which acts as the spring.

A straight spring wire can be used for inward opening injectors, by using a thin-walled tube to help discourage or prevent buckling.

Anti-buckling support may be additionally provided. The wire or tube runs through a narrow clearance hole, with either intermittent support or support along the whole length. Alternatively, support can be provided by flexures attached at points along the wire or tube. Alternatively, a more complex mechanical arrangement can be used, in which the wire is in tension for an inward opening valve. The wire can be run coaxially down the centre of the pintle, through a hole in the ball and be attached to the centre of the nozzle plate. Alternatively two wires can be used on either side of the pintle to avoid having to put holes in the ball or centre of the nozzle plate.

Figure 44:
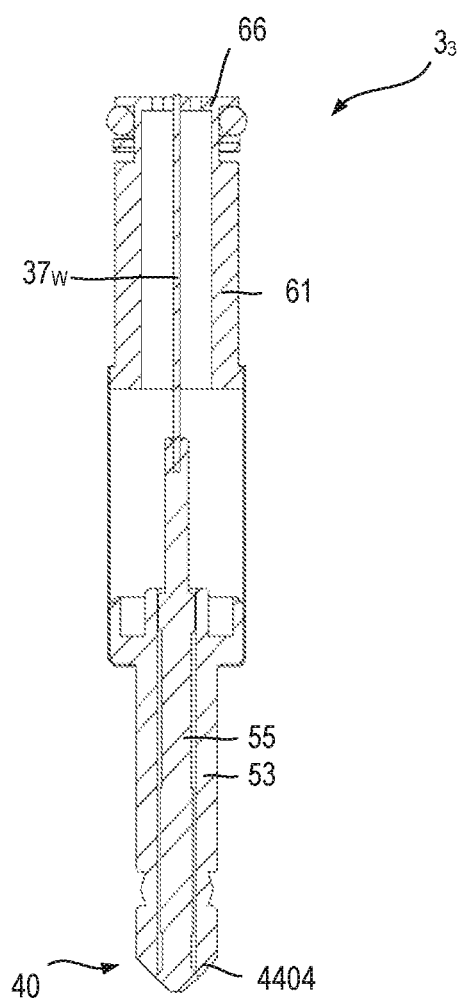
FIG. 44 is a cross-sectional view of a spring wire arrangement for use in a solenoid injector.

Referring to FIG. 44, a portion of a third, outward opening injector 33 is shown.

A nozzle 53, body and inlet 66 are fixed. The pintle 55 moves axially within the injector 3$_3$ to open and close the valve at the nozzle tip 4404.

The valve 40 is biased to its closed position by a tensioned spring wire 37$_W$ fixed between the movable pintle 55 and the immovable inlet 66. When the pintle 55 is actuated to open the valve, the tension in the wire 37$_W$ increases proportionally to the distance moved by the pintle.

Figure 45:
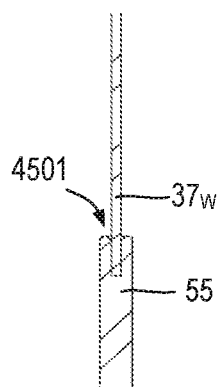
FIG. 45 is a cross-sectional view of an arrangement for fixing a spring wire the end of a pintle.
Figure 46:
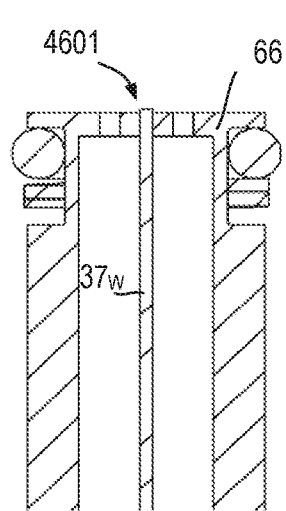
FIG. 46 is a cross-sectional view of a first arrangement for fixing a spring wire to inlet port of a fuel injector.

Referring to FIG. 45, the spring wire 37$_W$ may be fixed to the pintle 55 by a weld 4501.

Figure 47:
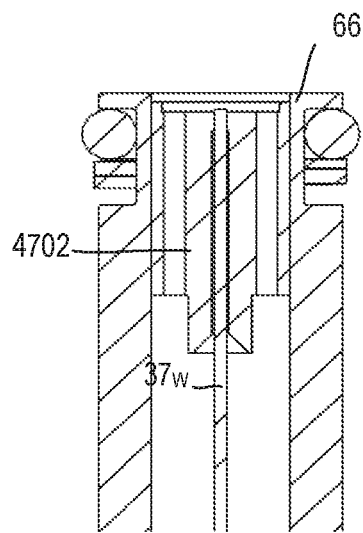
FIG. 47 is a cross-sectional view of a first arrangement for fixing a spring wire to inlet port of a fuel injector.

Referring also to FIG. 47, the spring wire 37$_W$ may be fixed to the inlet 66 by a weld 4701.

Different welding processes can be used to join the spring wire 37$_W$ to the pintle 55, fuel inlet 66 or roll pin (not shown). The welds 4601, 4701 may be a laser beam weld through spring wire 37$_W$ and the pintle 55 or inlet 66 without a filler material.

Other methods for fixing the spring wire 37$_W$ to the pintle 55, fuel inlet 66 or roll pin (not shown) include using a tapered olive that compresses around the wire or having features on the end of the wire that interlock with features in the pintle, inlet or roll pin.

Referring also to FIG. 47, the spring wire 37 may be fixed to an inlet port 66 using a collar 4402.

Figure 48:
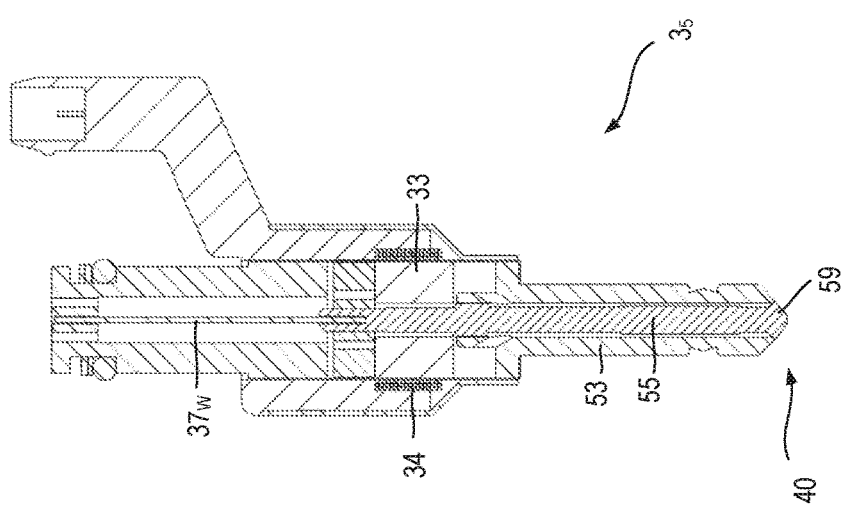
FIG. 48 is a cross-sectional view of an outward opening fuel injector which includes a non-flux-switched solenoid actuator.
Figure 49:
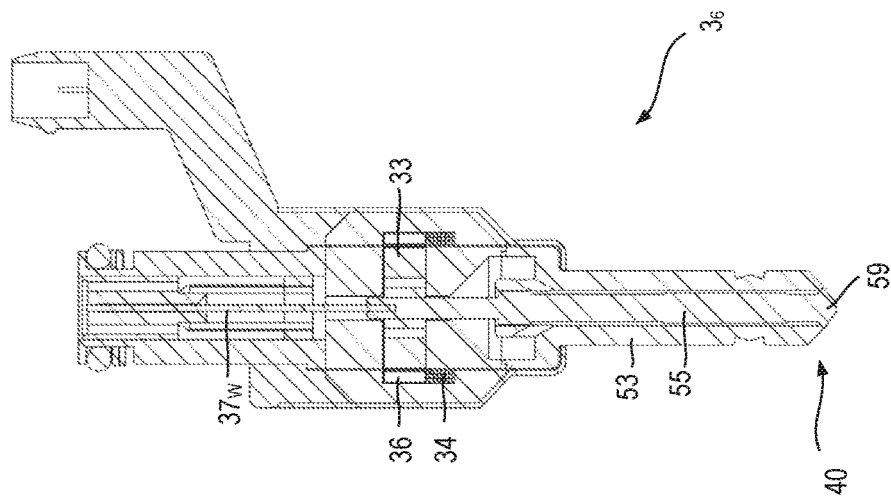
FIG. 49 is a cross-sectional view of an outward opening fuel injector which includes a flux-switched solenoid actuator.

FIGS. 48 and 49 show fifth and sixth outward opening solenoid type fuel injectors 3$_5$, 3$_6$ using respective spring wires 37$_W$. The fifth outward opening fuel injector 3$_5$ has a non-flux-switched solenoid actuator. The sixth outward opening fuel injector 3$_6$ has a flux-switched solenoid actuator.

—Tube Spring—

The mechanical spring may be made from a steel tube, which forms the body of the needle which is attached to the armature. The tube diameter, wall thickness and length may be adjusted to obtain the desired mechanical spring stiffness. One end of the tube does not move, as it is attached to body of the injector near the fuel inlet. The static end of the tube may be attached to the inlet fuel connector. The other end may be attached to the pintle and bellows. The tube and pintle can be a single component. The tube allows construction of a centre-fed dry actuator whereby the fuel is supplied symmetrically to the injector tip through a hollow pintle.

The spring-like pintle is better suited to outward opening injectors because it becomes tensioned when the valve is opened. The pintle may be used for inward opening injectors, provided buckling stability is maintained when the pintle undergoes compression.

Another benefit is that the pintle can be restricted from rotating inside the fuel injector. This can be advantageous in solenoid fuel injectors if the performance of the injector is affected by the rotational misalignment of the armature and pole piece(s). For example if the armature and pole piece(s) have features (e.g. slots) to reduce eddy currents.

The end of the pintle has features for sealing the spray orifice(s) in the nozzle. The design of the pintle end is determined by whether the injector is outward or inward opening and the type of spray pattern required by the injector.

Figure 50:
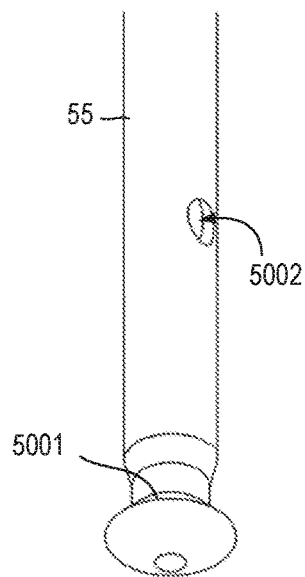
FIG. 50 is a perspective view of a sealing end of a hollow pintle of an outward opening fuel injector.
Figure 51:
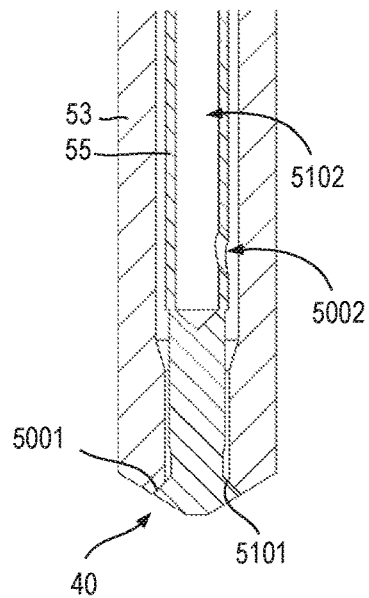
FIG. 51 is a cross-sectional view of a hollow pintle and nozzle of an outward opening fuel injector.

FIG. 50 shows a pintle 55 of an outward opening injector that creates a hollow cone spray pattern. FIG. 51 shows pintle 55 inside a nozzle 53.

The pintle 55 has an obtuse tapered end 5001 which seals inside a corresponding taper 5101 in the nozzle 53. When the valve opens outwards, fuel is released from the nozzle in a hollow-cone spray pattern.

In this type of actuator, pressure from the fuel is constantly acting to open the valve. Therefore, the force to close the valve under high pressure must be much greater.

Figure 52:
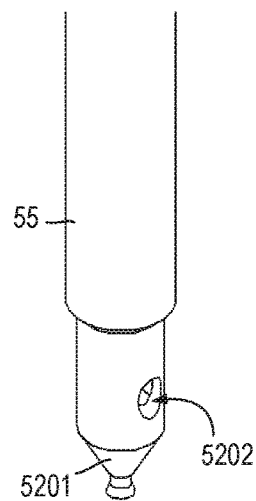
FIG. 52 is a perspective view of a sealing end of a hollow pintle of a first type of inward opening fuel injector.
Figure 53:
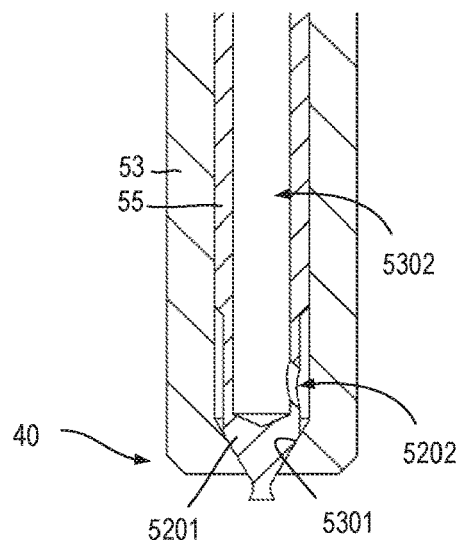
FIG. 53 is a cross-sectional view of a hollow pintle and nozzle of a first type of inward opening injector.

FIG. 52 shows a pintle 55 of an inward opening injector (not shown) that creates a spray dependent on the number and direction and position of the holes. It can create a spray approximating a hollow cone. FIG. 53 shows pintle 55 inside a nozzle 53.

The acute tapered end 5201 seals inside a corresponding taper 5201 in the nozzle 53. When the valve opens inwards, fuel is released from the nozzle in a hollow-cone spray pattern (not shown).

Figure 54:
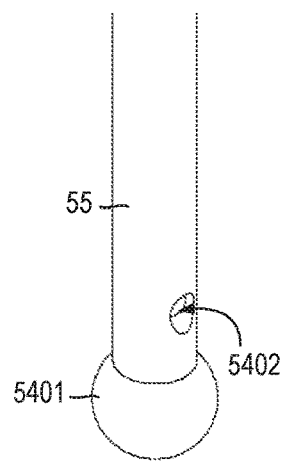
FIG. 54 is a perspective view of a sealing end of a hollow pintle of a second type of inward opening injector.
Figure 55:
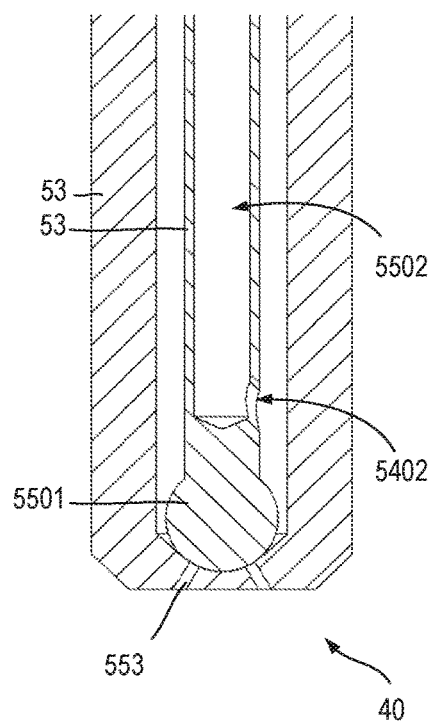
FIG. 55 is a cross-sectional view of a hollow pintle and nozzle of a second type of inward opening injector

FIG. 54 shows a pintle 55 of a second inward opening injector that creates a hollow cone spray pattern. FIG. 55 shows pintle 55 inside a nozzle 53.

A ball 5401 seals inside a hemispherical curved seat 5202 in the nozzle 53. When the valve opens inwards, fuel is released from the nozzle in a hollow-cone spray pattern.

The nozzle may include up to eight holes 5503 which produce an equal number of plumes of spray. In some applications, all the plumes together approximate a hollow cone. However, this need not be the case as the holes 5503 can be directed or bent from the axis of the injector in one direction to allow the injector to be side mounted in the engine. Symmetrical hollow cone injectors have to be centrally mounted In the examples of pintle and nozzle hereinbefore described, a blind hole 5102 (FIG. 51), 5302 (FIG. 53), 5502 (FIG. 55) extends axially from a distal end of the pintle 55 towards to a proximal (sealing) end. Fuel enters the pintle through this hole.

Another hole 5202 (FIG. 52), 5402 (FIG. 54), 5402 (FIG. 54) is disposed in the wall of the pintle 55, allowing fuel to exit near the nozzle tip. In the examples shown, there is a singular circular hole that is cut at a non-perpendicular angle to the axis. However, there may be more holes, the hole(s) need not be circular and/or the holes need not be orientated perpendicularly to the axis.

If the pintle 55 is to act as a compression or extension spring, it is fixed at a distal end or part-way along the length of the pintle, with the distance between the sealing end and the fixed end determining the stiffness of the spring, together with the material and tube cross section. Preload forces on the sealing surface are set by jigging during welding, or can be trimmed by moving a roll pin during calibration. Pressure within the tube will also affect the preload via the hoop stress and Poisson ratio of the tube material.

Figure 56:
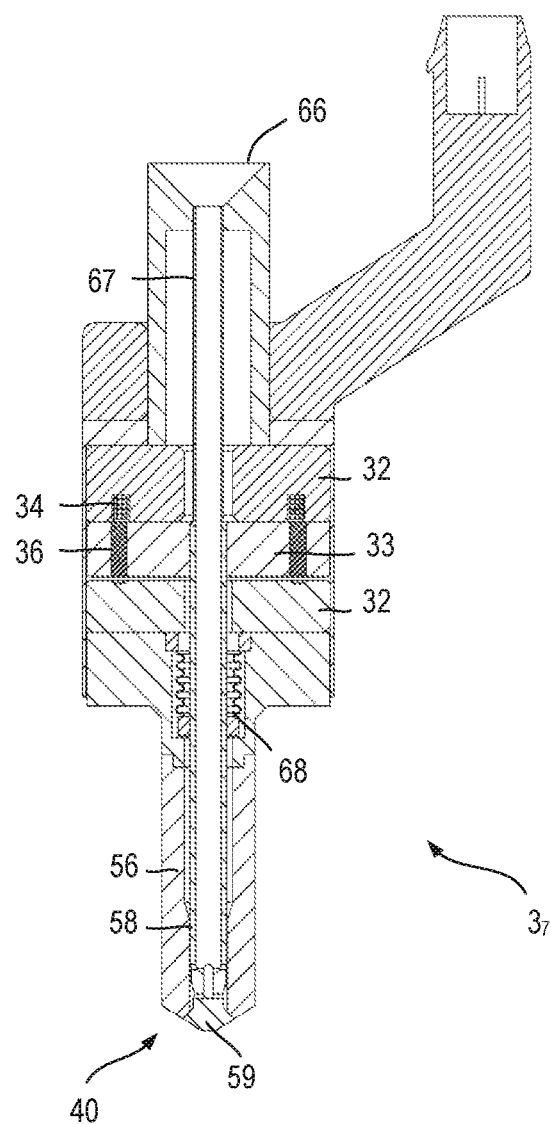
FIG. 56 is a cross-sectional view of an outward opening flux-switched solenoid injector and tube connecting fuel from an inlet to a hollow pintle with a bellows seal.

Referring to FIG. 56, a seventh, outward opening solenoid injector $3_7$ is shown.

The injector $3_7$ includes a centre-fed hollow pintle 55 in fluid communication with fuel inlet 66 via tube 67. The pintle 55 provides a mechanical spring. The injector $3_7$ also includes a bellow seal 68.

Figure 57:
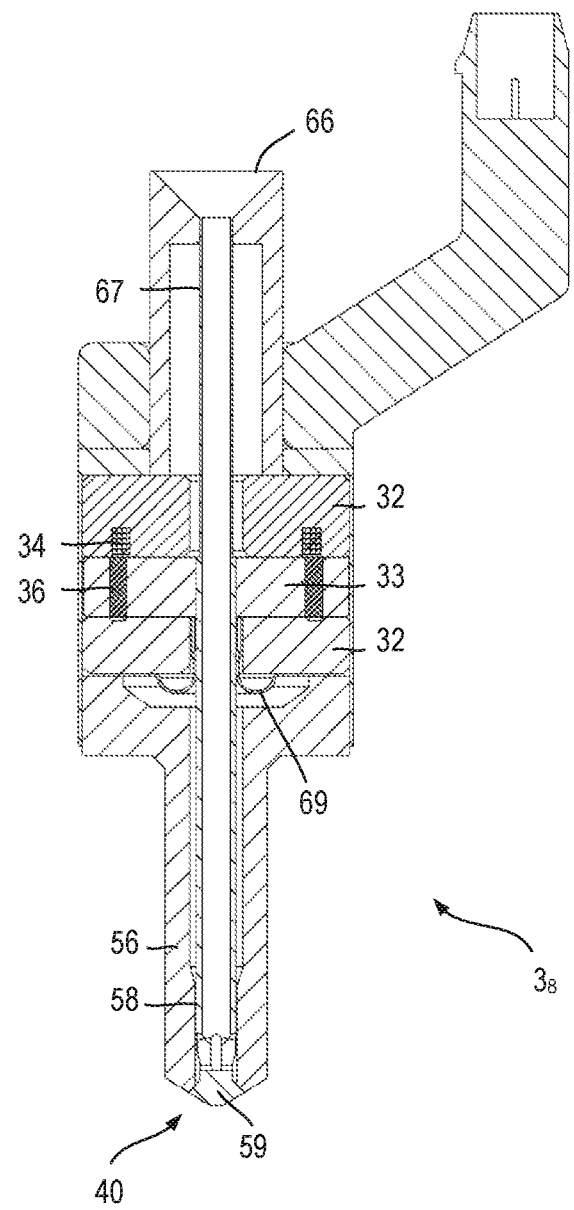
FIG. 57 is a cross-sectional view of an outward opening flux-switched solenoid injector and tube connecting fuel from an inlet to a hollow pintle with a toroidal section flexure seal.

Referring to FIG. 57, an eighth, outward opening solenoid injector $3_8$ is shown.

The injector $3_8$ includes a centre-fed hollow pintle 55 in fluid communication with fuel inlet 66.

Figure 58:
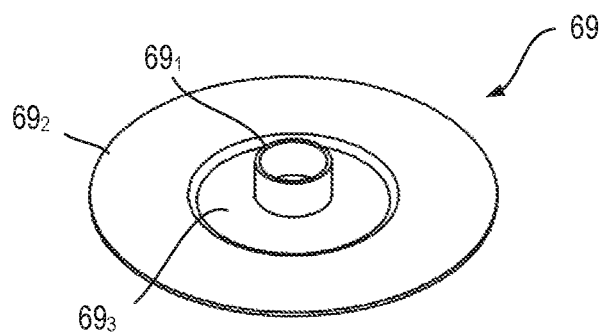
FIG. 58 is a perspective view of a toroidal flexure for isolating fuel in a nozzle from an actuator.
Figure 59:
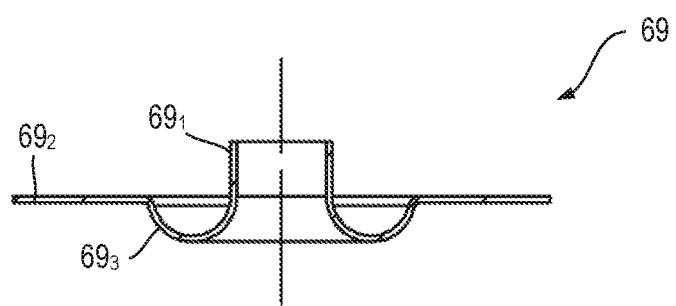
FIG. 59 is a cross-sectional view of the toroidal flexure shown in FIG. 58.

Referring also to FIGS. 58 and 59, the injector $3_8$ includes a toroidal-shaped flexure 69 comprising an inner, short, cylindrical collar portion $69_1$ and an outer, flat, annular disc portion $69_2$ which are interconnected by a demi-toroidal annular portion $69_3$.

The flexure 69 allows axial movement of the pintle 55 and maintains a hermetic seal between the pintle 55 and other parts of the injector $3_8$, such as the armature 33, which are to be kept dry.

The collar $69_1$ has an interference fit (not shown) with the pintle 55. The disc $69_2$ around the collar $69_1$ is compressed between components in the injector. The seal 69 may be welded around its edges. For better stability against overpressure, the curve of the flexure could be the other way, with the pressurised fluid on the inside. When the pintle 55 actuates the seal flexes around the radial bowed feature of the seal.

The pintle 55 provides a mechanical spring.

Figure 60:
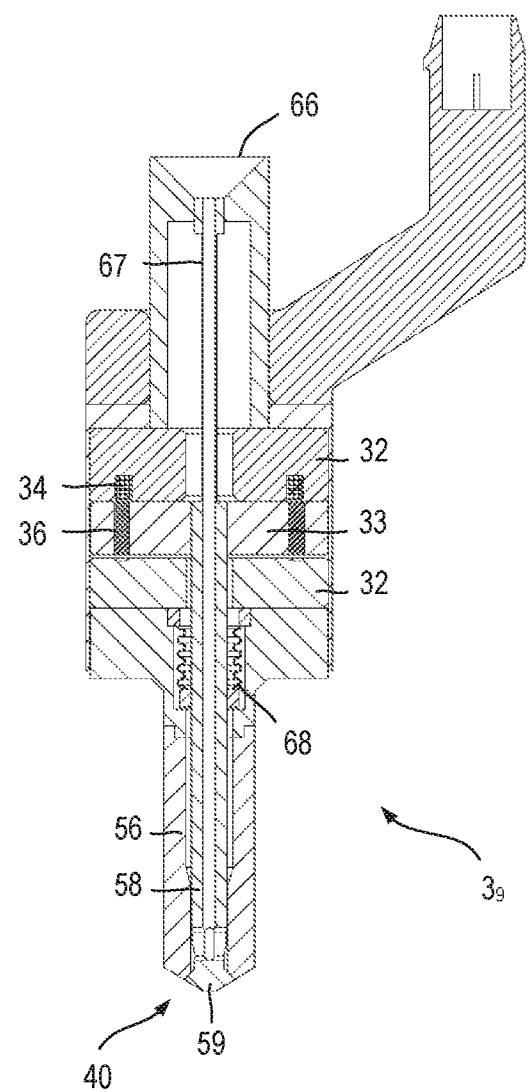
FIG. 60 is a cross-sectional view of an outward opening flux-switched solenoid injector and tube connecting fuel from an inlet to a hollow pintle.

Referring to FIG. 60, a ninth, outward opening solenoid injector $3_9$ is shown. The ninth outward opening fuel injector $3_9$ has a flux-switched solenoid actuator The ninth injector $3_9$ shown in FIG. 60 is similar to that shown in FIG. 56 except that the tube 67 connecting the pintle 55 to the fuel inlet 66 is thinner and has a lower spring rate.

Figure 61:
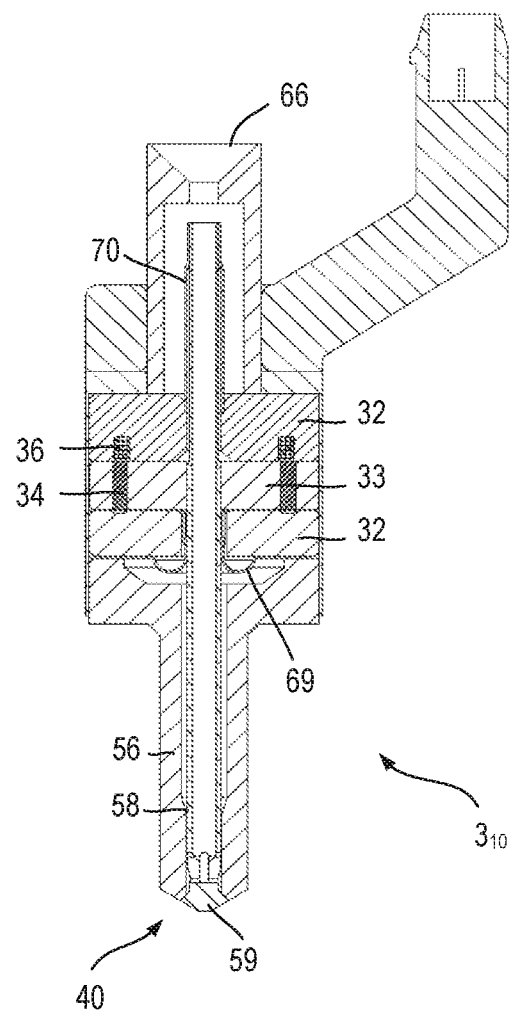
FIG. 61 is a cross-sectional view of an outward opening solenoid injector.

Referring to FIG. 61, a tenth, outward opening solenoid injector $3_{10}$ is shown.

The injector $3_{10}$ shown in FIG. 61 is similar to that shown in FIG. 57 except that a folded-back tube 70 is used for connecting the pintle 55 to the fuel inlet 66. The tube 70 is welded to the pintle 55 and is also attached (for example, welded) to an upper pole piece 32.

Figure 62:
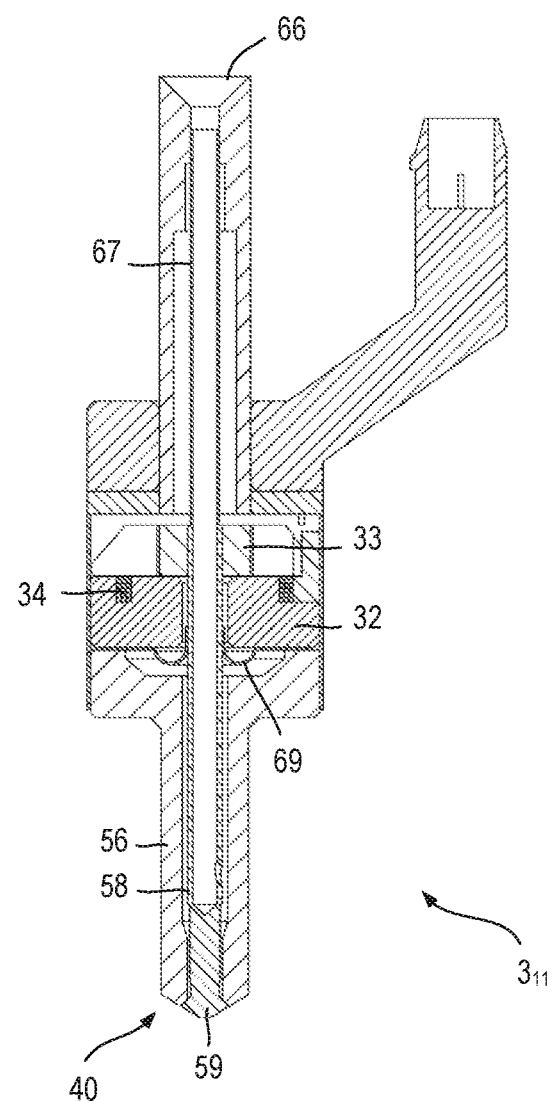
FIG. 62 is a cross-sectional view of an outward opening flux-switched fuel injector including a solenoid actuator without magnets with a tube from the inlet to a hollow pintle
Figure 63:
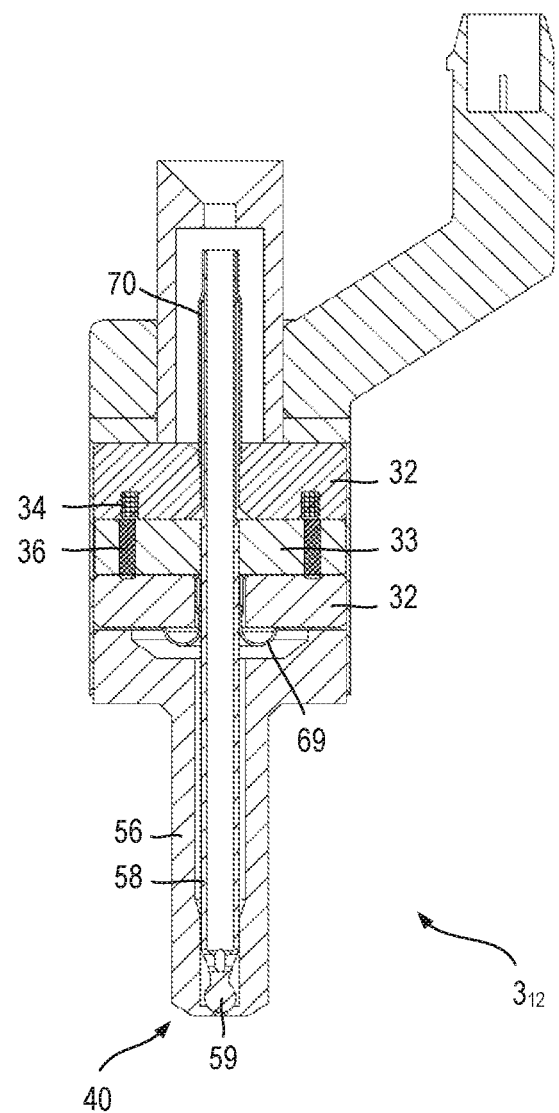
FIG. 63 is a cross-sectional view of an inward opening injector.

Referring to FIG. 62, an eleventh, outward opening solenoid injector $3_{11}$ is shown.

The injector $3_{11}$ does not include permanent magnets. The injector $3_{11}$ includes a centre-fed hollow pintle 55 in fluid communication with fuel inlet 66 via tube 67. The injector $3_{11}$ also includes a toroidal-shaped flexure 69.

Although FIGS. 56, 57, 60, 61 and 62 63 show outward opening injectors, the arrangements of tubes, bellows and/or flexures can also be employed in inward opening injectors.

Fuel Delivery

The solenoid actuators can be selectively operated in ballistic and partial lift modes to deliver fuel different amounts of fuel.

Figure 64:
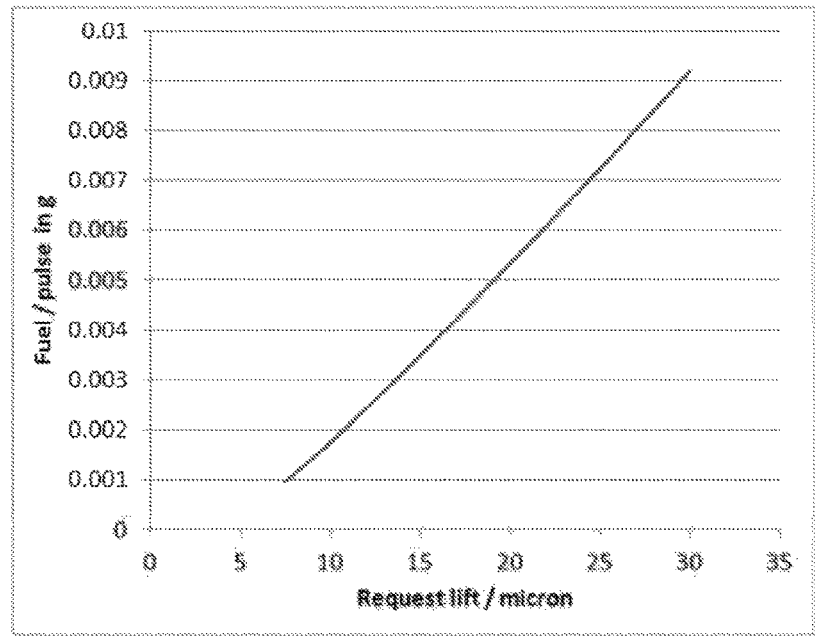
FIG. 64 is a graph of fuel delivered against lift for an injection cycle which does not include a hold period.
Figure 65:
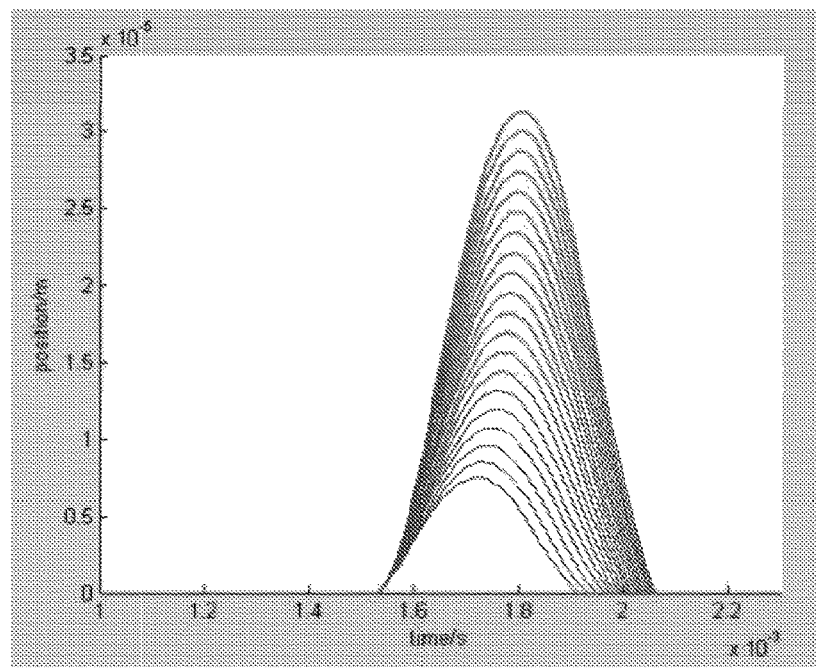
FIG. 65 is a graph of armature position against time for different loads for an injection cycle which does not include a hold period.

FIG. 64 illustrates delivery of relatively small amounts of fuel by operating a fuel injector 3 (FIG. 1) in ballistic mode. FIG. 61 shows plots of armature position against time for different pulse durations. As shown in FIG. 65, the armature 33 (FIG. 1) is not held, but is allowed to travel ballistically to an open position and then fall back.

Figure 66:
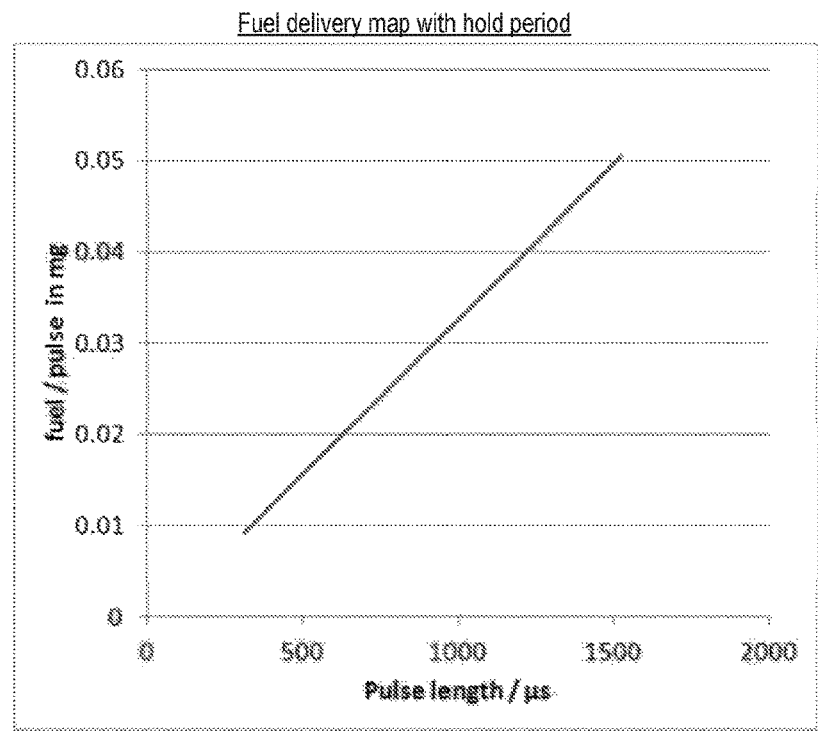
FIG. 66 is a graph of fuel delivered against lift for an injection cycle which includes a hold period.
Figure 67:
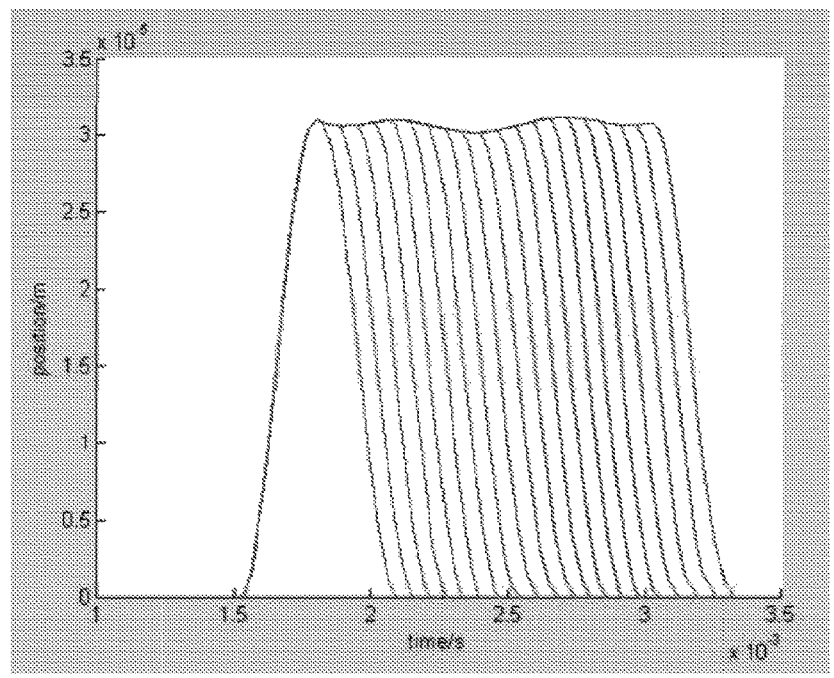
FIG. 67 is a graph of armature position against time for different loads for an injection cycle which includes a hold period.

FIG. 66 illustrates delivery of relatively larger amounts of fuel by operating a fuel injector 3 (FIG. 1) in partial lift mode. FIG. 67 shows plots of armature position against time for different hold durations. As shown in FIG. 67, the armature 33 (FIG. 1) is raised to a partial lift position, is stably held, and then controllably returned to the closed position.

Figure 68:
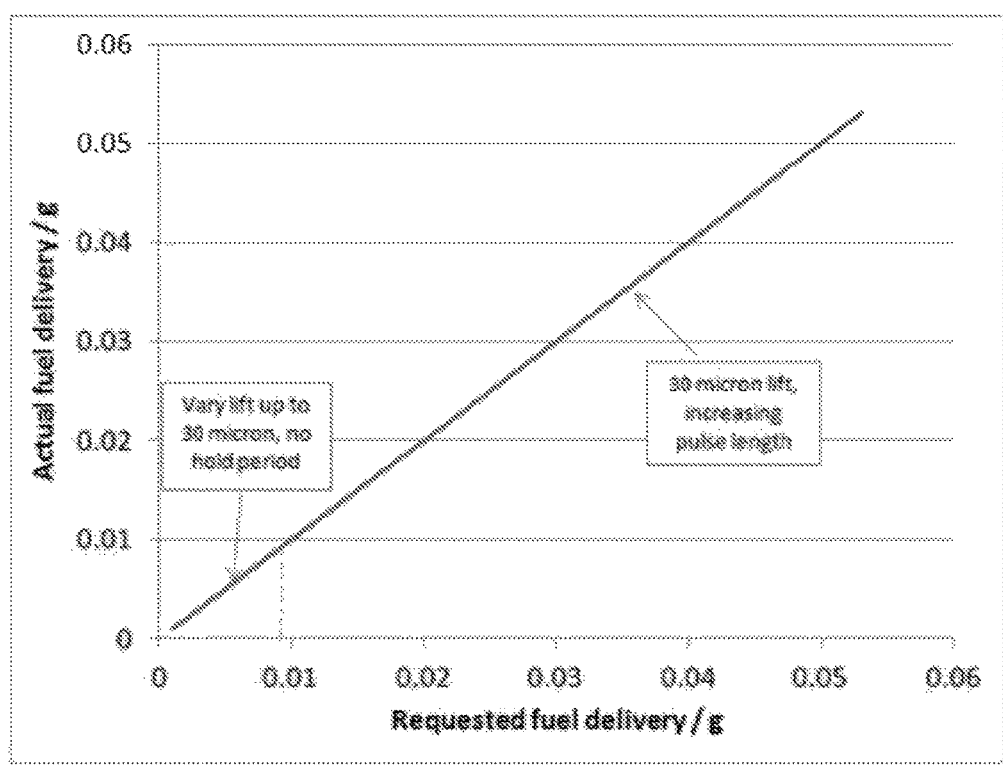
FIG. 68 is a graph of actual fuel delivered against requested fuel delivered.

FIG. 68 shows that an actuator operated in voltage mode provides improved ballistic control and an open stop is not required. The drive wave forms in ballistic and partial lift are similar so transition seamlessly.

Partial Lift

The embodiments hereinbefore described can enable low dosing volumes with good repeatability and at low cost. The solenoid actuators can have permanent magnets and be configured for flux-switched operation. However, solenoid actuators which do not have permanent magnets and which do not exhibit flux-switched behaviour can be used.

The solenoid actuators do not need to be operate ballistically. A linear region of operation can extend down to lower dispense volumes through the use of partial lift. Thus, the armature is not lifted to full extent. Instead, it can be held stably and stationary at a chosen partial lift point for the injection duration. This can allow accurate, repeatable small deliveries and can help to remove non-linearity in fuel volume again pulse width relationship. The need for a physical open stop can also be removed, although one can still be included in the injector. This is because the armature can be held stably at the full lift position without the requirement for any part of the armature or valve to hit a physical stop. Although the actuators do not need to be operate ballistically, they can be used to provide high-stability and/or highly repeatable ballistic operation.

Voltage Drive

Low-impedance voltage drive can make armature position stiffer and enable closed dynamic control of the armature position. The armature position can be locked in place by induced currents through the driver if any perturbations attempt to move the armature. For time periods shorter than the L/R time constant of the solenoid coil, the flux linked with the drive coil is given by the integral of the volts across it. Thus, with a low impedance (or voltage) drive, currents through the coil adjust themselves to maintain the flux through the coil independent of the motion of the armature. Thus, the flux in the pole gap by the coil is independent of armature movement and the flux in the other gap is almost independent of armature movement (provided that the pole gaps are much less than the magnet thickness). Thus, the magnetic forces on the armature are largely independent of armature position and the quasi-static negative spring rate from the permanent magnet disappears. This leaves the mechanical spring and hydraulic spring rates to set the stiffness without being reduced by the magnets negative rate, whilst, at the same time allowing the negative magnet spring rate to reduce the power consumption needed to hold the armature open away from its rest position on the valve seat. The system is stiff in the short term, but compliant over longer time periods. This feature can facilitate stable partial lift performance or, if ballistic mode is used, to extend high stability ballistic operation allowing the use of stiffer springs than would otherwise be practical.

Use of voltage mode can also help to reduce acoustic noise and/or valve impact velocity on full lift units, permitting tighter control of armature motion. It can help to reduce wear due to hard impact of injector parts on open/closed stops. The drive waveforms disclosed herein can allow reduction of bounce on the closing stop as the valve seats.

It may be possible to re-program a control unit to operate in voltage mode. This can allow reconfigurations of a fuel injection system which can help to reduce costs.

No Open Stop

In a conventional fuel injector, the fully open position of the sealing element is controlled by a mechanical stop. Ideally, the delivery mass of fuel per pulse by an injector should be completely linear with energization pulse width. However, when using a mechanical open stop, most injectors exhibit an open stop bounce which causes the sealing element to bounce away from the open stop. The open stop bounce tends to be most noticeable when the pulse width applied to injector causes it to operate around the boundary between ballistic and linear operation. The open stop bounce causes an S-shape aberration in the function which relates the injector fuel delivery (mg/shot) to energization pulse width. This can make it difficult for the control unit to control the air/fuel mixture in this region of injector operation. The precision of the open stop position is also linked to the sensitivity of the fuel valve to sealing element lift. In some valve designs (especially inward-opening designs when large stokes are applied) the fuel valve may be optimised so the fuel flow rate is relatively insensitive to the open position, since the static flow rate of the injector is mainly controlled by the holes in the injector tip. However, in opening outward valves the flow rate is very sensitive to the valve lift as the fuel valve restriction is mainly controlled by the valve lift. Thus, very precise and expensive open stop setting may be required. In addition, the provision of an open stop produces acoustic noise when the injector is fully opened, and the stop wears during the life-time of the injector which contributes to fuel delivery drift.

With closed-loop control of partial lift, the need for a physical open stop can be avoided since the armature can be held stably at the full lift position without the requirement for any part of the armature or valve to impact a physical stop. Therefore, the fuel valve can be manufactured without a maximum flow rate open stop, although an over-travel open stop may be used.

Closed Loop Control

Closed loop control can provide enhanced injector performance. It can compensate for production variations, for example, spring preload (reducing the need for precise setting of the preload), armature position within the gap or valve seat diameter, hence matching performance injector to injector. It can also compensate for changing operating conditions in dynamic operation e.g. changing cylinder pressure or fuel pressure. Finally, it can assist in making the injection operation robust against lifetime drift by identifying injector failure, condition monitoring and compensating for component drift over lifetime. This can allow for a "design tolerance budget" in injector manufacture and performance.

Feedback on the lift of the actuator can also be controlled in such as way that rate shaping can be achieved.

Thus, improved combustion cycles and even new engine concepts can be become technically and commercially feasible. For example, multi-pulse homogeneous, stratified charge and other advanced combustion strategies may become possible, leading to reduced particulates. This can help automotive manufacturers to meet future emissions regulations without recourse to a gasoline particulate filter.

Multi-Pulse Correction

When driving several closely-spaced injections in a multi pulse burst, residual flux in the solenoid actuator can lead to interactions between subsequent injections which tend to lead to more fuel than expected on subsequent pulses. This effect increases as the gap between injections reduces.

It is possible to drive the solenoid-based fuel injectors so as to minimise the interaction between closely-spaced pulses in multiple injection events. This can enable variations in pulse widths, inter-pulse gaps, number of pulses in a pulse train and drive amplitudes (if partial lift operation is used) without having to store a huge number of lookup tables or complex algorithms. It can be used in flux-switched and non-flux-switched solenoid actuator types.

It can also be used in a standard GDI drive power stage.

Springs

Stable partial lift behaviour can be improved with the use of a stiffer spring. However, it is preferred that the physical space used by the spring is kept small. These spring rates may be unachievable using helically wound spring wire. In addition, spring preload may also need to be chosen carefully for a given design. The pintle in a fuel injector is typically actuated by a solenoid, where the pintle either opens inwards or outwards to open the valve. When the current is removed from the solenoid, the valve is normally closed by a helical spring that has become compressed by the opening of the valve. Higher preloads are necessary to keep outward opening designs shut against fuel pressure, whereas lower preloads are possible for inward opening designs. In cases where high spring rate and short travel are required, the spring described herein offer high spring rates within a small space and allow for greater spring rates to be achieved from far less material in comparison with a helically wound spring wire.

Tube Spring

Fuel injectors can have either dry or wet actuators.

Dry actuators isolate the fuel from the actuator, whereas wet actuators expose the armature and pole piece(s) to fuel in the pressure chamber. Having a dry actuator can be beneficial. For example, there may be less fluid damping/squeeze as armature and pole approach, a wider choice of actuator materials can be used, especially in gasoline due to, for example, corrosion resistance requirements, and the need for a pressure tube running through the actuator can be avoided, resulting in speed reduction due to eddy losses arising from using a pressure tube, as well as reduction in pole area available for a given diameter. Omitting a pressure tube removes short-circuited flux loss in the pressure tube which therefore does not get to pass though the working gap.

Traditional approaches to dry actuators use a fuel supply that is asymmetric to the injector tip. However, this can make the injector more complex and increase costs.

Wet actuators are typically centre-fed for a lower cost. The tube spring hereinbefore described can enable a more cost-effective and simpler method of manufacturing a dry actuator. The tube is simple to manufacture and separates fuel from air without the need of additional bellows, minimising the cross sectional size of the injector assembly. In addition, it can also act as a stiff spring using less material than a helically wound spring and, thus, reduce the mass of the moving mass.

Furthermore, the pintle can be restricted from rotating inside the fuel injector. This can be advantageous in solenoid fuel injectors if the performance of the injector is affected by the rotational mis-alignment of the armature and pole piece(s). For example, it can help if the armature and pole piece(s) have features (e.g. slots) for reducing eddy currents. By discouraging or preventing armature rotation, it can also permit routing of an off-axis fuel line through the armature to an on-axis fuel inlet as an alternative to routing the fuel through the pintle.

MODIFICATIONS

It will be appreciated that various modifications may be made to the embodiments hereinbefore described. Such modifications may involve equivalent and other features which are already known in the design, manufacture and use of solenoid actuators and/or injectors and component parts thereof and which may be used instead of or in addition to features already described herein. Features of one embodiment may be replaced or supplemented by features of another embodiment.

For example, different drive waveforms can be used with different solenoid actuators.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A control unit for a fuel injector used or to be used in an internal combustion engine, the fuel injector comprising a solenoid actuator comprising an armature which can travel between first and second positions, the control unit configured to drive current through an electromagnet coil of the solenoid actuator to controllably position and hold the armature at a third position between the first and second positions so as to provide partial lift, wherein the control unit is configured to apply a voltage or current drive waveform such that any residual magnetic fields decay quickly at the end of the injection.

2. A control unit according to claim 1, wherein the control unit is configured to apply the voltage or current drive waveform such that the injection results in substantially zero net magnetic flux in the solenoid actuator at the end of the injection.

3. A control unit according to claim 1, wherein the voltage or current drive waveform comprises positive pulse(s) and negative pulse(s).

4. A control unit according to claim 1, wherein the control unit is configured to apply the voltage or current drive waveform which results in a negative current.

5. A control unit according to claim 1, wherein the voltage or current drive waveform is a first voltage or current drive waveform and the injection is a first injection, wherein the control unit is configured to apply a second voltage or current drive waveform for a second, next injection and to trim the second voltage or current drive waveform so as to take account of residual magnetic flux in the solenoid actuator arising from the first injection.

6. A control unit according to claim 1, comprising:
a waveform source having an output;
an adder having first and second inputs and an output, wherein the output of the waveform source is coupled to the first input of the adder;
a drive amplifier having an input and a rectified output, wherein the output of the adder is coupled to the input of the drive amplifier;
an error amplifier having first and second inputs and an output, wherein the output of the waveform source is coupled to the first input of the error amplifier and the rectified output of the drive amplifier is coupled to the second input of the error amplifier via a pre-scaler;
a filter having an input and an output, wherein the output of the error amplifier is coupled to the input of the filter and the output of the filter is coupled to the second input of the adder,
wherein the rectified output of the drive amplifier is coupled to an output terminal for coupling to the electromagnetic coil of the solenoid actuator.

7. A control unit according to claim 1, comprising:
a switching driver configured to employ an error signal to shorten the duration of a boost pulse by delaying its start.

8. A control unit according to claim 1, wherein an integral of voltage applied across the electromagnet coil over the voltage or current drive waveform is substantially zero.

9. A control unit according to claim 1, wherein the control unit is configured to apply the voltage or current drive waveform which results in partial lift.

10. A control unit according to claim 1, wherein the control unit is configured to vary pulse widths, inter-pulse gaps, number of pulses in a pulse train and pulse amplitudes in the voltage or current drive waveform.

11. A control unit for a fuel injector used or to be used in an internal combustion engine, the fuel injector comprising a solenoid actuator comprising an armature which can travel between first and second positions, the control unit configured to drive current through an electromagnet coil of the solenoid actuator to controllably position and hold the armature at a third position between the first and second positions so as to provide partial lift, wherein the control unit is configured to apply a first voltage or current drive waveform for a first injection and to apply a second voltage or current waveform for a second, next injection, wherein the control unit is configured to trim the second voltage or current drive waveform so as to take account of residual magnetic flux in the solenoid actuator arising from the first injection.

12. A control unit according to claim 11, comprising:
a waveform source having an output;
an adder having first and second inputs and an output, wherein the output of the waveform source is coupled to the first input of the adder;
a drive amplifier having an input and a rectified output, wherein the output of the adder is coupled to the input of the drive amplifier;
an error amplifier having first and second inputs and an output, wherein the output of the waveform source is coupled to the first input of the error amplifier and the rectified output of the drive amplifier is coupled to the second input of the error amplifier via a pre-scaler;
a filter having an input and an output, wherein the output of the error amplifier is coupled to the input of the filter and the output of the filter is coupled to the second input of the adder,
wherein the rectified output of the drive amplifier is coupled to an output terminal for coupling to the electromagnetic coil of the solenoid actuator.

13. A control unit according to claim 11 comprising:
a switching driver configured to employ an error signal to shorten the duration of the boost pulse by delaying its start.

14. A control unit according to claim 11, wherein the control unit is configured to trim the second voltage or current drive waveform such that the second voltage or current waveform uses only a positive current.

15. A control unit according to claim 11, wherein the control unit is configured to vary pulse widths, inter-pulse gaps, number of pulses in a pulse train and pulse amplitudes in the voltage or current drive waveform.

16. A GDI drive stage comprising the control unit according to claim 1.

17. A GDI drive stage comprising the control unit according to claim 11.

18. A fuel injection system comprising:
a fuel injector comprising a solenoid actuator which comprises:
at least one pole piece;
an armature;
at least one electromagnet coil arranged, in response to energisation, to cause travel of the armature between first and second positions; and
at least one spring arranged to bias the armature; and
the control unit according to claim 1 coupled to the solenoid actuator.

19. A fuel injection system comprising:
a fuel injector comprising a solenoid actuator which comprises:
at least one pole piece;
an armature;
at least one electromagnet coil arranged, in response to energisation, to cause travel of the armature between first and second positions; and
at least one spring arranged to bias the armature; and
the control unit according to claim 11 coupled to the solenoid actuator.

20. A fuel injection system according to claim 18, wherein the solenoid actuator further comprises:
at least one permanent magnet positioned and orientated so as to latch the armature in the first and second positions when the armature is in the first and second positions respectively,
wherein the spring is arranged to bias the armature and configured to provide sufficient force so as to prevent the armature from latching in the second position.

21. A fuel injection system according to claim 19, wherein the solenoid actuator further comprises:
at least one permanent magnet positioned and orientated so as to latch the armature in the first and second positions when the armature is in the first and second positions respectively,
wherein the spring is arranged to bias the armature and configured to provide sufficient force so as to prevent the armature from latching in the second position.

22. A fuel injection system according to claim 18, wherein the solenoid actuator:
does not comprise any permanent magnet or
comprises at least one permanent magnet, which does not latch the armature in the first and second positions when the armature is in the first and second positions respectively.

23. A fuel injection system according to claim 19, wherein the solenoid actuator:
does not comprise any permanent magnet or
comprises at least one permanent magnet, which do not latch the armature in the first and second positions when the armature is in the first and second positions respectively.

24. A computer program product comprising a non-transitory computer-readable medium storing a computer program which, when executed by a control unit, causes the control unit to drive current through an electromagnet coil of a solenoid actuator, used or to be used in an internal combustion engine and which comprises an armature which can travel between first and second positions, to controllably position and hold the armature at the third position between the first and second positions so as to provide partial lift and, for closely spaced injections, to apply a voltage or current drive waveform such that such that any residual magnetic fields decay quickly at the end of the injection.

25. A computer program product comprising a non-transitory computer-readable medium storing a computer program which, when executed by a control unit, causes the control unit to drive current through an electromagnet coil of a solenoid actuator, used or to be used in an internal combustion engine and which comprises an armature which can travel between first and second positions, to controllably position and hold the armature at a third position between the first and second positions so as to provide partial lift and, for closely spaced injections, to apply a first voltage or current drive waveform for a first injection and to apply a second voltage or current drive waveform for a second, next injection, wherein the control unit is configured to trim the second voltage or current drive waveform so as to take account of residual magnetic flux in the solenoid actuator arising from the first injection.

* * * * *